United States Patent
Garceau

(10) Patent No.: US 11,639,129 B2
(45) Date of Patent: May 2, 2023

(54) SLIDABLE ROOM ASSEMBLIES

(71) Applicant: NORCO INDUSTRIES, INC., Compton, CA (US)

(72) Inventor: Bernard F. Garceau, Vandalia, MI (US)

(73) Assignee: NORCO INDUSTRIES, INC., Compton, CA (US)

( * ) Notice: Subject to any disclaimer, the term of this patent is extended or adjusted under 35 U.S.C. 154(b) by 416 days.

(21) Appl. No.: 16/570,136

(22) Filed: Sep. 13, 2019

(65) Prior Publication Data

US 2020/0062164 A1 Feb. 27, 2020

Related U.S. Application Data

(63) Continuation-in-part of application No. 16/136,528, filed on Sep. 20, 2018, now abandoned.

(60) Provisional application No. 62/858,712, filed on Jun. 7, 2019, provisional application No. 62/732,330, filed on Sep. 17, 2018, provisional application No. 62/562,084, filed on Sep. 22, 2017.

(51) Int. Cl.
*B60P 3/34* (2006.01)
*F16H 7/06* (2006.01)

(52) U.S. Cl.
CPC . *B60P 3/34* (2013.01); *F16H 7/06* (2013.01)

(58) Field of Classification Search
CPC .............................. F16H 19/0618; B60P 3/34
USPC ... 296/26.13, 26.01, 26.08, 26.09, 165, 171, 296/172, 173, 175, 176
See application file for complete search history.

(56) References Cited

U.S. PATENT DOCUMENTS

| | | | |
|---|---|---|---|
| 1,513,227 A | 10/1924 | Cornelius et al. |
| 1,972,415 A | 9/1934 | Anderson |
| 2,561,921 A | 7/1951 | Guillot |
| 2,729,497 A | 1/1956 | Runyan |
| 2,739,833 A | 3/1956 | Schenkel et al. |
| 2,744,781 A | 5/1956 | Black |
| 2,857,197 A | 10/1958 | Hogg |
| 2,877,509 A | 3/1959 | Klibanow |
| 2,898,143 A | 8/1959 | Ferrera |
| 2,989,144 A | 8/1959 | Ferrera |

(Continued)

FOREIGN PATENT DOCUMENTS

| | | |
|---|---|---|
| BE | 523151 | 10/1953 |
| CA | 2136673 A1 | 3/1996 |

(Continued)

*Primary Examiner* — Hilary L Gutman
(74) *Attorney, Agent, or Firm* — Vorys, Sater, Seymour and Pease LLP; Jacob M. Busch, Esq.

(57) ABSTRACT

A slide-out unit drive assembly for a vehicle body having an opening formed in an exterior wall and a reciprocable slide-out unit disposed in the opening and slidable between a retracted position and an extended position. Sliding movement of the slide-out unit is controlled by the drive assembly at least partially arranged within the jambs. The drive assembly may include one or more drive cables extending connected to the slide-out. The drive assembly may include drive chain that actuates one or more of the drive cables, or the drive assembly may include a drive nut that actuates one or more of the drive cables, or the drive assembly may include a block and tackle assembly that actuates one or more of the drive cables. Sliding movement of the slide-out unit may be either motor driven or manually powered.

27 Claims, 59 Drawing Sheets

(56) References Cited

U.S. PATENT DOCUMENTS

| | | |
|---|---|---|
| 2,902,312 A | 9/1959 | Ferrera |
| 2,965,412 A | 12/1960 | Henderson et al. |
| 2,987,342 A | 6/1961 | Meaker et al. |
| 3,137,041 A | 6/1964 | Mullen |
| 3,341,986 A | 9/1967 | Brosig |
| 3,582,130 A | 6/1971 | Borskey |
| 3,692,349 A | 9/1972 | Ehrlich |
| 3,712,005 A | 1/1973 | Eschbach et al. |
| 4,055,329 A | 10/1977 | Hammond |
| 4,066,356 A | 1/1978 | Parker |
| 4,103,462 A | 8/1978 | Freller |
| 4,133,571 A | 1/1979 | Fillios |
| 4,148,461 A | 4/1979 | Orth |
| 4,261,614 A | 4/1981 | Rice |
| 4,270,791 A | 6/1981 | Tann |
| 4,509,724 A | 4/1985 | Okada |
| 4,715,480 A | 12/1987 | Anderson |
| 4,720,082 A | 1/1988 | Yang |
| 5,050,927 A | 9/1991 | Montanari |
| 5,090,749 A | 2/1992 | Lee |
| 5,154,469 A | 10/1992 | Morrow |
| 5,237,782 A | 8/1993 | Cooper |
| 5,248,180 A | 9/1993 | Hussaini |
| 5,295,430 A | 3/1994 | Dewald, Jr. et al. |
| 5,332,276 A | 7/1994 | Blodgett, Jr. |
| 5,491,933 A | 2/1996 | Miller et al. |
| 5,530,323 A | 6/1996 | Breitzmann |
| 5,570,924 A | 11/1996 | Few et al. |
| 5,634,683 A | 6/1997 | Young |
| 5,706,612 A | 1/1998 | Tillett |
| 5,758,918 A | 6/1998 | Schneider et al. |
| 5,791,715 A | 8/1998 | Nebel |
| 5,800,002 A | 9/1998 | Robert et al. |
| 5,833,296 A | 11/1998 | Schneider |
| 5,857,733 A | 1/1999 | Dewald, Jr. et al. |
| 5,860,693 A | 1/1999 | Ehrlich |
| 5,894,698 A | 4/1999 | Dewald, Jr. et al. |
| 5,915,774 A | 6/1999 | Tiedge |
| 5,971,471 A | 10/1999 | Gardner |
| 6,094,870 A | 8/2000 | Stacy |
| 6,152,520 A | 11/2000 | Gardner |
| 6,227,607 B1 | 5/2001 | Dewald, Jr. et al. |
| 6,234,566 B1 | 5/2001 | Cyr et al. |
| 6,254,171 B1 | 7/2001 | Young, Sr. |
| 6,293,611 B1 | 9/2001 | Schneider et al. |
| 6,325,437 B2 | 12/2001 | Heibert et al. |
| 6,338,523 B1 | 1/2002 | Rasmussen |
| 6,393,769 B1 | 5/2002 | Mertik et al. |
| 6,415,675 B1 | 7/2002 | Schneider et al. |
| 6,422,628 B1 | 7/2002 | Bortell |
| 6,454,336 B1 | 9/2002 | Nye et al. |
| 6,471,275 B1 | 10/2002 | Kunz et al. |
| 6,494,518 B2 | 12/2002 | Kreil et al. |
| 6,502,893 B1 | 1/2003 | Corliss, Jr. |
| 6,536,821 B1 | 3/2003 | Gardner |
| 6,568,734 B2 | 5/2003 | Buls et al. |
| 6,619,713 B2 | 9/2003 | Eichhorn |
| 6,619,714 B2 | 9/2003 | Schneider et al. |
| 6,623,066 B2 | 9/2003 | Garceau et al. |
| 6,644,719 B2 | 11/2003 | Young, Sr. |
| 6,696,813 B2 | 2/2004 | McManus et al. |
| 6,729,670 B1 | 5/2004 | Buls et al. |
| 6,783,164 B2 | 8/2004 | Bortell |
| 6,796,590 B2 | 9/2004 | Schneider |
| 6,896,307 B2 | 5/2005 | Nye et al. |
| 6,905,154 B1 | 6/2005 | Buls et al. |
| 6,976,721 B2 | 12/2005 | Rasmussen |
| 6,981,728 B2 | 1/2006 | Rasmussen |
| 7,040,689 B2 | 5/2006 | Few et al. |
| 7,052,064 B2 | 5/2006 | Rasmussen |
| 7,052,065 B2 | 5/2006 | Rasmussen |
| 7,073,844 B2 | 7/2006 | Garceau et al. |
| 7,108,005 B1 | 9/2006 | Christenson et al. |
| 7,150,483 B2 | 12/2006 | Rasmussen |
| 7,210,269 B2 | 5/2007 | Garceau et al. |
| 7,234,747 B2 | 6/2007 | Rasmussen |
| 7,258,389 B2 | 8/2007 | Franzini |
| 7,309,092 B2 | 12/2007 | Garceau et al. |
| 7,350,850 B2 | 4/2008 | Rasmussen |
| 7,354,088 B2 | 4/2008 | Garceau et al. |
| 7,374,218 B2 | 5/2008 | Schneider |
| 7,384,093 B2 | 6/2008 | Rasmussen |
| 7,540,546 B2 | 6/2009 | Kern et al. |
| 7,540,549 B2 | 6/2009 | Revelino et al. |
| 7,588,279 B2 | 9/2009 | Rasmussen |
| 7,607,365 B1 | 10/2009 | Courser |
| 7,614,675 B2 | 11/2009 | Kunz |
| 7,748,763 B2 | 7/2010 | MacLean |
| 7,871,114 B2 | 1/2011 | Schultz et al. |
| 8,016,343 B2 | 9/2011 | Schwindaman et al. |
| 8,042,853 B2 | 10/2011 | Garceau |
| 8,967,694 B2 | 3/2015 | Garceau |
| 9,050,923 B1 | 6/2015 | Garceau et al. |
| 9,446,703 B1 | 9/2016 | Garceau et al. |
| 9,556,940 B2 | 1/2017 | Garceau |
| 2002/0063441 A1 | 5/2002 | Young, Sr. |
| 2002/0074815 A1 | 6/2002 | McManus et al. |
| 2002/0084664 A1 | 7/2002 | McManus et al. |
| 2002/0089212 A1 | 7/2002 | Garceau et al. |
| 2002/0153745 A1 | 10/2002 | Messano |
| 2004/0094983 A1 | 5/2004 | Bortell |
| 2004/0145204 A1 | 7/2004 | Few et al. |
| 2005/0179278 A1 | 8/2005 | Yoder |
| 2005/0230989 A1 | 10/2005 | Nebel |
| 2006/0082178 A1 | 4/2006 | Rasmussen |
| 2006/0113822 A1 | 6/2006 | Kunz |
| 2006/0186683 A1 | 8/2006 | Garceau et al. |
| 2007/0194586 A1 | 8/2007 | Gardner |
| 2007/0216183 A1 | 9/2007 | Few et al. |
| 2008/0284191 A1 | 11/2008 | Schultz |
| 2008/0290689 A1 | 11/2008 | Garceau |
| 2009/0261610 A1 | 10/2009 | Kreil |
| 2010/0066025 A1 | 3/2010 | Kreil |
| 2011/0025091 A1 | 2/2011 | Schwindaman |
| 2011/0156430 A1 | 6/2011 | Gardner |
| 2013/0119694 A1* | 5/2013 | Garceau .................. F16H 19/06 296/26.13 |
| 2017/0114877 A1 | 4/2017 | Howie et al. |
| 2018/0021616 A1* | 1/2018 | Orady ................ A63B 24/0087 482/5 |
| 2019/0154121 A1* | 5/2019 | Howie ................ F16H 19/0672 |
| 2019/0386592 A1* | 12/2019 | Mogensen .............. H02P 6/182 |

FOREIGN PATENT DOCUMENTS

| | | | |
|---|---|---|---|
| CA | 2371302 A1 | 11/2000 | |
| CA | 2488352 A1 | 5/2005 | |
| DE | 1095137 | 12/1960 | |
| EP | 1173346 A1 | 1/2002 | |
| GB | 882258 | 11/1961 | |
| WO | WO-0220309 A2 * | 3/2002 | ................ B60P 3/34 |

* cited by examiner

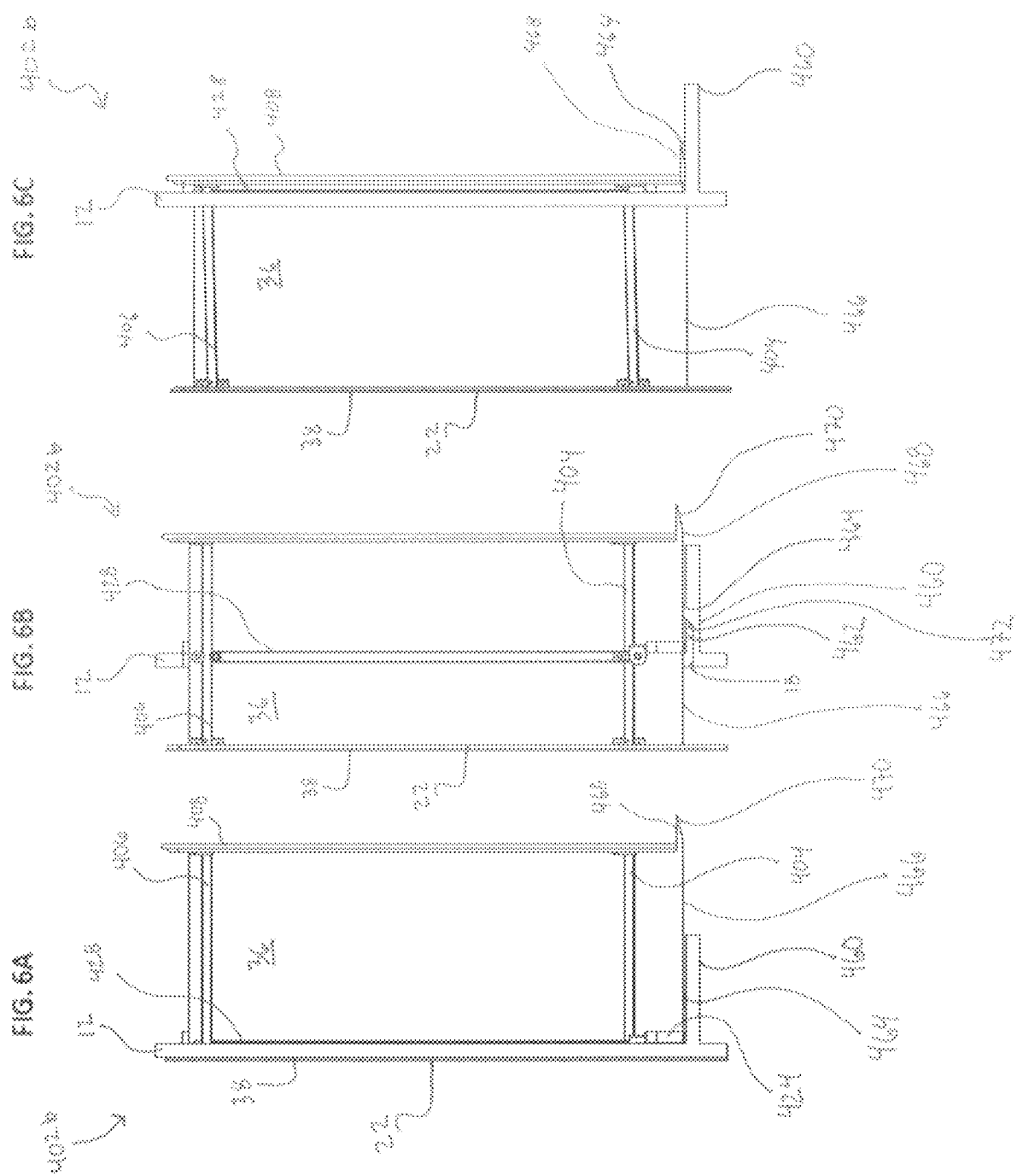

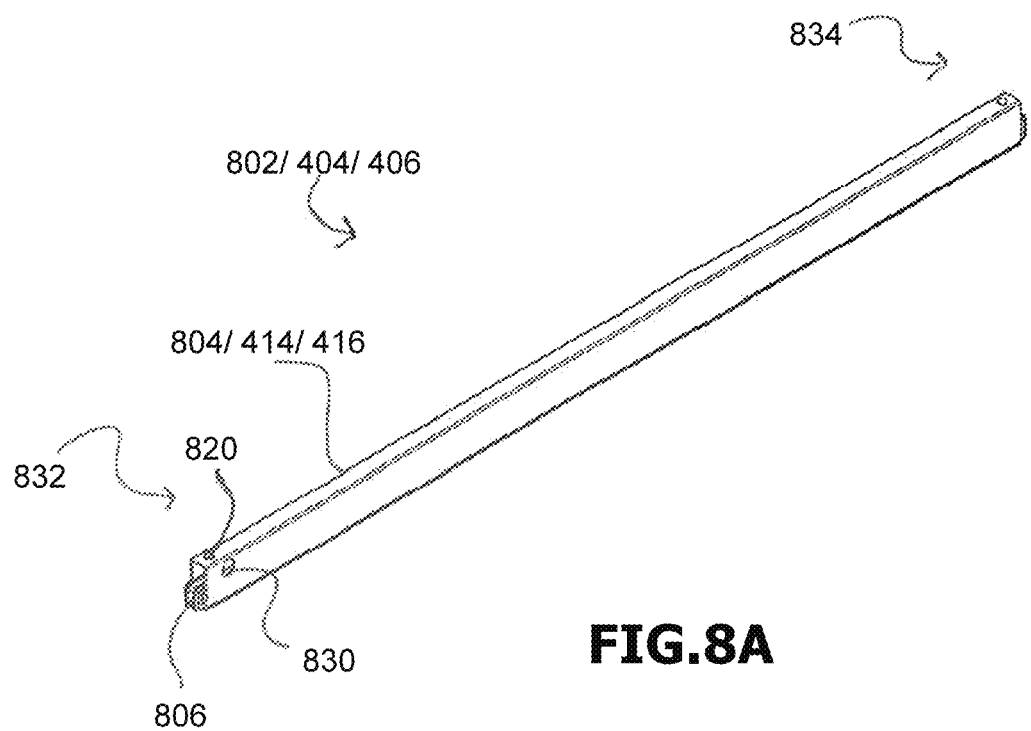
FIG.8A
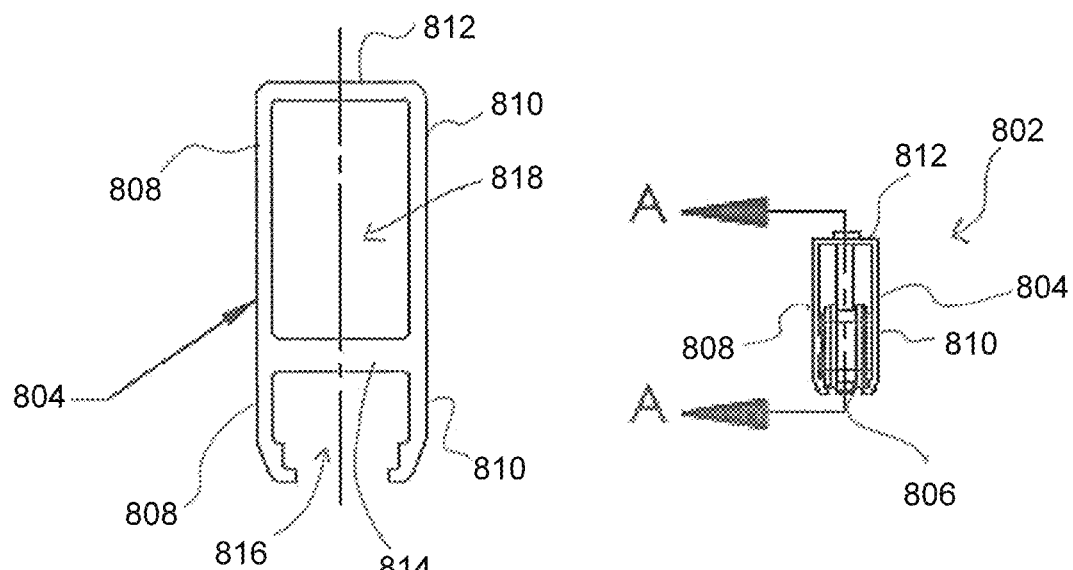
FIG.8B
FIG.8C

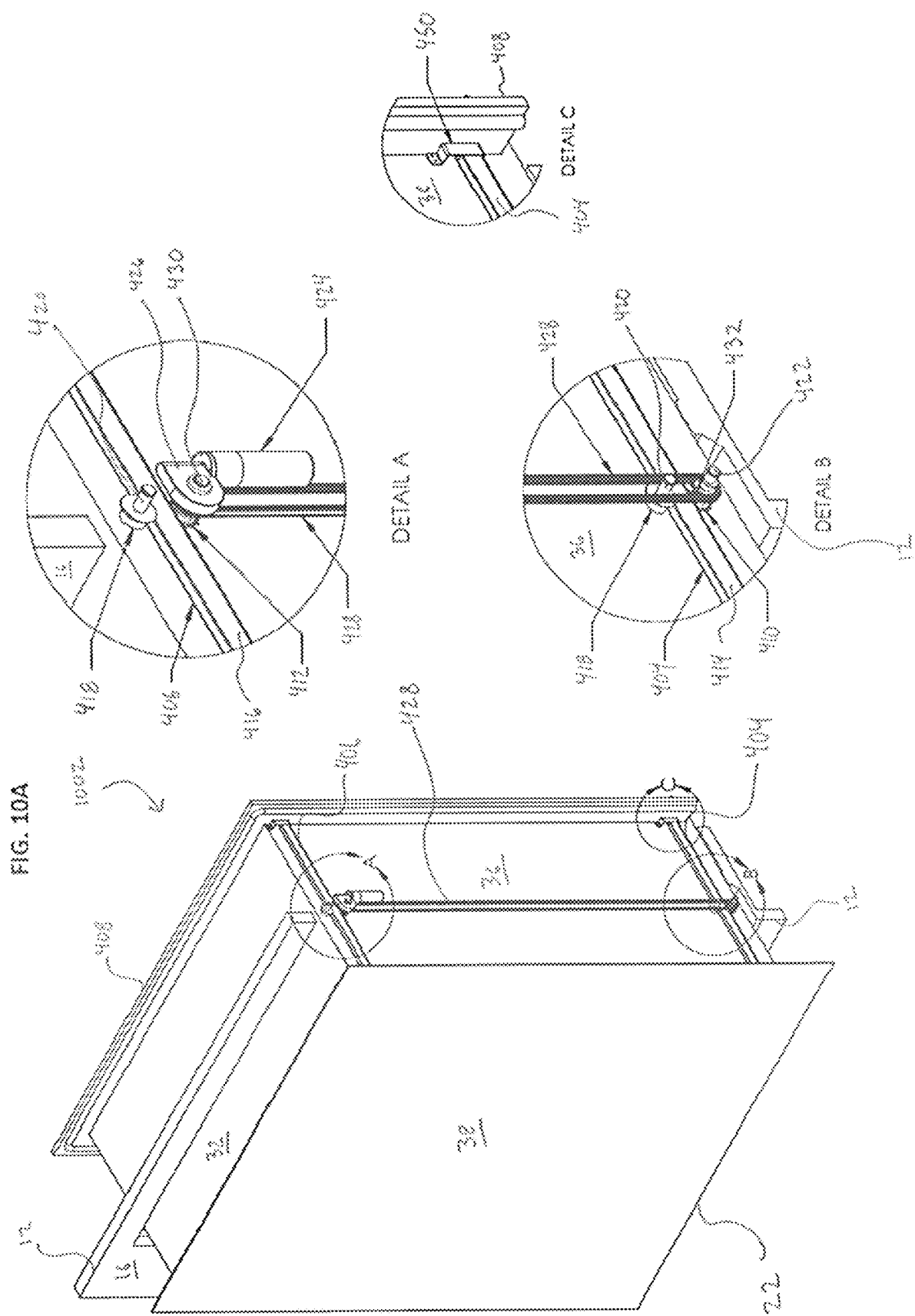

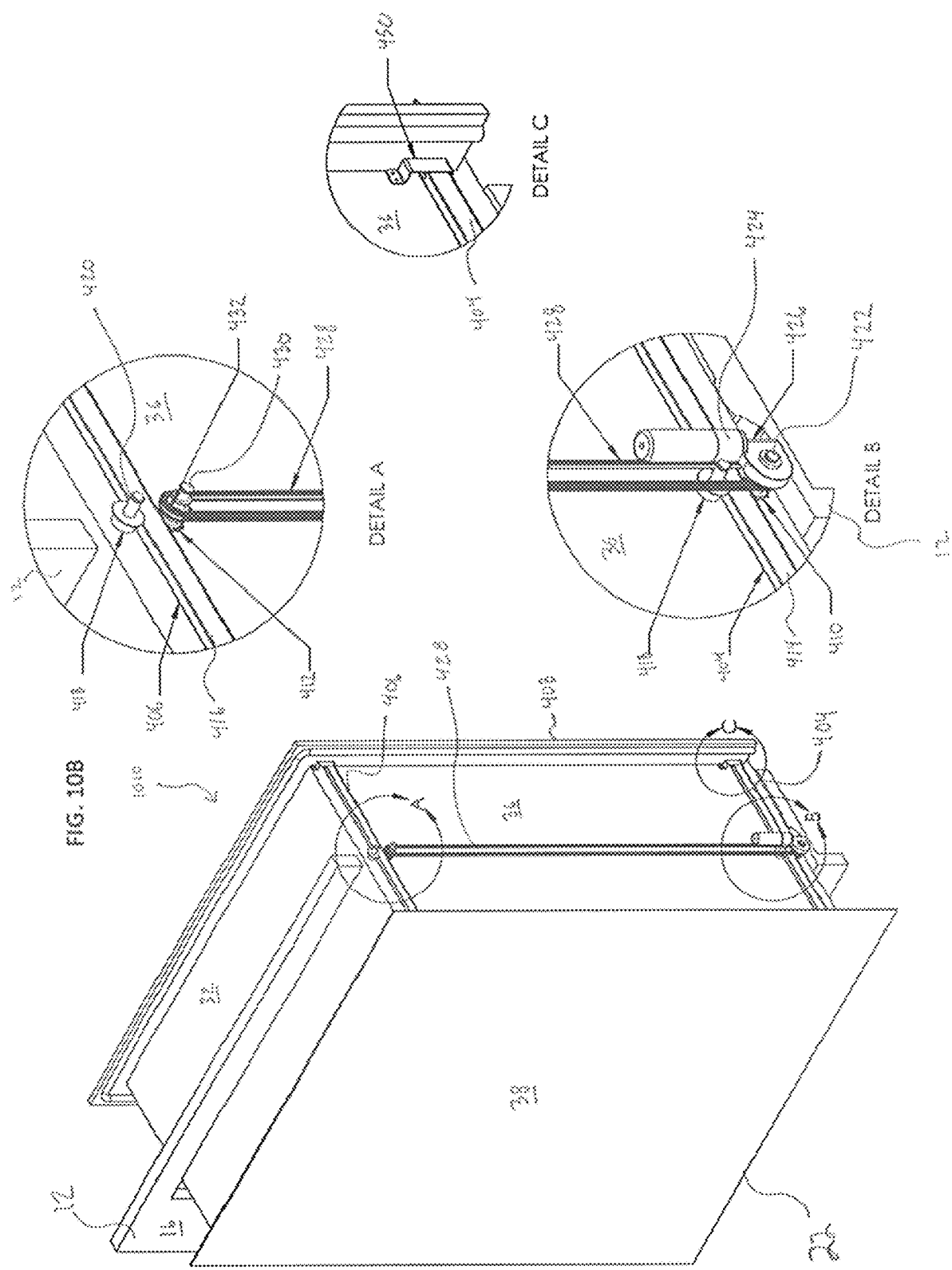

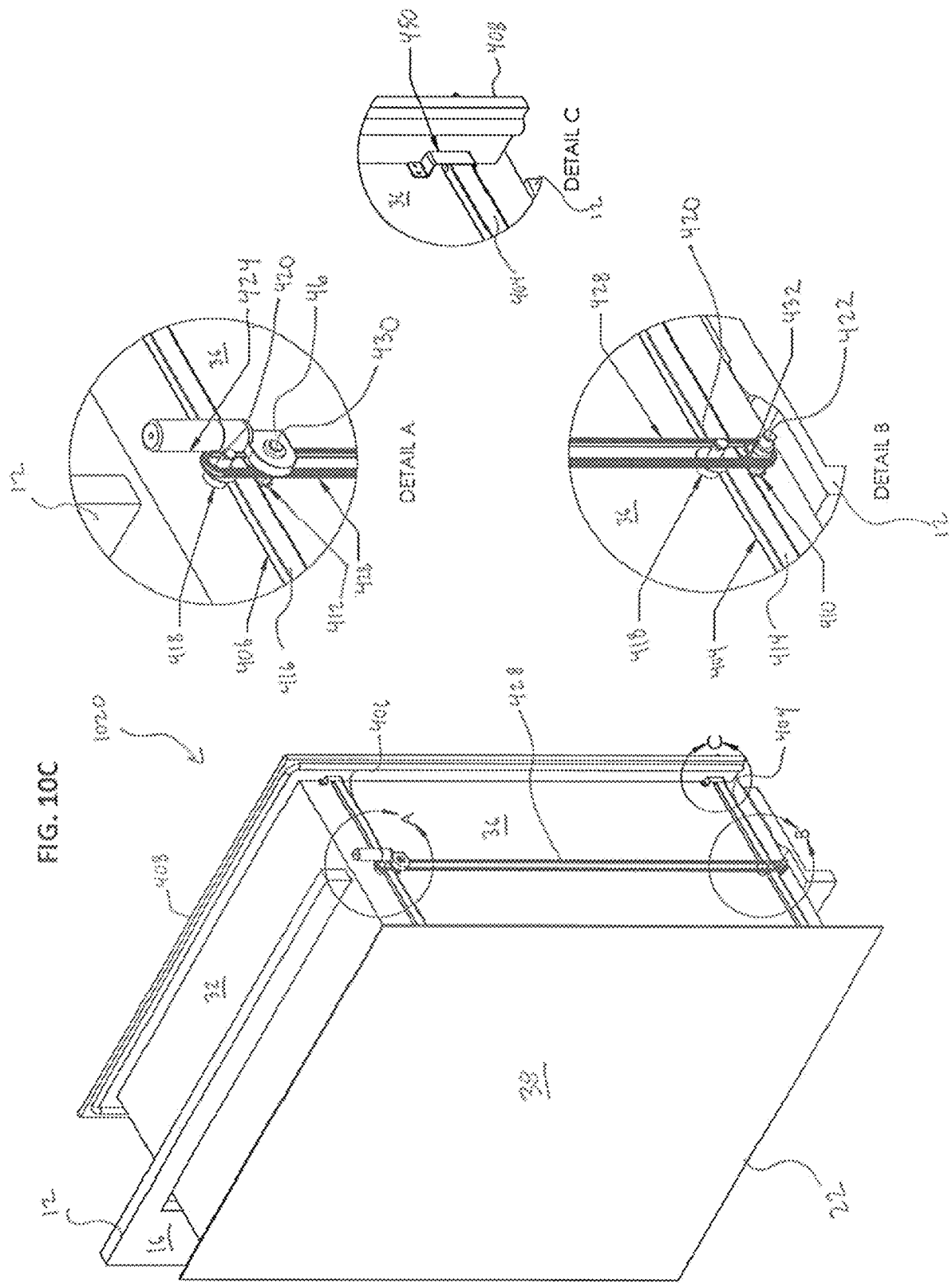

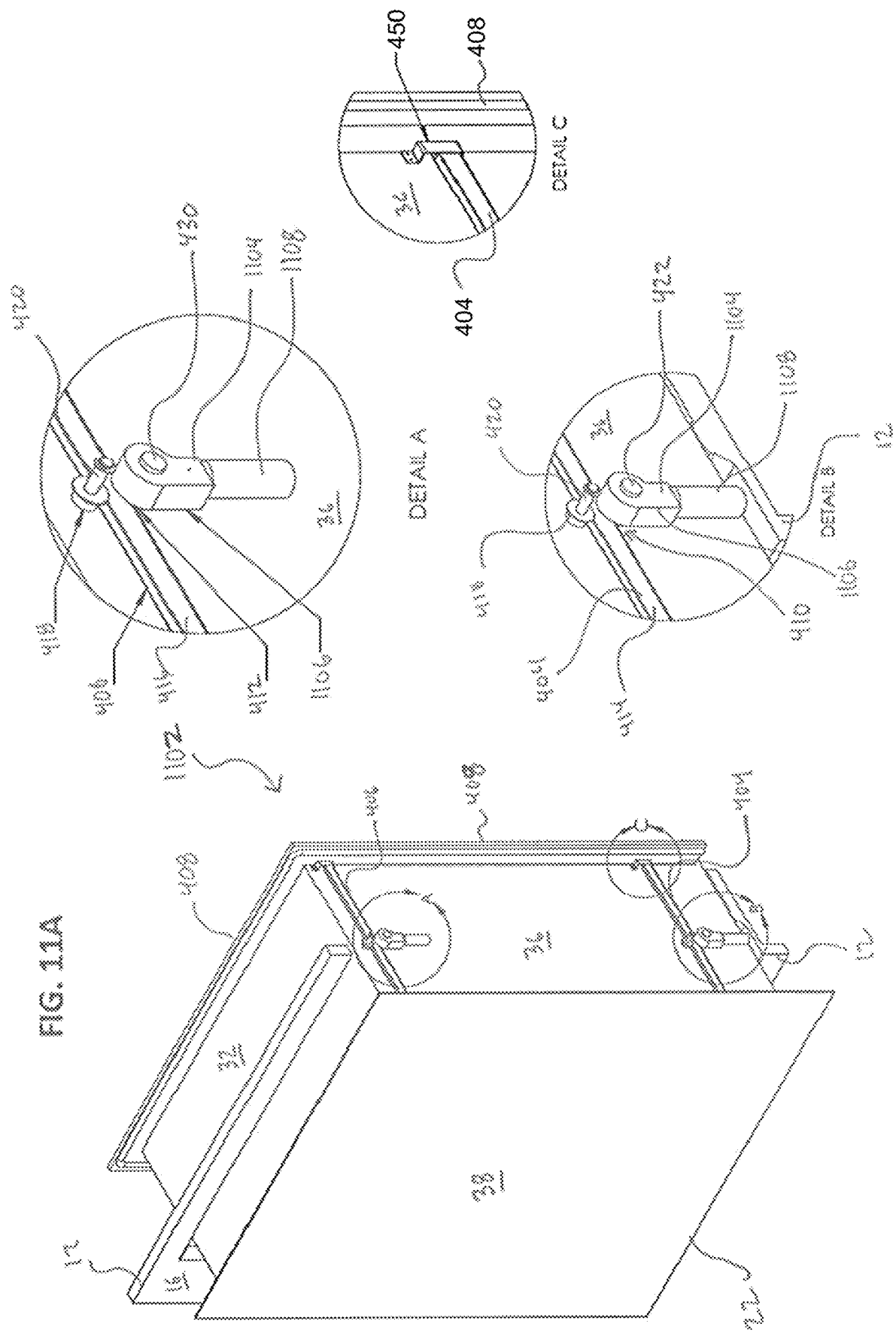

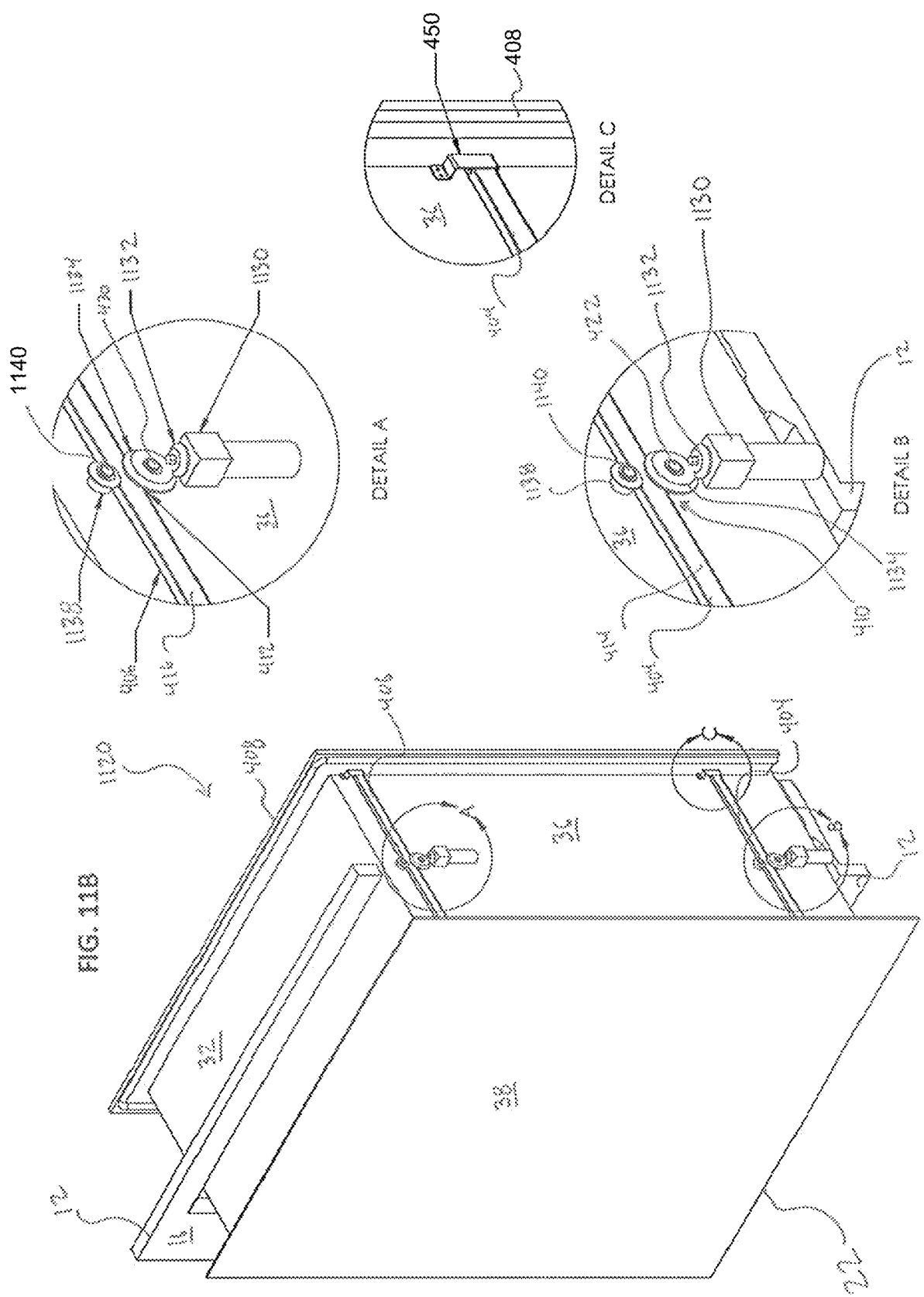

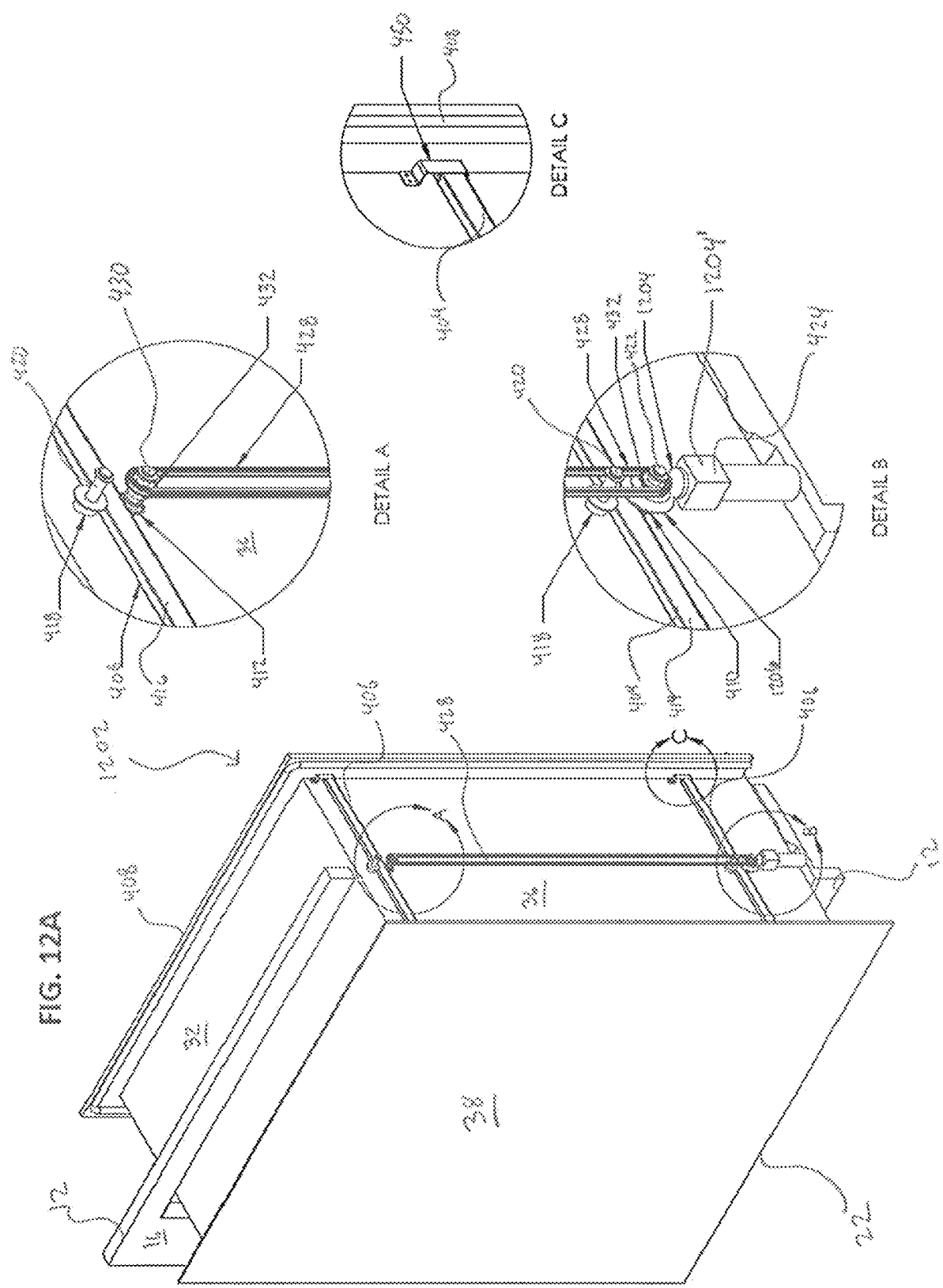

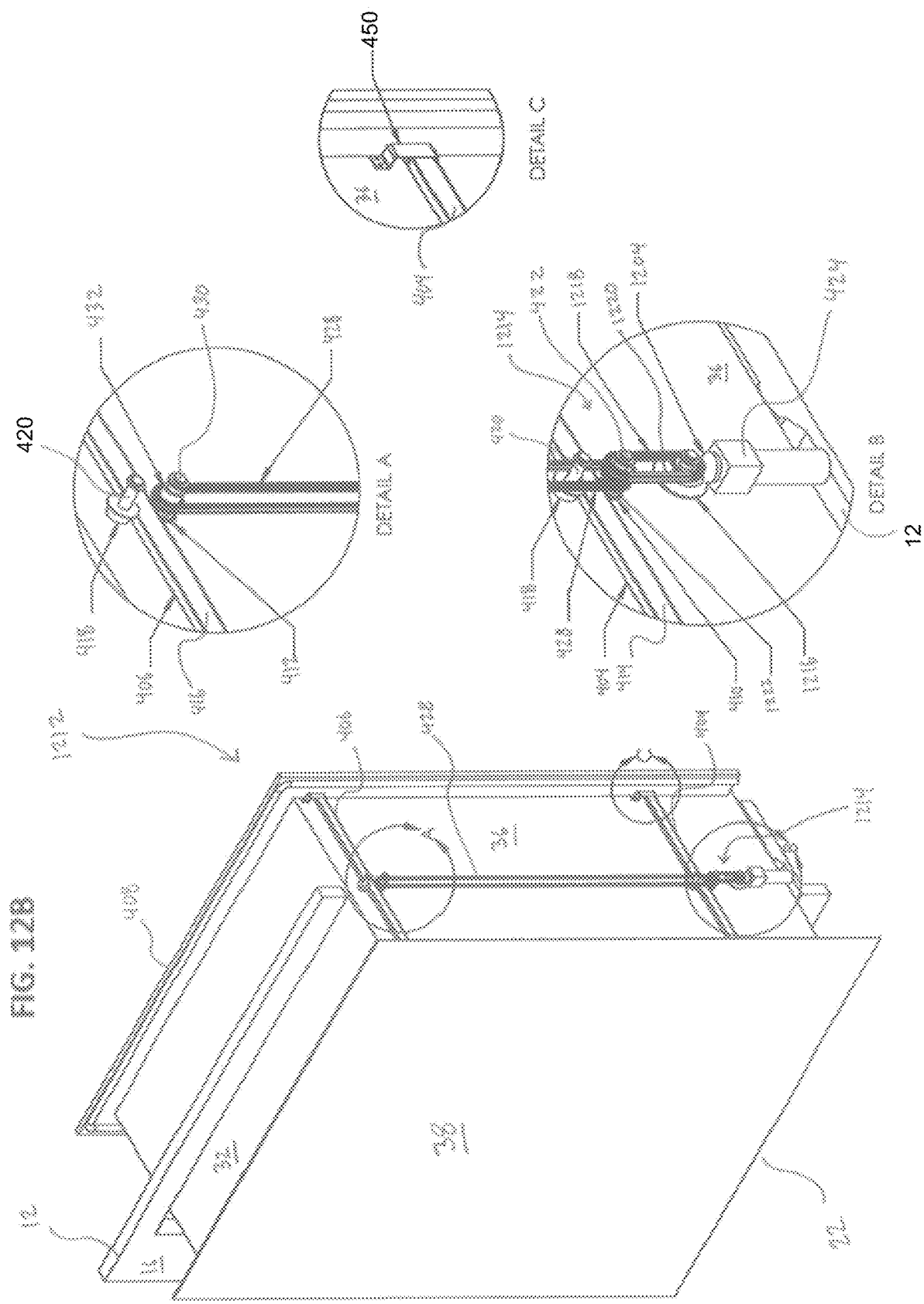

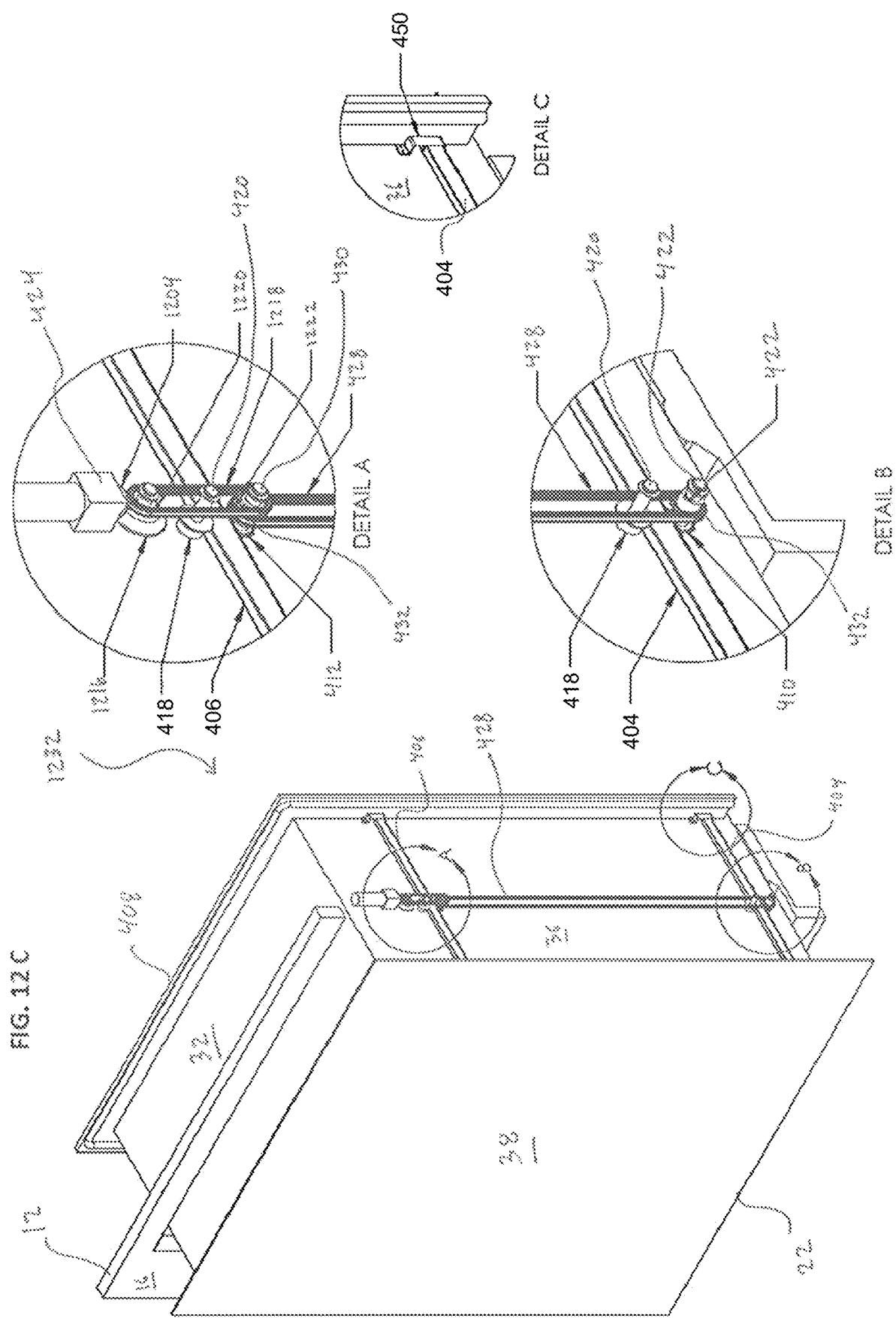

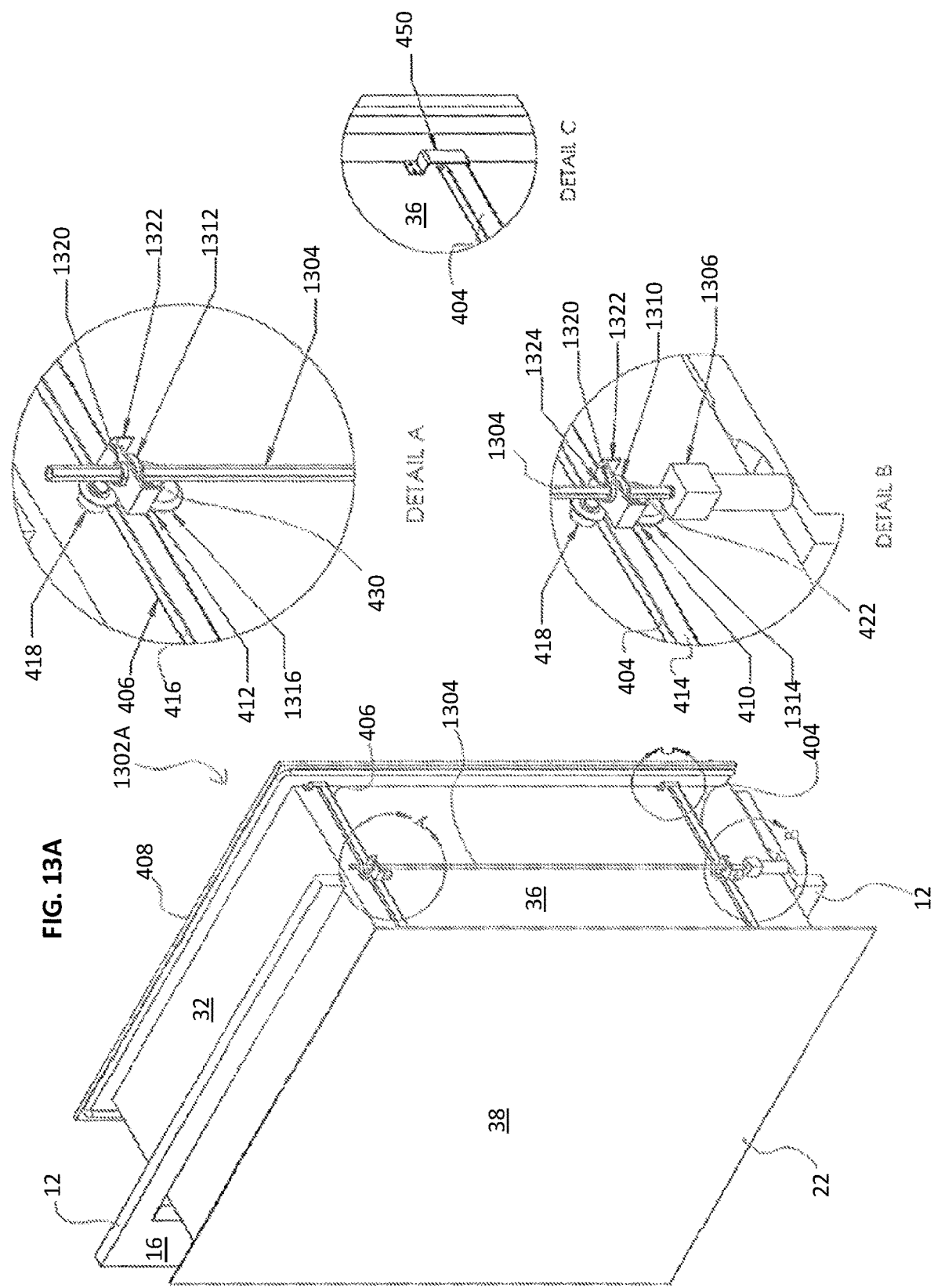

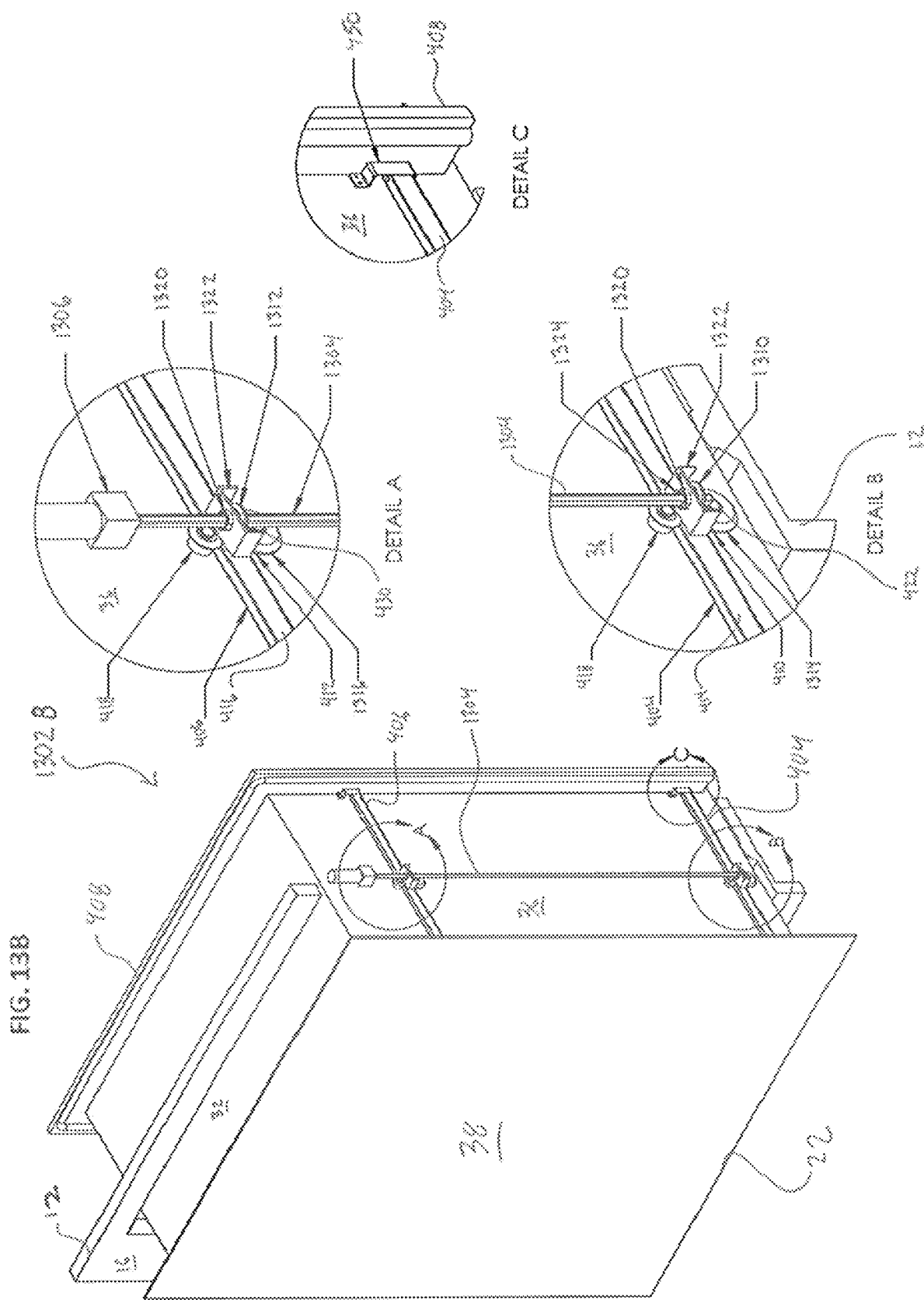

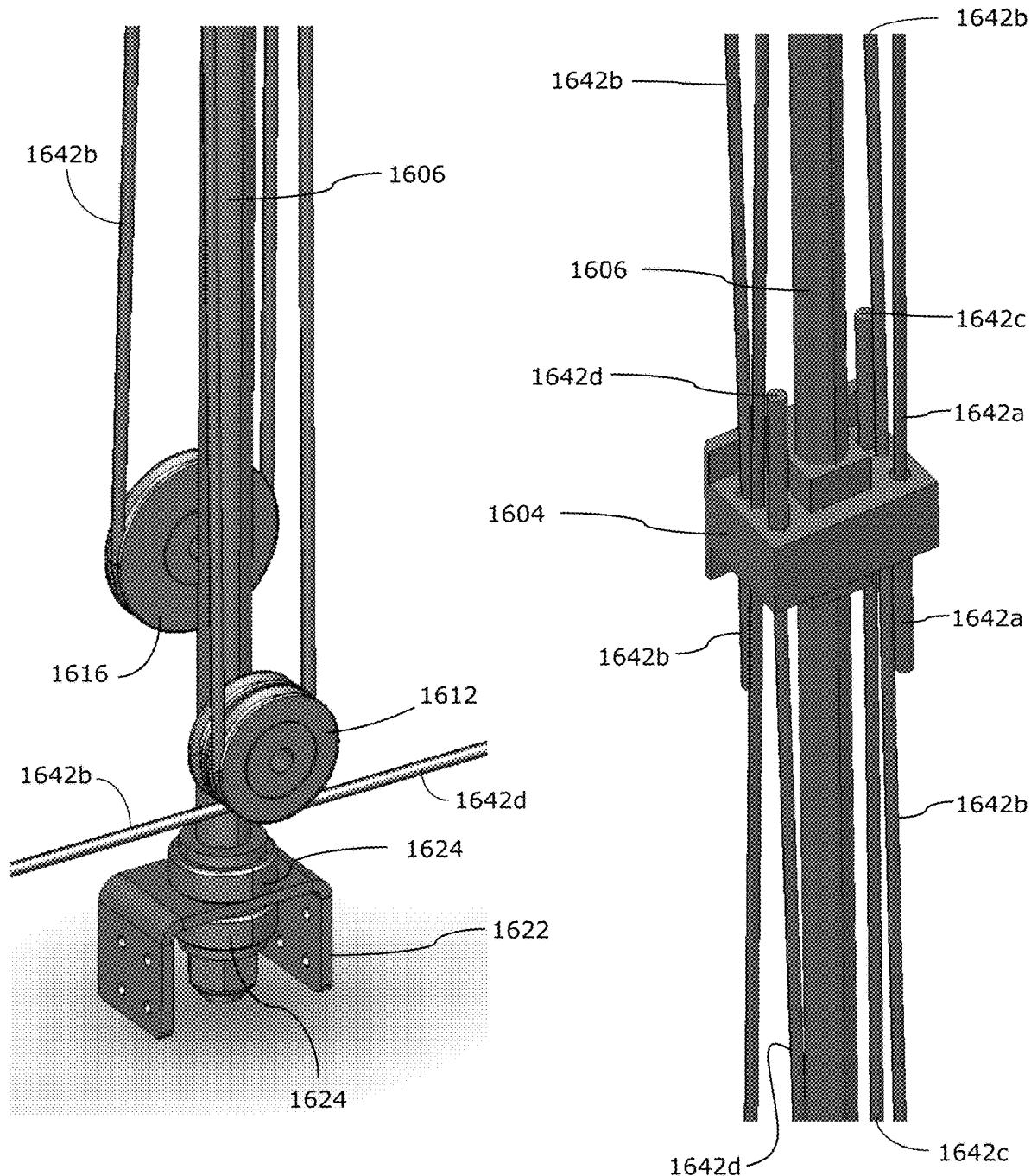

FIG. 21A
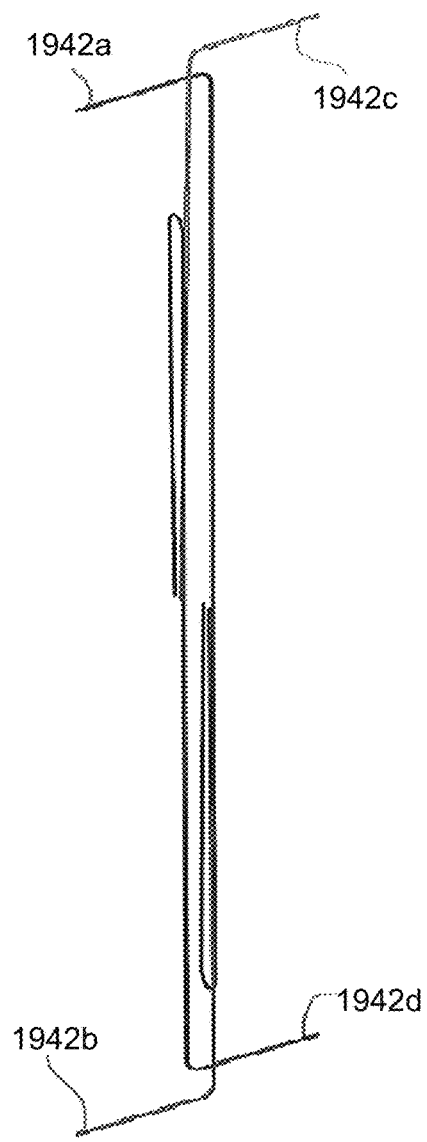
FIG. 21B
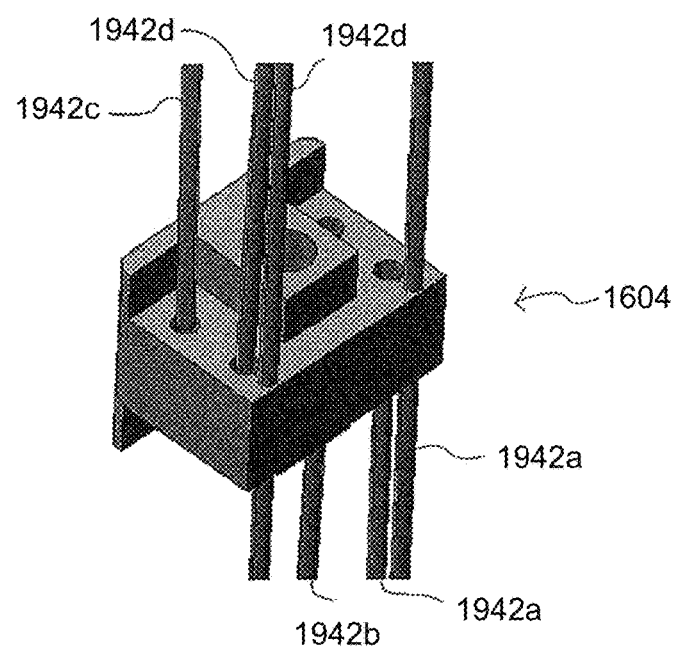
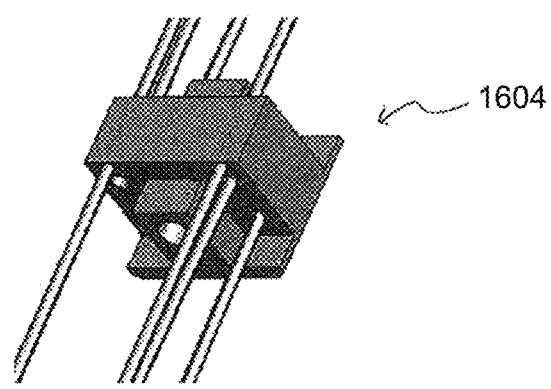
FIG. 21C

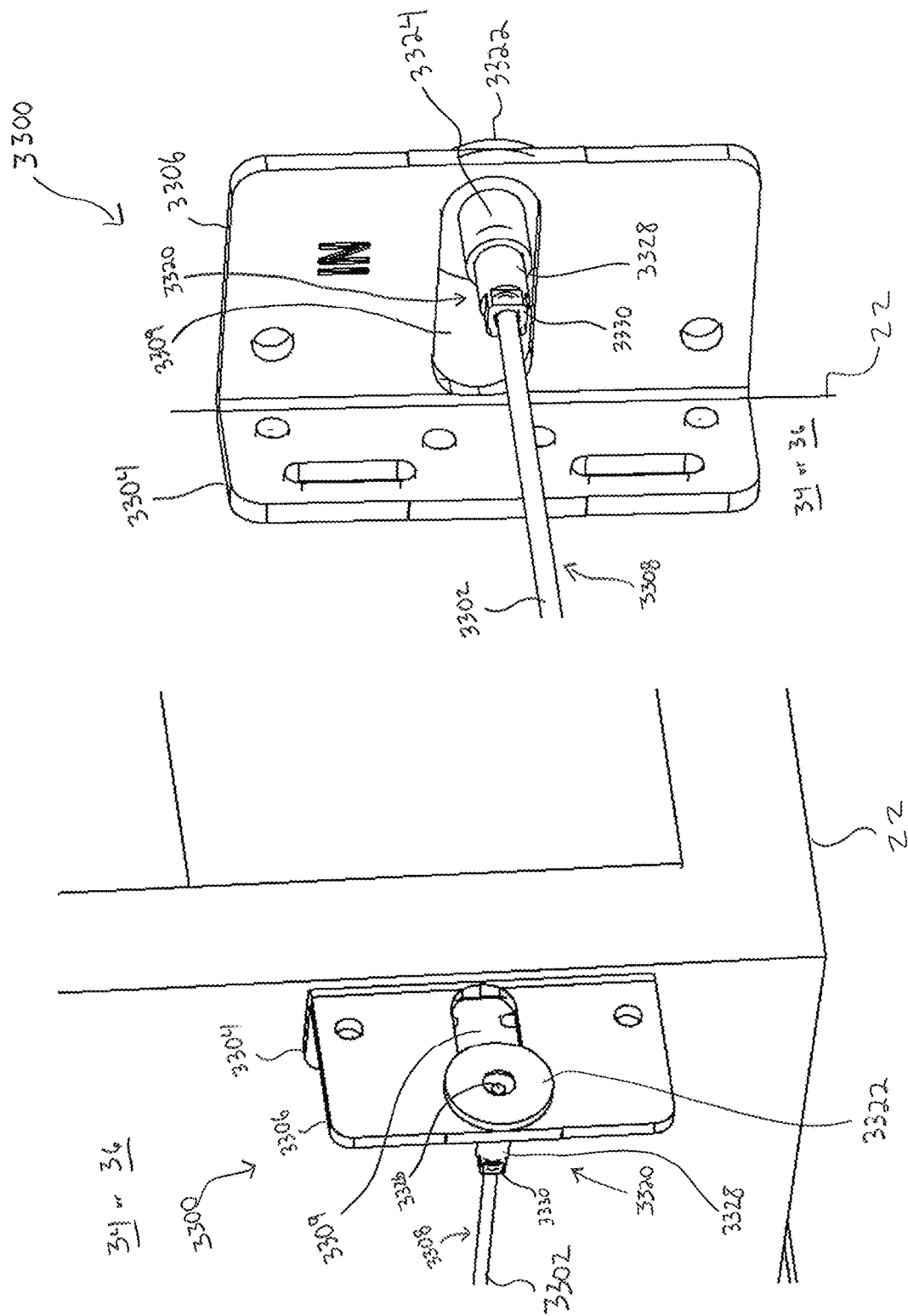

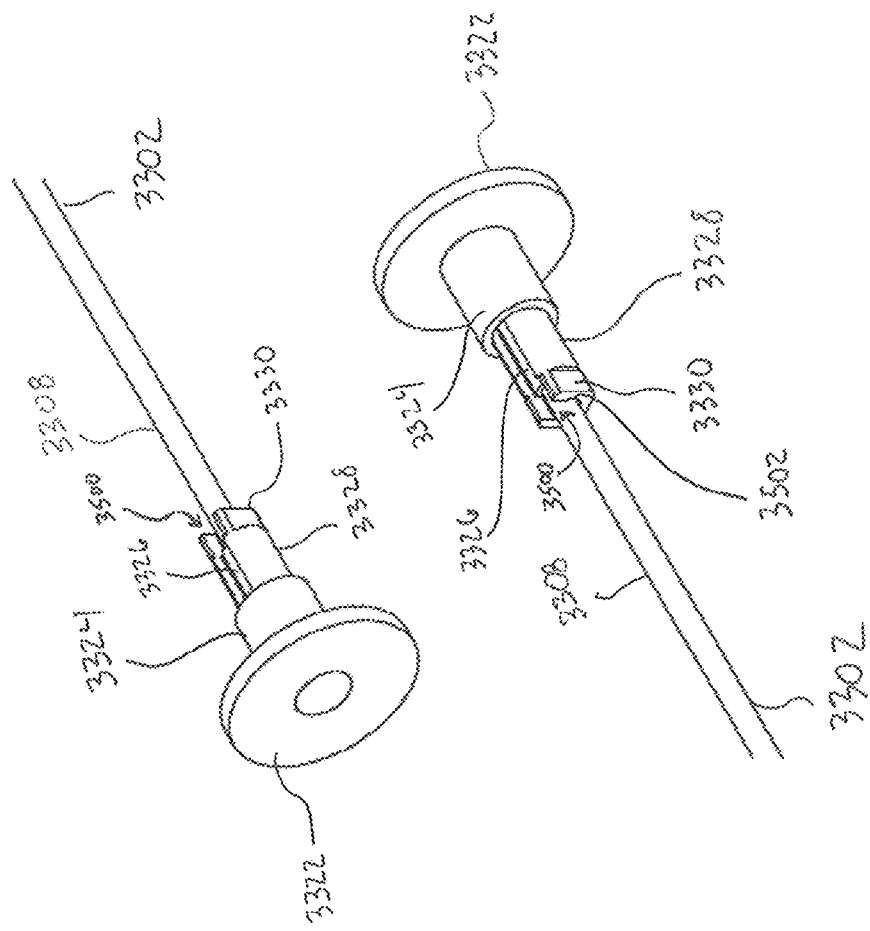
FIG. 34A
FIG. 35A
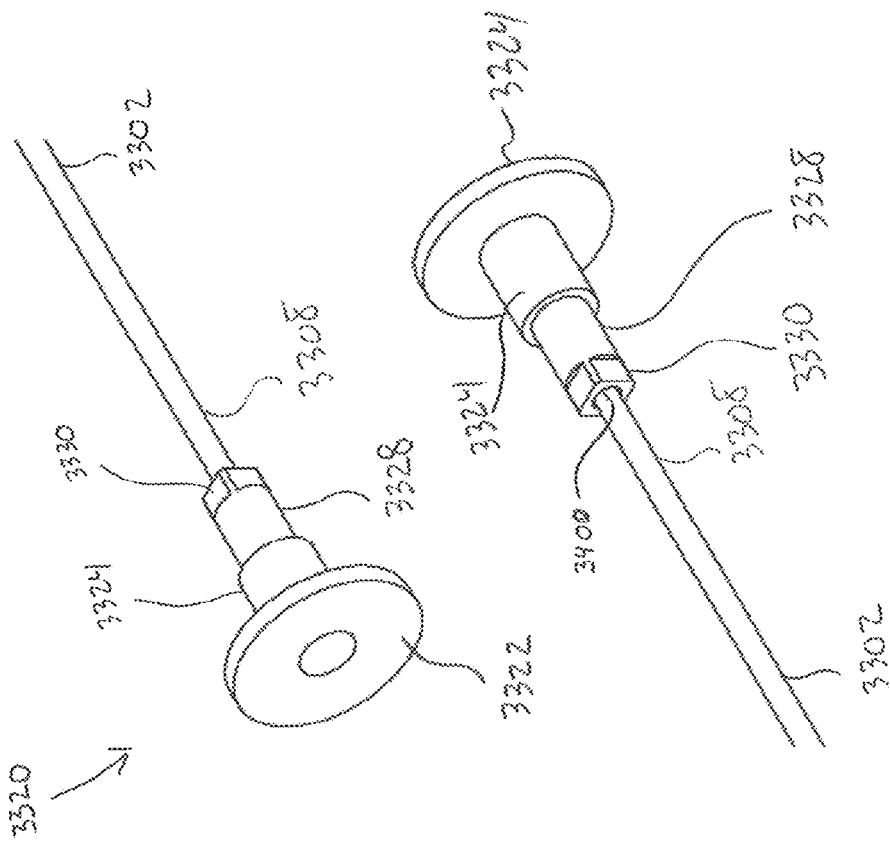
FIG. 34B
FIG. 35B

SLIDABLE ROOM ASSEMBLIES

CROSS-REFERENCE TO RELATED APPLICATION

This patent application claims priority to and the benefit of provisional patent application 62/732,330 filed on Sep. 17, 2018, and provisional patent application 62/858,712 filed on Jun. 7, 2019, both of which are incorporated by reference herein in their entirety, and this patent application is a continuation-in-part of U.S. patent application Ser. No. 16/136,528 filed on Sep. 20, 2018, which claims priority to provisional patent application 62/562,084 filed on Sep. 22, 2017, which is incorporated by reference herein in its entirety.

TECHNICAL FIELD

The disclosures herein relate in general to slidable room assemblies. More particularly, aspects herein relate to slidable room assemblies installed within vehicle jambs.

BACKGROUND

The present subject matter relates to a slidable room assembly, particularly to a slidable room assembly for a vehicle having a slide-out room or compartment that is retracted when the vehicle is in motion and may be extended to afford more room when the vehicle is parked. More particularly, this subject matter relates to a slidable room assembly that includes an improved mechanism for reciprocation of the slide-out unit relative to the vehicle.

Recreational vehicles, including motor homes, fifth wheel trailers and travel trailers may be provided with an extendible slide-out unit for increasing the vehicle's living space. This slide-out unit may be extended for use when the vehicle is parked and is retracted in a telescoping manner when the vehicle is to be moved.

Prior vehicle slide-out installations that include an extension/retraction system that relies on screws or a pinion for effecting telescoping movement of the slide-out unit relative to the vehicle are known. Screws, in particular, must be short for practical reasons, including the tendency of a longer screw to deflect so that the axis of the screw is not absolutely straight. This, of course, greatly impairs operability of the screw. Pinions must also be comparatively short for practical reasons, including excessive weight in a pinion of greater length. Since the amplitude of movement of the slide-out room or compartment can be no greater than the length of the screw or pinion, the amplitude of sliding movement, and hence the amount of additional space gained by the slide-out compartment, is limited.

Other types of slide-out installations for vehicles are also known. One such installation employs an endless cable that passes over one pair of pulleys supported by a main part of a mobile home and a second pair of pulleys mounted on sidewalls of an extension part of the mobile home to cause the extension part to reciprocate. Another slide-out installation shows an expanding caravan, which also includes a rotatable shaft and two types of cables wound there around. Rotation of the shaft in one direction causes one type of cable to wind as the other type unwinds, causing a sliding unit to reciprocate in one direction (say, outwardly) relative to the vehicle. Rotation of the shaft in the opposite direction causes the sliding unit to move in the opposite direction (say, inwardly relative to the vehicle).

A challenge with slidable room assemblies is that a slide-out room is cantilevered as it is extended. The outer end of the extended slide-out room tends to tip downwardly. This puts weight on the slide-out unit's operating mechanism. The cantilevered slide-out room also tends to be loose at the top and tight at the bottom. This puts weight on the slide-out mechanism, which, in turn, impairs slidability and also invites leakage.

Another challenge with presently known slide-out units is that they require modification of the vehicle's underframe, unless the slide-out unit is of small size. For example, it may sometimes be necessary to cut away a portion of the underframe in order to accommodate the operating mechanism of the slide-out unit. This impairs the ability of the underframe to support the vehicle by lessening the strength and rigidity of the underframe.

SUMMARY

The embodiments described herein.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 6A-6C illustrate side views of the slide-out drive assembly of FIG. 4 as it articulates a slide-out room from the retracted position to the extended position.

FIGS. 8A-8H are detailed views of the drive chain assemblies utilized with the slide-out drive assembly of FIG. 4, according to one or more embodiments.

FIGS. 10A-10C illustrate alternate embodiments of the slide-out drive assembly of FIG. 4.

FIGS. 11A-11B illustrate alternate embodiments of the slide-out drive assembly of FIG. 4 utilizing multiple motors.

FIGS. 12A-12C illustrate alternate embodiments of the slide-out drive assembly of FIG. 4 that include drive extension assemblies, according to one or more embodiments.

FIGS. 13A-13B illustrate alternate embodiments of the slide-out drive assembly of FIG. 4 that include timing shafts, according to one or more embodiments.

FIG. 17B illustrates a close up of a lower end of the jamb assembly of FIG. 16.

FIG. 17C illustrates a close up of a middle portion of the jamb assembly of FIG. 16.

FIG. 21A illustrates an exemplary routing of drive cables that may be utilized with the jamb assembly of FIG. 19.

FIG. 21B illustrates an upper side of an exemplary drive nut that may be utilized to organize the routing of drive cables illustrated in FIG. 21A.

FIG. 21C illustrates the lower side of the drive nut of FIG. 21B.

FIGS. 30A-30G, FIGS. 31A-31D, FIGS. 32A-32B, FIGS. 33A-33B, FIGS. 34A-34C, and FIGS. 35A-35C illustrate various means for adjusting tension in the drive chain and/or drive cables.

DETAILED DESCRIPTION

The present disclosure is related to slidable unit assemblies and, more particularly, to drive mechanisms for slide-out rooms and slide-out compartments for vehicles.

The embodiments described herein provide a slide-out unit (i.e., a slide-out room, a slide-out compartment, etc.) having a pair of synchronized drive mechanisms that are installed at opposing sides or walls of the room and each configured to drive the room at a top and a bottom corner thereof relative to the vehicle. In some embodiments, these synchronized drive mechanisms each include a jamb that houses a sprocket that drives a drive chain that is attached to a side of the slide-out unit. Other embodiments described herein provide a pair of synchronized drive mechanisms that utilize one or more gears and corresponding racks instead of the foregoing sprockets and corresponding drive chains. In even other embodiments described herein, a pair of synchronized drive mechanisms each include a jamb with a pair of sprockets provided therein, where a timing belt is arranged on the pair of sprockets within the jamb, and a plurality of drive cables are connected to the timing belt and extend from the jamb to connect to the room.

Figure 1:
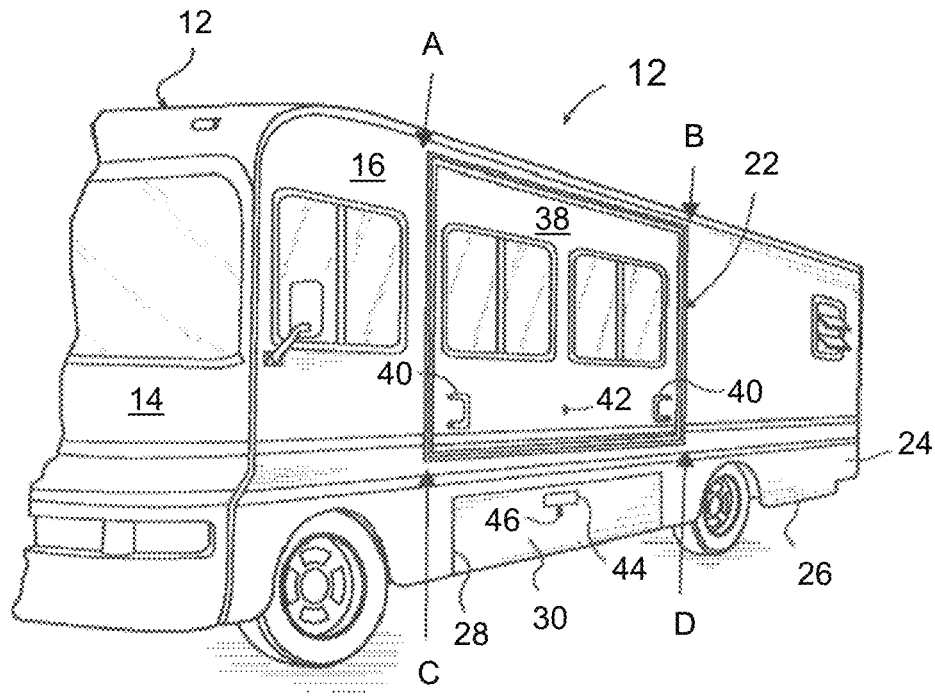
FIG. 1 is an isometric side view of an exemplary recreational vehicle having a slide-out unit in accordance with the present disclosure where the slide-out unit is in the retracted position.
Figure 2:
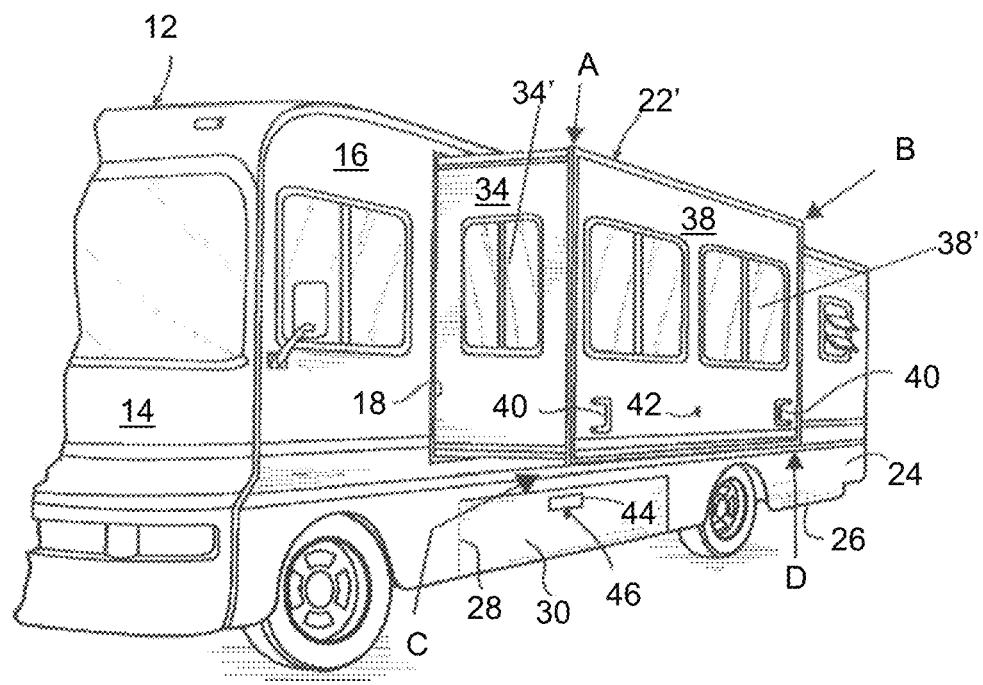
FIG. 2 is an isometric side view of the exemplary recreational vehicle of FIG. 1, illustrating the slide-out unit in the extended position.
Figure 3:
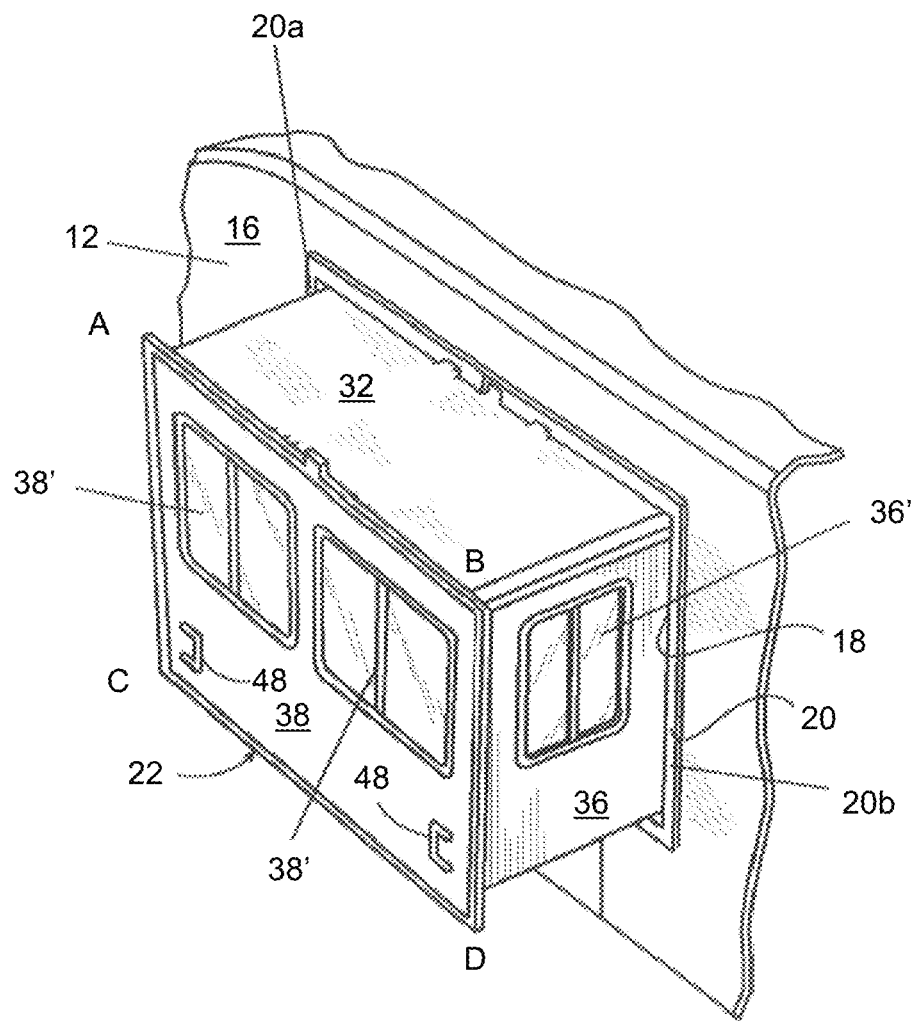
FIG. 3 is an isolated isometric top view of the exemplary slide-out unit of FIG. 2, illustrating the slide-out unit forming a room extension when in the extended position.

FIGS. 1-3 illustrate an example vehicle 10 that may incorporate the principles of the present disclosure. The depicted vehicle 10 is just one exemplary vehicle that may incorporate the principles of the present disclosure. Indeed, many alternative designs and configurations of the vehicle 10 may be employed without departing from the scope of this disclosure. For example, the vehicle 10 may be a motor home, a fifth wheel trailer, a travel trailer, a utility trailer, or various other types of recreational or non-recreational vehicles. In addition, the vehicle 10 may be one that is designed for living (e.g., as a house trailer) or one that may be designed for work (e.g., a mobile office or library). Accordingly, the vehicle 10 may be a self-powered vehicle or may be a trailer that is adapted to be towed, for example, by an automobile or a truck.

As illustrated, the vehicle 10 includes a body 12 and a slide-out room 22 that is configured to slide relative to the body 12 between a retracted position (FIG. 1) and an extended position (FIGS. 2-3). The body 12 defines an interior space (not shown) within which the occupants of the vehicle 10 may live and/or work, and this interior space may be expanded via one or more slide-out rooms and/or slide-out compartments, such as the slide-out room 22. While these figures illustrate the vehicle 10 having a single extendible slide-out room 22, in other embodiments, it may include more than one extendible slide-out rooms and/or compartments.

The vehicle body 12 may comprise a plurality of exterior walls, for example, a roof (obscured from view), a front wall 14, a left sidewall 16, a right sidewall (obscured from view), and a rear wall (obscured from view). Additionally, the interior of the vehicle body 12 also includes a floor (not shown). Beneath the floor is a conventional frame (not shown) for supporting the vehicle body 12, and that frame may be either a conventional or a nonconventional frame.

In the illustrated embodiments, the left sidewall 16 includes an opening 18 and a jamb 20. As illustrated, the jamb 20 extends along the vertical and horizontal edges of the opening 18 and receives the slide-out room 22. The opening 18 in the left side 16 of the vehicle body 12 may have any number of geometries depending upon the geometry of the slide-out room 22 and, in the illustrated embodiments, the opening 18 is rectangular and has a perimeter that includes horizontal top and bottom edges and vertical side edges. The jamb 20 is illustrated as being a rectangular structure continuously disposed along these edges, however, in other embodiments, the jamb 20 may include discrete jamb portions that each correspond to one or more of the foregoing edges.

As described below, the slide-out room 22 may be provided with an actuation system or drive mechanism that reciprocates it between the retracted and extended positions. In some embodiments, a portion of the drive mechanism is housed within the jamb 20. As illustrated, for example, the jamb 20 includes a left jamb 20a and a right jamb 20b that each houses a portion of the drive mechanism; however, in other embodiments, the drive mechanisms are differently housed, for example, in the bottom and/or top jamb portions. Thus, drive mechanisms may be provided in any or all of the left jamb 20a, the right jamb 20b, the bottom jamb, and/or the top jamb.

In some embodiments, the vehicle 10 may further include one or more additional or auxiliary slide-out compartments. As illustrated in FIGS. 1-2, the body 12 includes a lower portion or skirt 24 that is disposed below the floor of the vehicle 10 and which terminates in a lower edge 26; and, in such embodiments, slide-out compartments may be arranged within the skirt 24. Either or both of the left sidewall 16 and/or the right sidewall (obscured from view) may include an opening 28 for receiving an auxiliary slide-out unit and, in the illustrated embodiment, the left sidewall 16 includes a slide-out compartment 30. As will be appreciated, an actuating system or drive mechanism (not illustrated) is provided for reciprocating the slide-out compartment 30 between extended and retracted positions, and, in some embodiments, such drive mechanism is similar to that utilized to actuate the slide-out room 22. However, it will be appreciated that the drive mechanism of the slide-out compartment 30 may be smaller and less powerful in embodiments where the slide-out compartment 30 is lighter than the slide-out room 22. It will also be appreciated that there may be any number of such openings 28 equal to the number of the slide-out compartments 30, and that the openings 28 may be of any number of geometries depending on the geometry of the slide-out compartment 30. Moreover, the opening 28 (or any of them) may be located at various locations about the body 12 and, in the illustrated embodiment, the opening 28 is disposed along the lower edge 26 of the left sidewall 16.

The vehicle 10 may have various arrangements of slide-out rooms and/or compartments. In the illustrated embodiments, for example, the vehicle 10 includes one extendible slide-out room 22 and one extendible slide-out compartment 30. In other non-illustrated embodiments, the vehicle 10 may include two or more of the slide-out rooms 22 and/or two or more slide-out compartments 30. However, it will also be appreciated that the vehicle 10 may include one or more slide-out rooms 22 without any slide-out compartments 30, and vice versa. Regardless of the exact configuration, it will be appreciated that the slide-out rooms and compartments 22,30 should always be retracted when the vehicle 10 is in motion. And, when the vehicle 10 is parked or stationary, the slide-out room 22 may be articulated into its extended position (FIGS. 2 and 3) to afford additional space within the interior of the vehicle 10. Similarly, the slide-out compartment 30 may be actuated when the vehicle 10 is at rest.

As illustrated, the slide-out room 22 may generally have the same cross-sectional shape as the opening 18 in the vehicle body 12; and, while the same may be true of the slide-out compartment 30 and the opening 28, the remainder of this disclosure is made with reference to the slide-out room 22. In the illustrated embodiments, the slide-out room 22 includes a floor (obscured in figures), a ceiling 32, a left sidewall 34 and a right sidewall 36 (as viewed from the exterior of the vehicle 10 looking in), and a forward or outside wall 38. In some embodiments, the slide-out room 22 may include one or more windows arranged on any of the ceiling 32, the left sidewall 34 and/or the right sidewall 36, and/or the outside wall 38. For example, the slide-out room 22 is illustrated as including a left and right window 34',36' on the left and right sidewalls 34,36, respectively, as well as a front window 38' on the outside wall 38. For reference, the four corners of the slide-out room 22 are referenced using letters A, B, C, and D, as shown in FIGS. 1-3.

As illustrated, the outside wall 38 of the slide-out room 22 is substantially coplanar or flush with (but may be spaced slightly outward from) the left sidewall 16 of the vehicle body 12 when the slide-out room 22 is retracted (FIG. 1), and is parallel to and spaced outwardly from the left sidewall 16 of the vehicle body 12 when the slide-out room 22 is extended (FIG. 2). In addition, the right sidewall 36 is disposed in a rearward direction of the vehicle body 12, and the left sidewall 34 is disposed in a forward direction of the vehicle body 12. The spacing between the left and right sidewalls 34,36 is slightly less than a width of the opening 18 in the vehicle body 12, which affords enough clearance for sliding movement of the slide-out room 22 while minimizing the intrusion of the elements into the vehicle body 12 such as wind and rain. As will be appreciated, the size of the outside wall 38 may be slightly greater than the size of the opening 18 (with the jamb 20) in the vehicle body 12 so that the edges of the outside wall 38 overlie the vehicle body 12 as an aid in maintaining an effective seal when the slide-out room 22 is retracted. In addition, one or more seals (not shown) may be provided around the perimeter of the opening 18 in a similar fashion to provide an effective means for sealing the slide-out compartment 30 when retracted within the vehicle body 12.

In certain embodiments, for example, where manual operation and/or manual servicing is desired, one or more handles 40 may be provided on the front wall of the slide-out room 22, so that the slide-out room 22 may be opened and closed manually. In at least some of these embodiments, a lock 42 may be provided to selectively secure the slide-out room 22. Moreover, the lock 42 may be provided in addition to the functioning of the actuation system or drive mechanism (detailed below) to lock the slide-out room 22 in position when it is at rest (whether retracted, extended or in-between). Similarly, the slide-out compartment 30 may be provided with a handle 44 for manual operation and a lock 46, as detailed with reference to the slide-out room 22.

In the illustrated embodiments, however, the slide-out room 22 is driven with a slide-out drive assembly that transmits force to the slide-out room 22 resulting in smooth, even actuation of the slide-out room 22 along its predetermined path, with no tendency to twist or bind and with minimum power input. In these embodiments, the slide-out drive assembly transmits force evenly to the opposing left and right sidewalls 34,36 of the slide-out room 22, whereas in other embodiments force may be transmitted to either or both of the ceiling 32 and/or the floor (not shown) of the slide-out room 22. In even other embodiments, the slide-out drive assembly may transmit force evenly to the opposing left and right sidewalls 34,36 and either or both of the ceiling 32 and/or the floor of the slide-out room 22.

Figure 4:
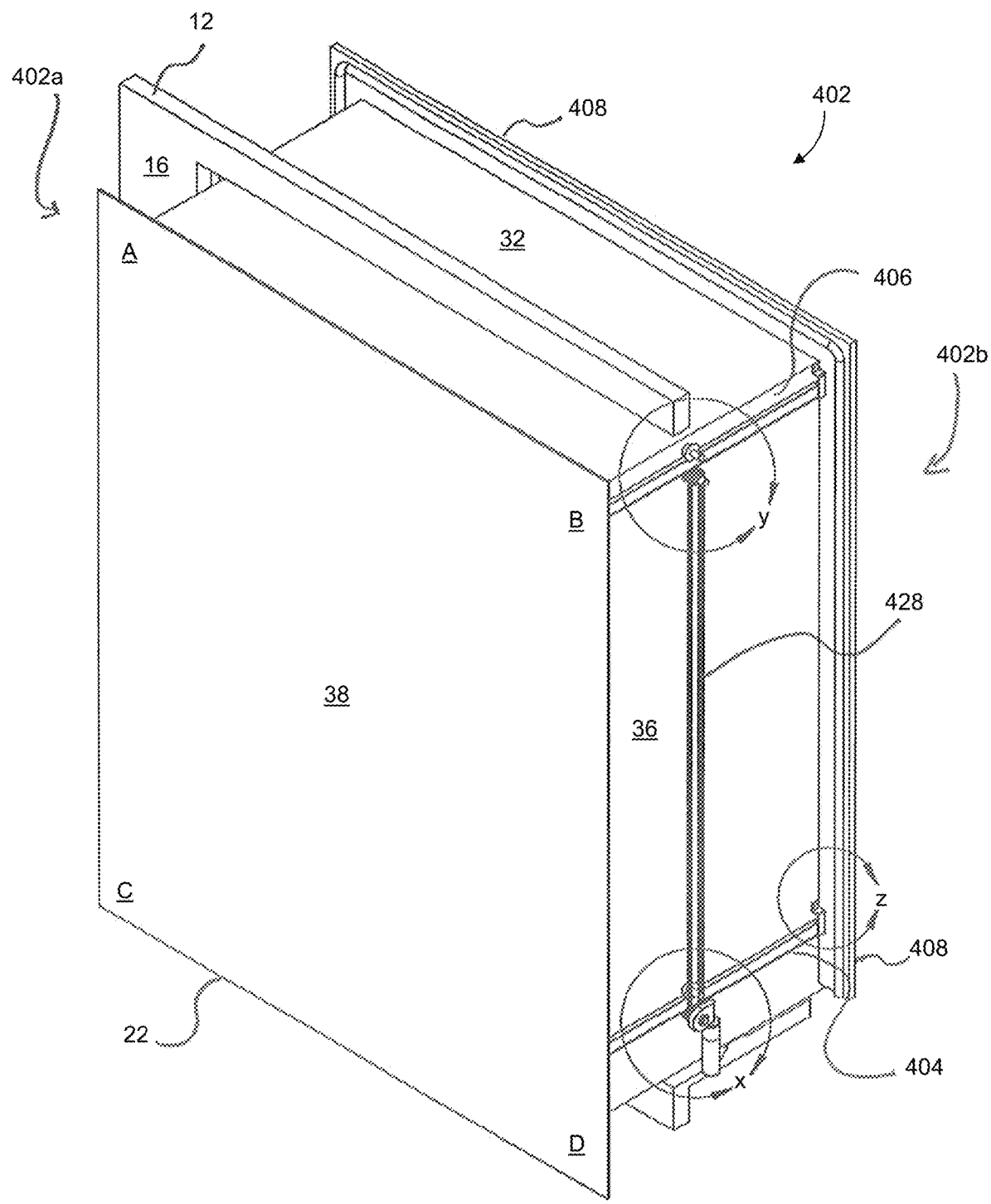
FIG. 4 is an isometric side view illustrating certain aspects of an exemplary slide-out drive assembly, according to one or more embodiments.

One example drive assembly is illustrated in FIG. 4, and this exemplary slide-out drive assembly generally includes drive mechanism elements (e.g., drive chains and drive sprockets) and timing mechanism elements (e.g., timing chains, timing sprockets, etc.); however, the drive assembly may be configured differently as hereinafter described with reference to FIGS. 10-13 and/or with reference to FIGS. 14-35. For example, the drive mechanism elements of the slide-out drive assembly may include pinion and rack gears instead of chains and sprockets, or the drive mechanism elements of the slide-out drive assembly may include drive cables. And, as will be appreciated with reference to FIGS. 7A-7H, these drive mechanism elements and timing mechanism elements are at least partially arrangeable within one or more jambs/housings (not illustrated in FIGS. 4-6) that are secured to the vehicle body 12, for example, the interior of the left and right jambs 20a,b that are secured to the left sidewall 16.

FIG. 4 is an isometric side view of an exemplary slide-out drive assembly 402 according to one or more embodiments of the present disclosure. More specifically, FIG. 4 illustrates a right side 402b of the exemplary slide-out drive assembly 402 engaging and transmitting force to the right sidewall 36 of the slide-out room 22, but without the right jamb 20b that may be included to house certain components of the slide-out drive assembly 402 and secure the same to the vehicle body 12. It will be appreciated, however, that a left side slide-out drive assembly 402a (not illustrated) may be similarly arranged on the left sidewall 34 of the slide-out room 22 to ensure even and uniform actuation along the opposing left and right sidewalls 34,36 of the slide-out room 22.

Figure 5A:
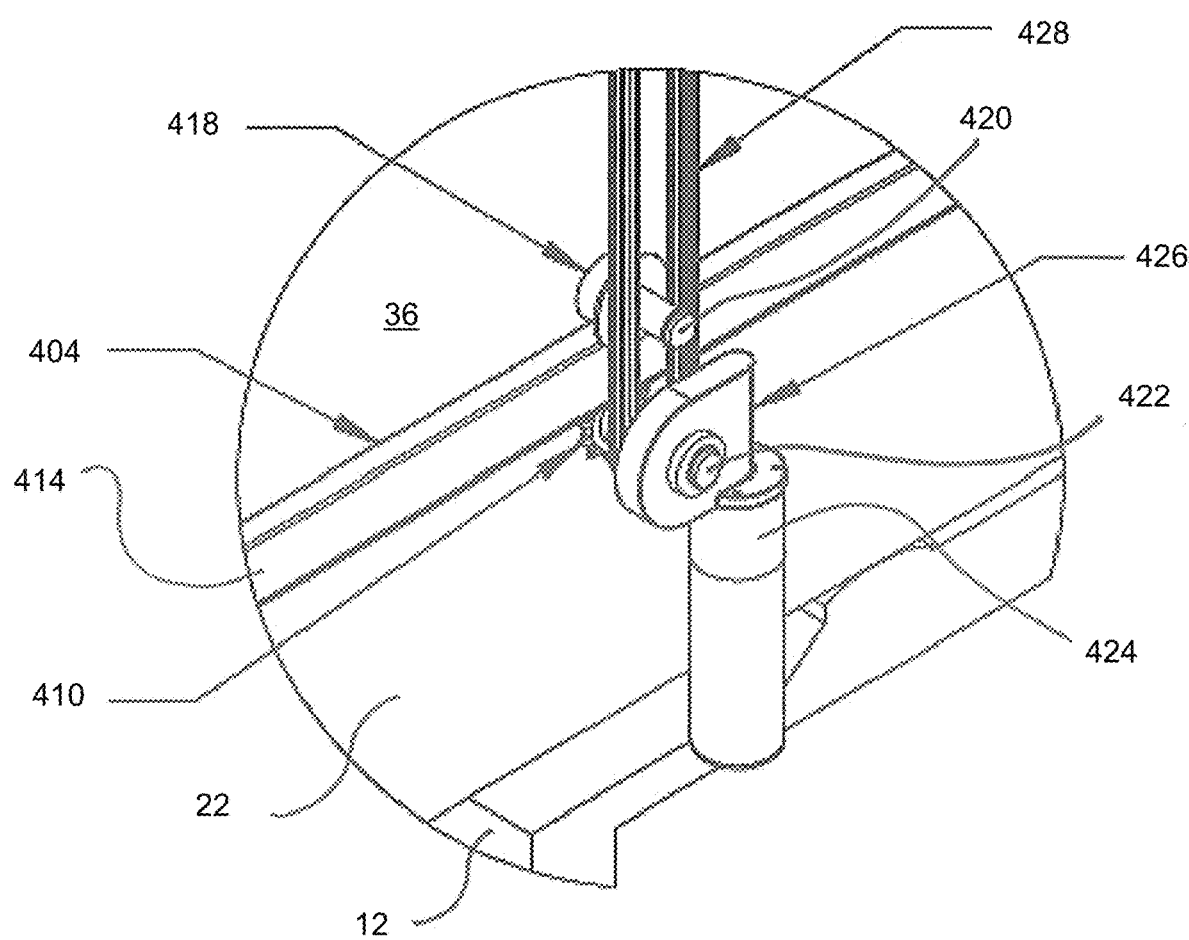
FIG. 5A is a close up isometric view of a first area identified as area X in FIG. 4.

As illustrated in FIG. 4, the right side slide-out drive assembly 402b includes a pair of drive members configured as a pair of drive chain assemblies 404,406 that are installed at vertically spaced locations along the right sidewall 36 of the slide-out room 22. The drive chain assembly 404 is installed along a lower portion of the slide-out room 22, between the outside wall 38 and a rear frame 408 of the slide-out room 22, and is engaged or driven as illustrated in FIG. 5A. Accordingly, the drive chain assembly 404 is said to correspond with corner D of the slide-out room 22, and the length that the drive chain assembly 404 extends (together with the other drive chain assemblies) generally defines the amount of extension that a slide-out unit may exhibit in a particular application. The drive chain assembly 404 is engaged or driven at a first area X (which has been enlarged in FIG. 5A). The drive chain assembly 406 is similarly arranged, except that it is installed along an upper portion of the right sidewall 36 (between the outside wall 38 and the rear frame 408) and is thus said to correspond with the corner B of the slide-out room 22. Thus, the drive chain assembly 406 is engaged or driven at a second area Y (which has been enlarged in FIG. 5B). In addition, FIG. 4 shows the drive chain assemblies 404,406 being constrained or slidingly attached to the right sidewall 36, for example, as illustrated with the drive chain assembly 404 being attached thereto to a third area Z (which has been enlarged in FIG. 5C). It will be appreciated that the drive chain assembly 406 may be similarly configured as illustrated with respect to the drive chain assembly 404 in FIG. 5C. And, while not illustrated, it will be appreciated that the left side slide-out drive assembly 402a may include similarly arranged drive chain assemblies disposed along the left sidewall 34 so as to correspond with the corners C,A of the slide-out room 22. The drive chain assemblies, such as the drive chain assemblies 404,406, are further described below, for example, with reference to FIGS. 8A-8H.

Figure 5B:
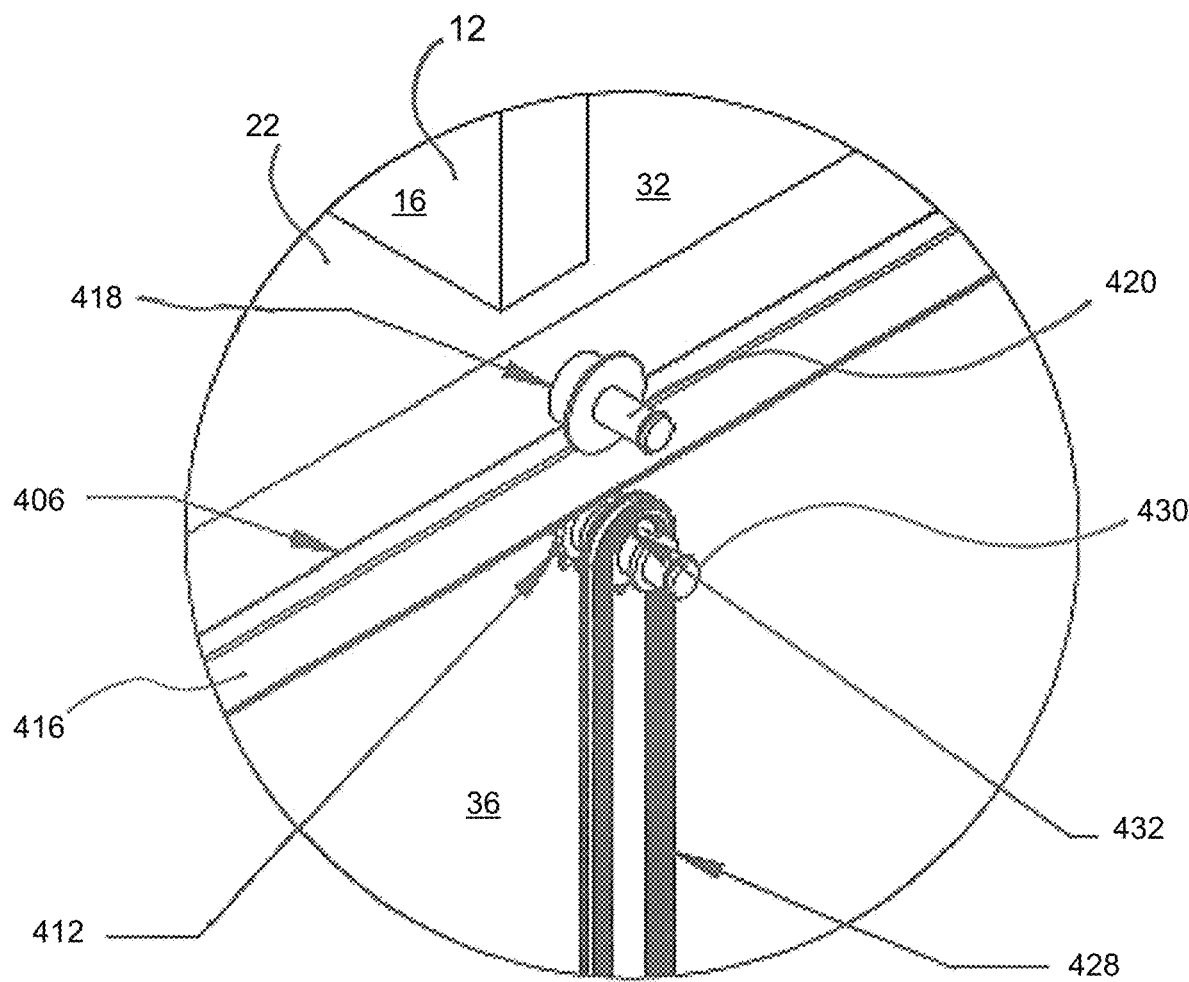
FIG. 5B is a close up isometric view of a second area identified as area Y in FIG. 4.

As illustrated in FIGS. 5A-5B, the right side slide-out drive assembly 402b includes a pair of drive chain sprockets 410,412 that engage the drive chain assemblies 404,406, respectively. Here, the drive chain sprocket 410 is a lower drive chain sprocket and the drive chain sprocket 412 is an upper drive train sprocket. More specifically, the drive chain sprocket 410 engages a lower drive chain (obscured; see, for example, FIGS. 8A and 8C) that is set within a channel member 414 of the (lower) drive chain assembly 404, whereas the drive chain sprocket 412 engages an upper drive chain (obscured; see, for example, FIGS. 8A and 8C) that is set within a channel member 416 of the (upper) drive chain assembly 406. It will be appreciated that, as the drive chain sprockets 410,412 may each engage their respective drive chain (not shown) from beneath, the channel members 414,416 may be supported from above by a respective roller member 418 extending from a roller shaft 420. In particular, FIG. 5A illustrates the engagement of the drive chain assembly 404 between the drive chain sprocket 410 and the first roller member 418, and FIG. 5B illustrates the engagement of the second drive chain assembly 406 between the second drive chain sprocket 412 and the second roller member 418. Where utilized, either or both of the roller members may be connected to the drive chain assemblies 404,406, for example, via their respective roller shaft 420.

As illustrated in FIG. 5A, the drive chain sprocket 410 is disposed on a drive shaft 422 that is actuated by a motor 424 such that the drive chain sprocket 410 rotates with the drive shaft 422. In the illustrated embodiment, a gear box 426 is utilized to transfer power (i.e., torque) from an output shaft (not shown) of the motor 424 to the drive shaft 422 that rotates the drive chain sprocket 410. In this example, the gear box 426 is a worm gear box; however, it will be appreciated that other gear boxes may be utilized, for example, bevel gear boxes. In addition, while various types of actuators or motors may be utilized, in at least some embodiments, the motor 424 is either a self-locking worm drive or a planetary gear motor with an electric brake. Also in the illustrated embodiment, each side 402a,b of the slide-out drive assembly 402 includes an actuator, such as the motor 424. In such embodiments that utilize more than one actuator or motor, the actuators or motors may be synchronized with each other to ensure even and uniform articulation at all sides/corners of the slide-out room 22, for example, using Hall Effect sensors (not illustrated) that may be arranged to count revolutions of the motor 424.

The actuators such as the motors 424, or any of them, may be powered by the vehicle, include a battery (e.g., a rechargeable battery), or be connected to a renewable power source such as a solar powered generator, a vehicle mounted wind turbine generator, etc. Alternatively, a portable motor or a hand crank may be used instead of the motor 424 and/or gear box 426. Whatever form of power input is used, however, the slide-out room 22 may be locked in position when it is not in motion. When used, a worm drive performs a locking function when the slide-out room 22 is at rest, locking the slide-out room 22 in place (for example, in a closed position when fully retracted), so that a separate lock is not necessary. With other drive mechanisms, a locking means (e.g., a cam lock, or clamp in the walls of slide-out unit 22) may be used to retain the slide-out room 22 in position.

A timing sprocket (obscured from view behind the gear box 426) may be provided on the drive shaft 422 such that the timing sprocket rotates with the drive chain sprocket 410 and the drive shaft 422 (at corner D of the slide-out room 22). Here, the timing sprocket interposes the drive chain sprocket 410 and the gear box 426, and receives a timing chain or timing belt 428. A timing sprocket may be utilized, for example, in embodiments where the right side slide-out drive assembly 402b includes a single actuator, such as the motor 424, such that the motor 424 may be utilized to drive the (lower and upper) drive chain assemblies 404,406 together and in unison (i.e., to "time" the drive chain assemblies 404,406 so that they are driven simultaneously).

As illustrated in FIG. 5B, the drive chain sprocket 412 is similarly disposed on a drive shaft 430 (corresponding to corner B) so that the drive chain sprocket 412 rotates with the drive shaft 430. In addition, a timing sprocket 432 is also similarly disposed on the drive shaft 430 to rotate with the drive chain sprocket 412 and to receive the timing belt 428, and the timing sprocket 432 may be secured thereon at a location that corresponds with the location of the timing sprocket (obscured from view) on the drive shaft 422 as described with reference to FIG. 5A. Accordingly, the timing belt 428 couples the (first) drive shaft 422 to the (second) drive shaft 430 such that a rotation of the (first) drive shaft 422 rotates the (second) drive shaft 430, and vice versa. As will be explained in more detail below, the motor 424, the timing belt 428, portions of the drive shafts 422,430, and portions of the roller shafts 420 may be arranged within a structure, such as the jamb 20, so that the drive chain sprockets 410,412 and the roller members 418 protrude therefrom to engage the drive chain assemblies 404,406 as illustrated in FIGS. 5A and 5B.

The timing belt 428 synchronizes rotation of the lower and upper drive shafts 422,430 such that the lower and upper drive sprockets 410,412 engage the lower and upper drive chain assemblies 404,406, respectively, in unison. It will be appreciated, however, that the forgoing timing mechanisms are optional, and that each of the drive chain assemblies 404,406 could be driven by a discrete motor, which may be synchronized (e.g., a lower and an upper motor that are synchronized with each other via a Hall Effect sensor or feedback). In other embodiments, it will be appreciated that the slide-out drive assembly 402 may instead drive the slide-out room 22 without any timing components, for example, at a single side, a pair or more of sides, or at a pair or more of corners (e.g., at the corners C and D of the slide-out room 22). In even other embodiments, a timing shaft and a set of bevel gears operatively connected thereto may be utilized in lieu of the foregoing timing components (e.g., the timing belt 428 and the timing sprockets 432).

Figure 5C:
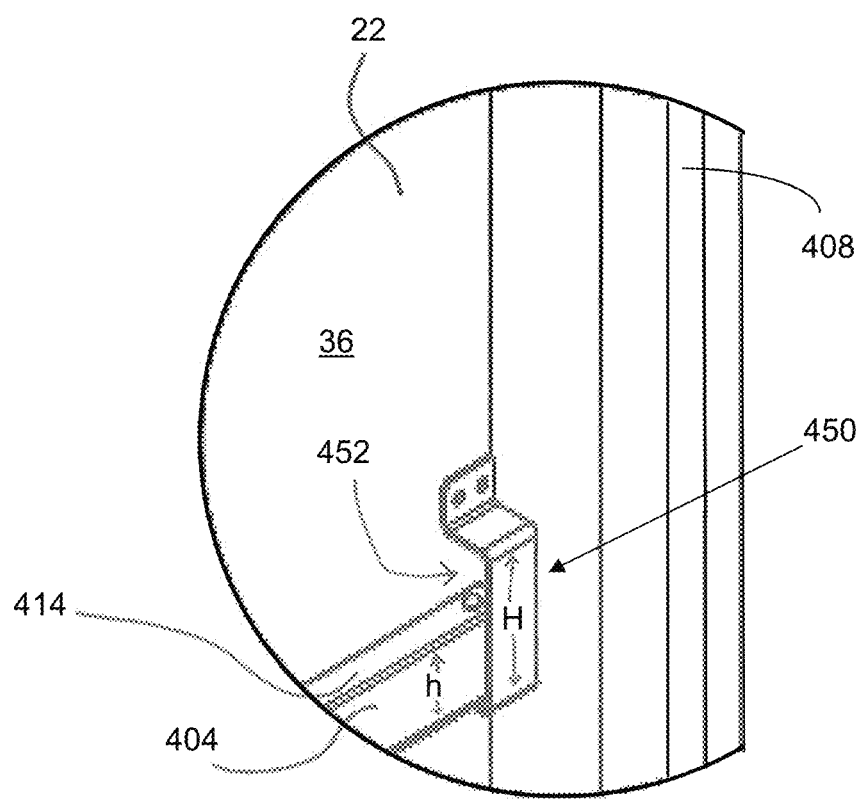
FIG. 5C is a close up isometric view of a third area identified as area Z in FIG. 4.

FIG. 5C illustrates how the drive chain assembly 404 may be secured to the right sidewall 36 of the slide-out room 22 according to one or more embodiments. While only illustrating the (lower) drive chain assembly 404, it will be appreciated that the same may similarly apply with regard to the (upper) drive chain assembly 406 or other drive chain assemblies that may be installed on the left sidewall 34 or elsewhere about the slide-out room 22. In the illustrated embodiment, a support bracket or bracket 450 is utilized to secure an end of the drive chain assembly 404 that is proximate to the rear frame 408 of the slide-out room 22. When installed on the slide-out room 22 (e.g., on the right sidewall 36) over the channel member 414, the bracket 450 defines an interior space or channel 452 having a vertical dimension "H" (i.e., a height) that is greater than a vertical dimension "h" of the channel member 414, which is being bracketed against the vehicle body 12 via the bracket 450. This arrangement permits relative movement of the channel member 414 within the bracket 450, for example, when the slide-out room 22 is extended and/or "dropped" as described below.

As illustrated in FIGS. 6A-6C, the slide-out drive assembly 402 actuates the slide-out room 22 from a fully retracted position (FIG. 6A), along a predetermined path (an intermediate position of the predetermined path is illustrated in FIG. 6B), and to a fully extended position (FIG. 6C). When the slide-out unit 22 is fully retracted within the vehicle 10, as illustrated in FIG. 6A, it rides up above an interior floor 460 of the vehicle 10. The interior floor 460 of the vehicle 10 may include a slide-out extension slot 462 leading inwardly from the opening 18 and into a lip 464 of the interior floor 460, and the slide-out room 22 sits on the lip 462 when retracted within the vehicle 10 and slides upon the lip 462 as it extends outward from the opening 18 of the vehicle 10. The slide-out room 22 includes a floor 466 and, in this embodiment, the floor 466 includes a lip engagement member 468 that extends beyond the rear frame 408 of the slide-out room 22. Here, the lip engagement member 468 has an upwardly inclined/sloped face 470 that engages a mating surface 472 of the lip 462 and, as will be appreciated, this facilitates providing the slide-out room 22 in a fully extended position where its interior floors (not shown) are substantially coplanar with the interior floors (not shown) of the vehicle 10. In addition, the sloped face 470 of the engagement member 468 facilitates the engagement member 468 riding along and over the mating surface 472 of the lip 462, for example, when the slide-out room 22 is articulated from a fully extended position to a retracted position. It will all be appreciated that all of the forgoing contact surfaces, for example, of the lip 462, the engagement member 468 and its sloped face 470 may all have lubricious contact surfaces (or other low friction surface finishes) that facilitate smooth articulation.

During operation, securing the drive chain assembly 404 to the slide-out room 22 with the bracket 450 (that permits relative motion as previously described) facilitates the slide-out room 22 to "drop" into the extended position illustrated in FIG. 6C. For example, the floor 466 of the slide-out room 22 travels along the lip 464 until the lip engagement member 468 guides the slide-out room 22 downward along its sloped face 470 that interacts with the mating surface 472 of the lip 464 on the interior floor 460 of the vehicle 10. In this example, when the slide-out room 22 is in the fully extended position (FIG. 6C), the sloped face 470 of the lip engagement member 468 is fully engaged with the mating surface 472 of the lip 464. The bracket 450 permits relative motion between the slide-out room 22 and slide-out drive assembly 402 that is secured to the vehicle body 12 such that the drive assembly 402 is not damaged when the slide-out room 22 "drops" into its extended position (i.e., when the slide-out room 22 moves vertically relative to the remainder of the vehicle body 12). In this manner, as the slide-out room 22 is fully extended from the vehicle, the sloped face 470 of the lip engagement member 468 rides over and down past the lip 464 such that the interior floor (not shown) of the slide-out room 22 is substantially coplanar with the interior floor (not shown) of the vehicle 10.

As previously mentioned, aspects of the slide-out drive assembly 402 may be provided within a jamb structure that is secured to the vehicle body 12. FIGS. 7A-7H illustrate portions of the right side slide-out drive assembly 402b arranged within the right jamb 20b according to one or more embodiments. In such embodiments, it will be appreciated that the left jamb 20a (and/or any other jamb structure(s) disposed around the opening 18) may be similarly arranged. The right jamb 20b includes a jamb member 702. In the illustrated embodiment, the jamb member 702 is an elongated extrusion having a lower end 704 (corresponding to the corner D) and an upper end 706 (corresponding to the corner B). The jamb member 702 includes a web portion 708 and a pair of legs 710,712 extending from a bottom side of the web portion 708 such that the jamb member 702 has a "C" shape cross-section and defines an interior channel 714, and the interior channel 714 may be utilized to both connect the right jamb 20b to the vehicle body 12 and/or to house at least some (or a portion of some) of the right side slide-out drive assembly 402b components as described below. In the illustrated embodiment, the second leg 712 is shorter than the first leg 710 of the jamb member 702 due to the manner in which the right jamb 20b is secured to the vehicle body 12 via a jamb clamp 730. However, the jamb member 702 may be differently dimensioned or configured depending on the vehicle 10 to which it is to be attached.

In the illustrated embodiments, a pair of channel frames 720,722 are provided within the channel 714 at the lower and upper ends 704,706 of the jamb member 702, respectively. It will be appreciated that while the channel frames 720,722 were not depicted in FIGS. 5A-5B, respectively, structures such as the channel frames 720,722 may be utilized to position and/or secure the drive shafts 422,430, roller shafts 420, and/or the motor 424, and/or other components relative to the drive chain assemblies 404,406.

Figure 7A:
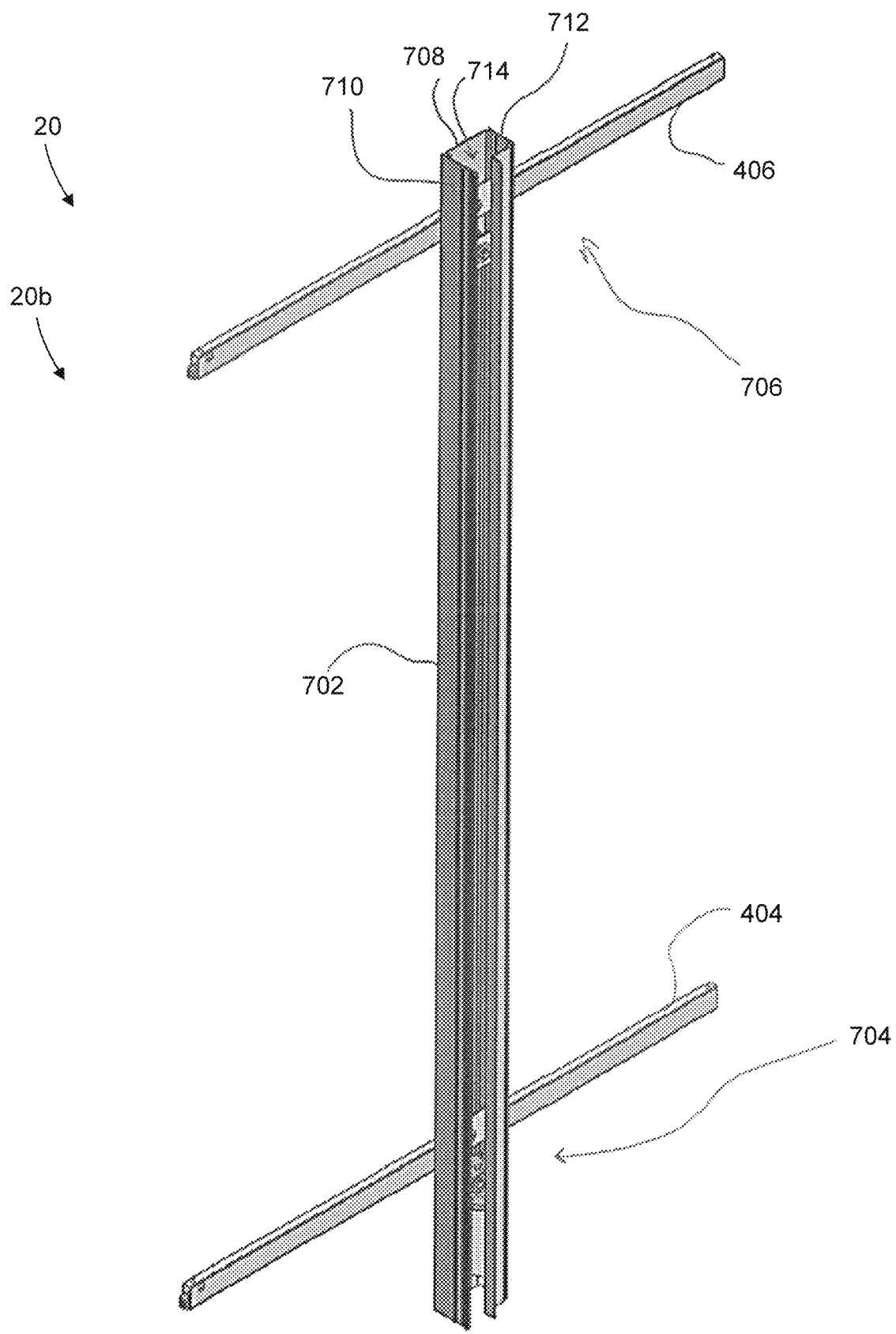
FIGS. 7A-7H illustrate various views of the slide-out drive assembly of FIG. 4 arranged within an exemplary jamb member according to one or more embodiments.
Figure 7B:
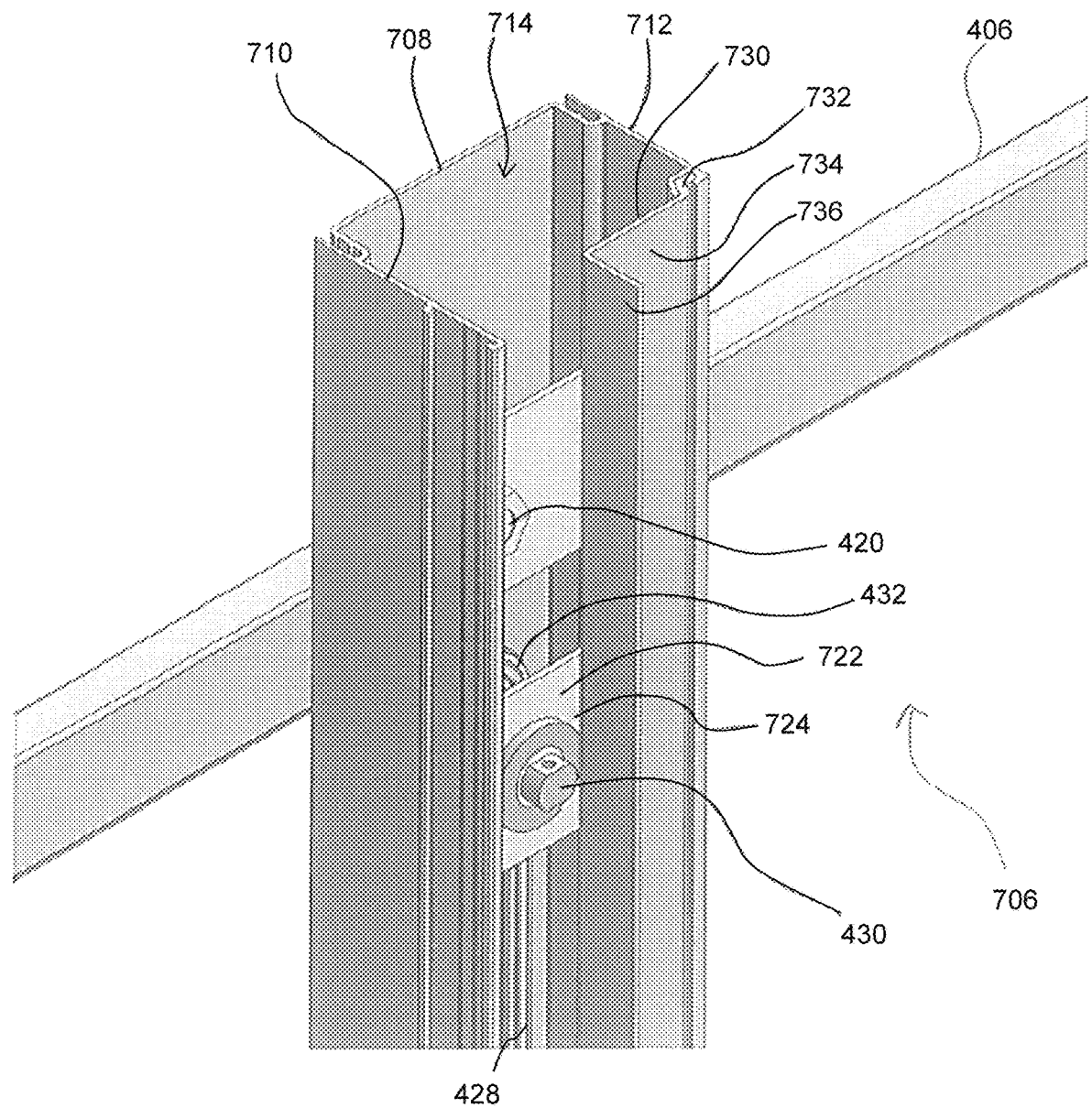
Figure 7C:
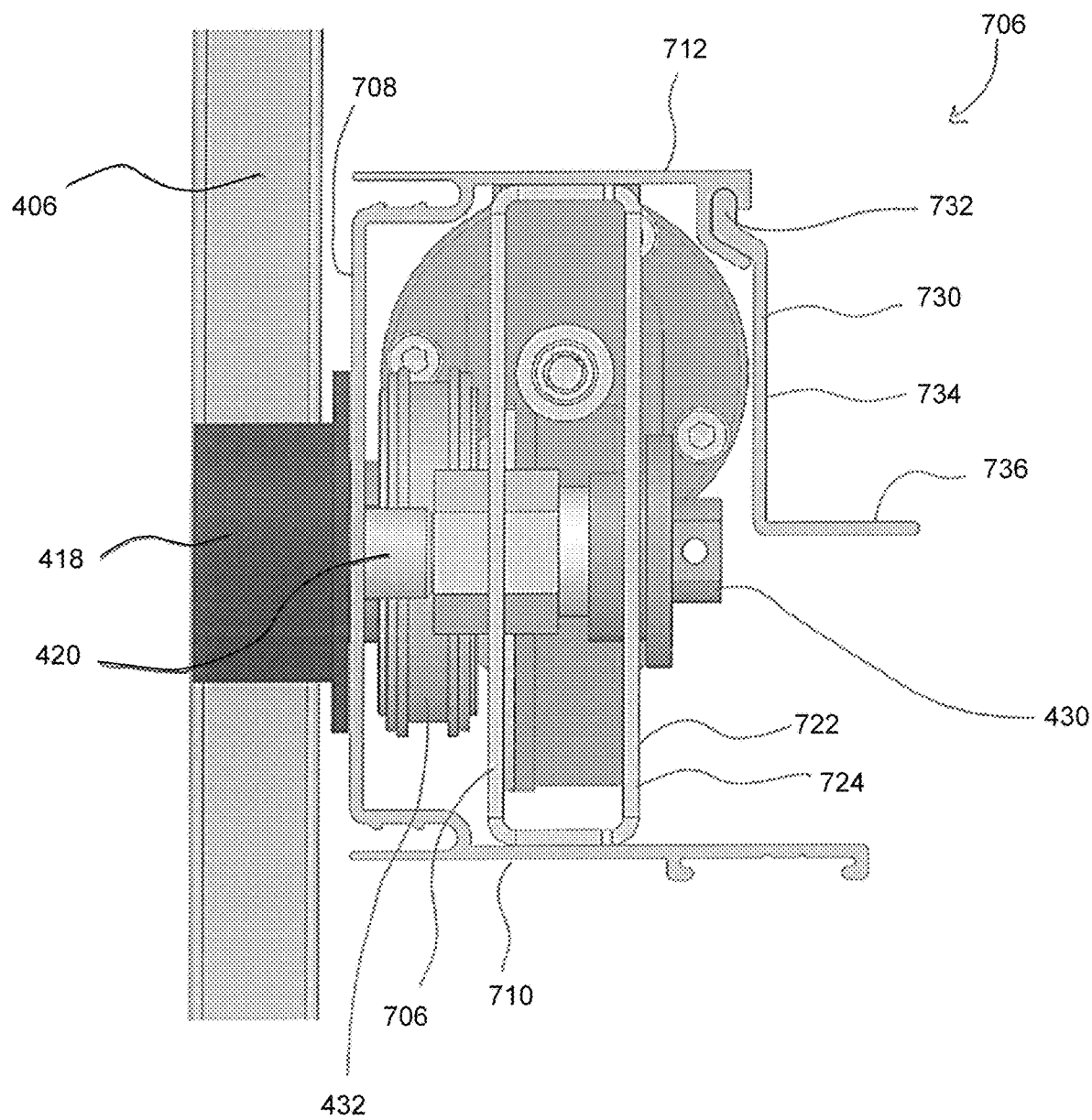
Figure 7D:
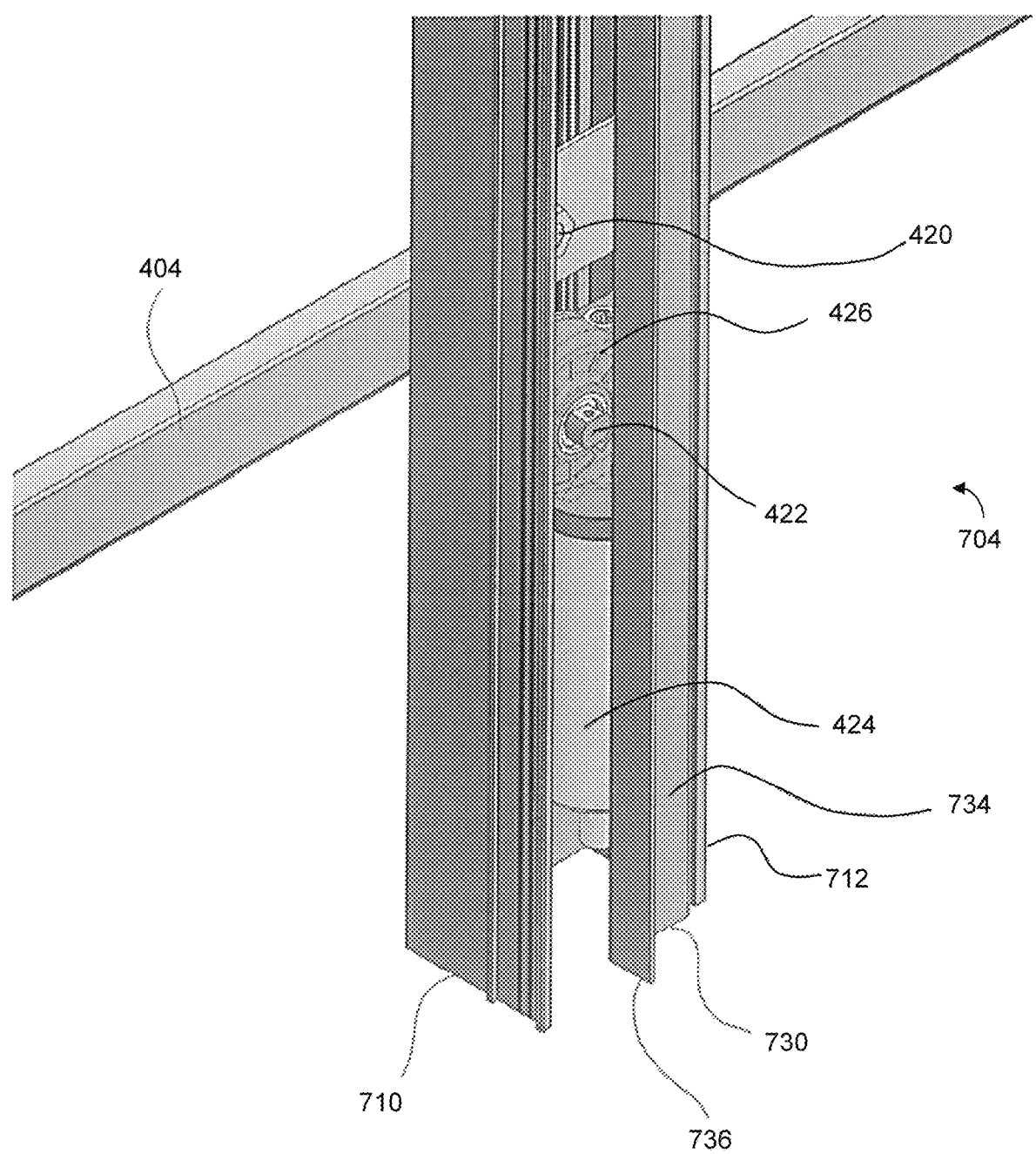
Figure 7E:
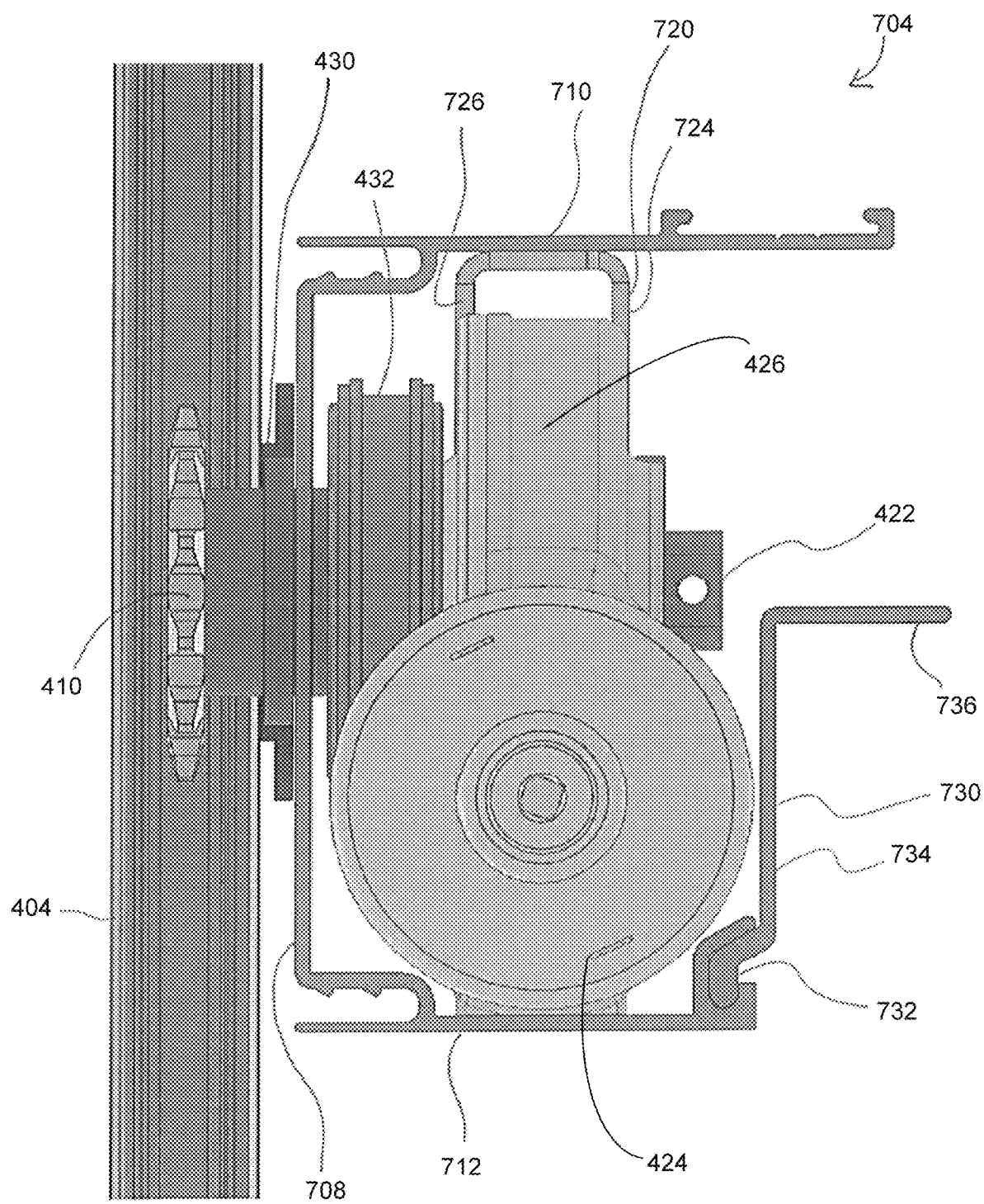
Figure 7F:
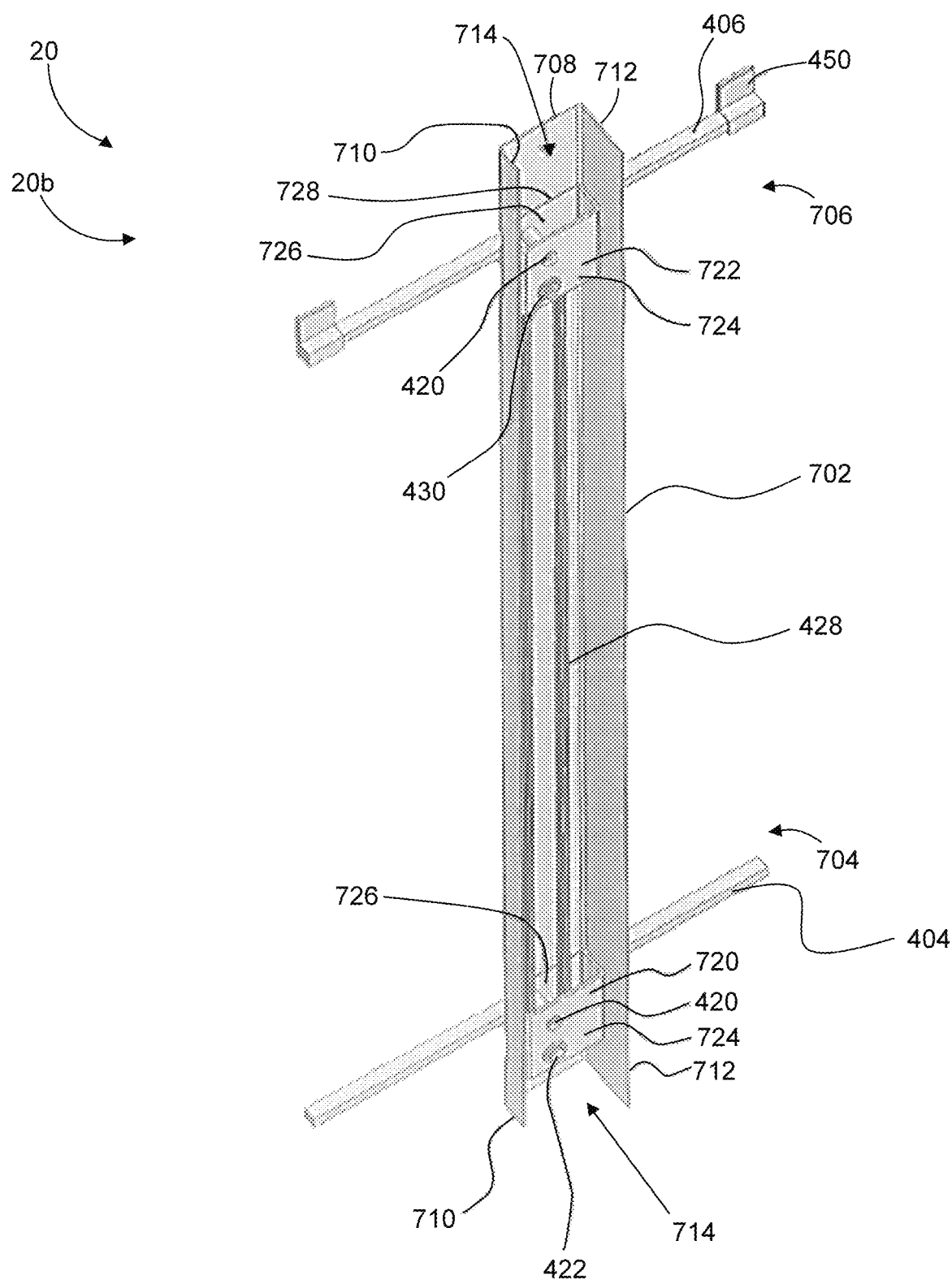
Figure 7G:
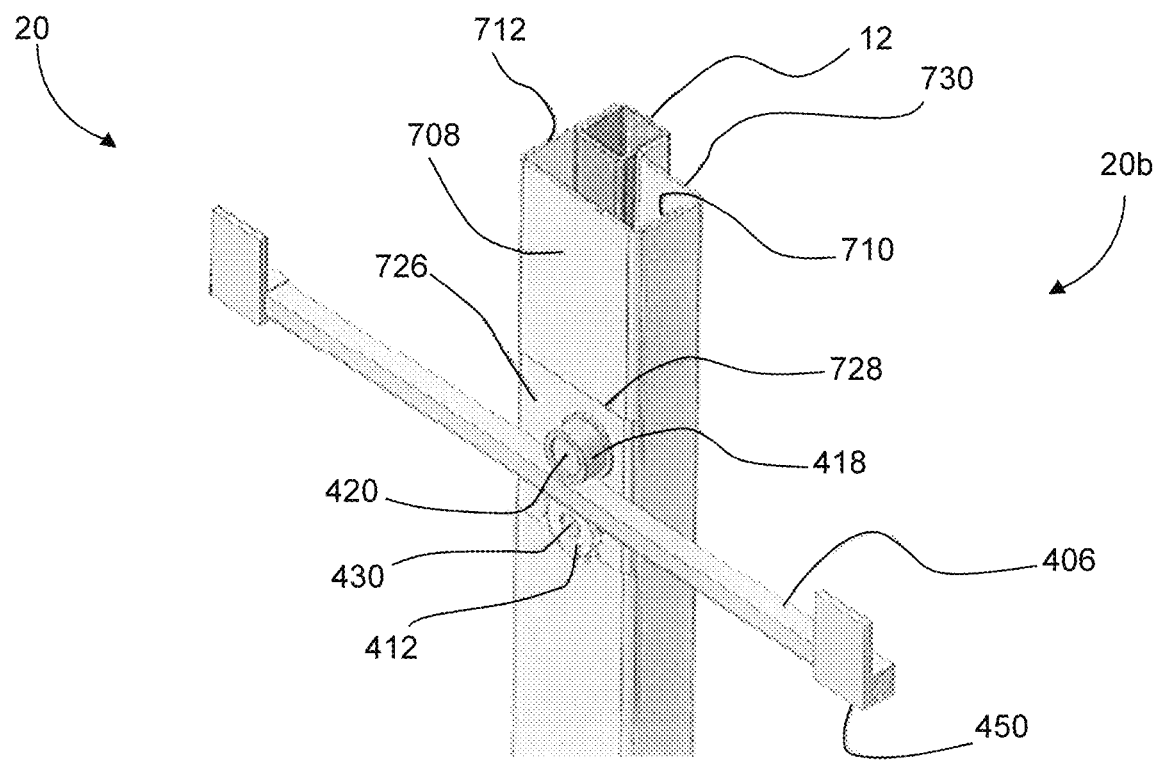
Figure 7H:
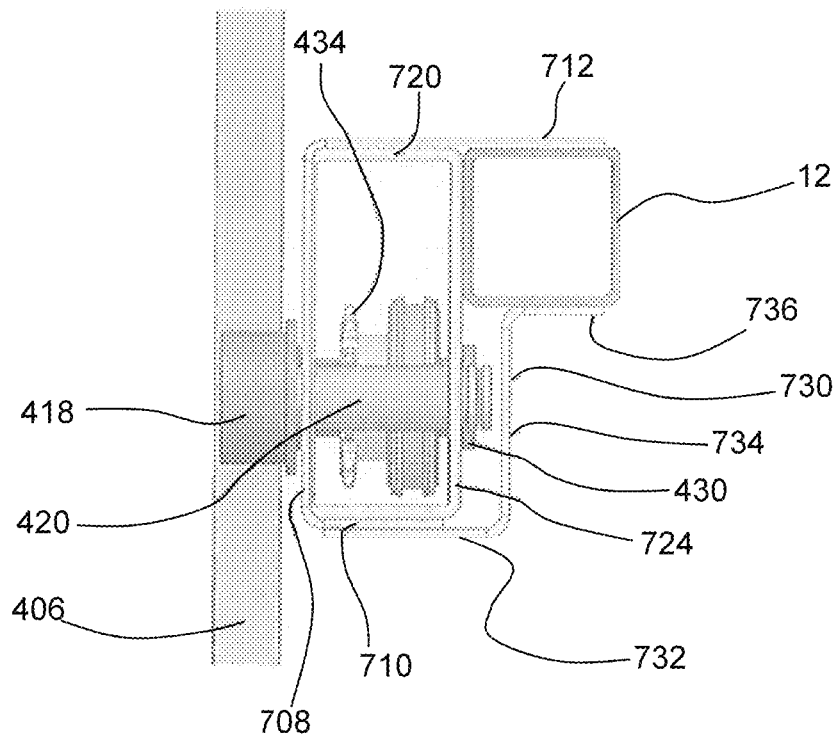

Here, each of the channel frames 720,722 is illustrated as being open rectangular cross-section members each having a rear face 724 and a front face 726. In some embodiments, the channel frames 720,722 are disposed within the channel 714 so that each face 724,726 is contained within the envelope defined by the jamb member 702. In other embodiments, the web portion 708 is formed with a recess 728 sized to receive the front face 726 as best shown in FIGS. 7F-7H. However, either or both of the channel frames 720,722 may instead be single frame members spanning approximately parallel to the web portion 708, or instead be "C" shaped cross-section members that are oriented within the channel 714 such that the "C" shape cross-section of the channel frames 720,722 is 180 degrees opposite of the "C" shaped cross-section of the jamb member 702; and, in this manner, the channels 720,722 will not be nested within the jamb member 702. Rather, the channels 720,722 each include a rear face 724 that together define a rear boundary of the channel 714. Alternatively, the channel frames 720,722 may be a planar member similarly disposed within the channel 714 as the foregoing "C" shaped cross-section members.

The jamb clamp 730 may be provided to secure the jamb member 702, for example, to the vehicle body 12. In the illustrated embodiment, the jamb clamp 730 includes a first flange 732 that is arranged to correspond with (or nest within) a mating recess of the second leg 712 (of the jamb member 702); a web portion 734 that extends from the first flange 732 in a substantially coplanar orientation relative to the web portion 708 (of the jamb member 702); and a second flange 736 that extends from the web portion 734 in a substantially coplanar orientation relative to the first leg 710 (of the jamb member 702). As will be appreciated, the first flange 732 of the jamb clamp 730 may be secured to the first leg 710 of the jamb member 702 via a friction press-fit as illustrated; however, it may be differently secured or include additional securing methods such as, for example, by use of welding, fasteners, adhesives, etc. Accordingly, the jamb clamp 730 may be utilized to wedge or clamp a portion of the vehicle body 12 within the jamb 20.

Either or both of the channel frames 720,722 within jamb member 702 may have an upper and/or lower aperture (both obscured from view) that extend through the rear and front faces 724,726 thereof. FIG. 7F illustrates an example where these apertures formed into the rear faces 724 of the (lower and upper) channel frames 720,722; whereas FIG. 7G illustrates these apertures formed into the front faces 726 of the same. As will be appreciated, these apertures are arranged to receive one of the drive shafts 422,430 and/or the roller shafts 420. In other embodiments, however, the drive shafts 422,430 and/or the roller shafts 420 extend from the right sidewall 36 of the slide-out room 22 rather than jamb assembly as previously described. In other embodiments, the channel frames 720,722 are arranged to receive only the drive shafts 422,430, and the roller shafts 420 are secured to the jamb 20, for example, at the web portion 708.

In the illustrated embodiment, the (lower) channel frame 720 includes an aperture that receives the drive shaft 422. In some embodiments, the channel frame 720 includes a second aperture that receives the roller shaft 420. Regardless, it will be appreciated that a rear end of each of the roller shaft 420 and the drive shaft 422 may extend to or beyond the rear face 724, and a front end of each of the roller shaft 420 and the drive shaft 422 extends beyond the front face 726 and outward of the web portion 708 to receive the roller member 418 and the drive chain sprocket 410. With this arrangement, the (lower) drive chain assembly 404 is secured between the (lower) roller member 418 and the (lower) drive chain sprocket 410 when driven via the (lower) drive chain sprocket 410. Also in this embodiment, the timing sprocket (not illustrated) on the (lower) drive shaft 422 that engages the timing belt 428 is disposed between the rear and front faces 724,726. In addition, the motor 424 and gear box 426 may be similarly disposed between the rear and front faces 724,726, or may instead be disposed proximate to an outside of the rear face 724. Also, additional sprockets or gears may be provided on the (lower) drive shaft 422, for example, an extra sprocket 434 that may be utilized to engage a drive extension assembly as detailed below.

Similarly, the (upper) channel frame 722 may also include one or more apertures to receive the drive shaft 430 and/or the roller shaft 420 as previously described with reference to the (lower) channel frame 720. Thus, a rear end of each of the roller shaft 420 and the drive shaft 430 may extend to or beyond the rear face 724, and a front end of each of the roller shaft 420 and the drive shaft 430 extends beyond the front face 726 and outward of the web portion 708 to receive the roller member 418 and the drive chain sprocket 412. As such, the (upper) drive chain assembly 406 may be secured between the (upper) roller member 418 and the (upper) drive chain sprocket 412 when driven via the (upper) drive chain sprocket 412. Also in this embodiment, the timing sprocket 432 on the (upper) drive shaft 430 that engages the timing belt 428 is disposed between the rear and front faces 724,726. Also, additional sprockets or gears may be provided on the (upper) drive shaft 430, for example, the extra (third) sprocket 434 may be utilized to engage an upper motor and/or a drive extension assembly as detailed below.

Figure 8D:
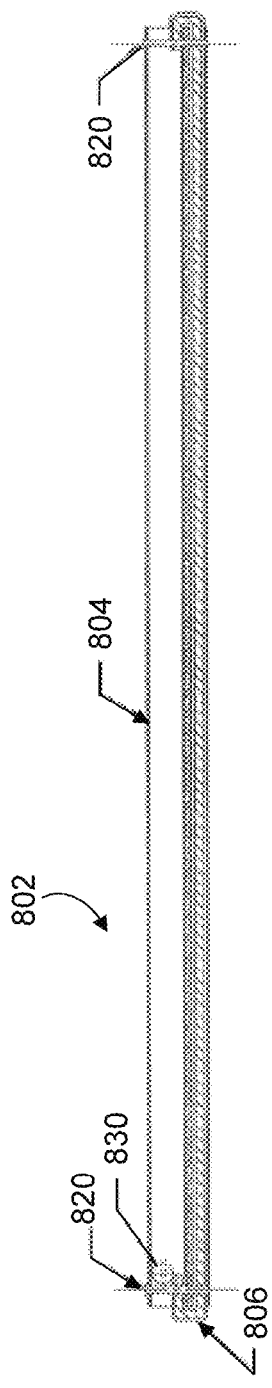

Turning to FIGS. 8A-8F, various views of the drive chain assemblies 404,406 are illustrated according to one or more embodiments of the present disclosure. However, for ease of discussion, the drive chain assemblies 404,406 are each individually referred to as a drive chain assembly 802. FIG. 8A is an isometric side view of the drive chain assembly 802. Here, the drive chain assembly 802 includes a channel member 804 (that is arranged similarly to the channel members 414,416 described with reference to FIGS. 5A-5B) and a chain 806. The channel member 804 may be an elongated extruded piece in some embodiment. While various designs or types of the chain 806 may be utilized, the chain 806 may include a plurality of connected links that are suitably arranged to engage the drive chain sprockets 410, 412, as described above. And, in some embodiments, the chain 806 is a standard size roller chain as categorized by the American National Standards Institute (ANSI), for example, roller chain standard 40, 50, 60, or 80.

FIG. 8B is a front view of the channel member 804 of FIG. 8A without the chain 806 mounted therein, whereas FIG. 8C illustrates the channel member 804 of FIG. 8B with the chain 806 installed therein. As illustrated, the channel member 804 includes a pair of sidewalls 808,810 that extend from a web portion 812 of the channel member 804, and a chain rail 814 arranged between the sidewalls 808,810 in a substantially coplanar orientation relative to the web portion 812 of the channel member 804 such that the sidewalls 808,810 extend past the chain rail 814. The portions of the sidewalls 808,810 that extend past the chain rail 814 and the chain rail 814 together define a chain channel 816. In addition, the sidewalls 808,810 and the chain rail 814 also define an inner recess or inner channel 818. As illustrated, the chain channel 816 is arranged to receive the chain 806 and secure it within the channel member 804 such that it may be engaged with a drive chain sprocket such as the drive chain sprockets 410,412, whereas the inner channel 818 is arranged to secure opposing ends of the chain 806 that extend from the chain channel 816.

Figure 8F:
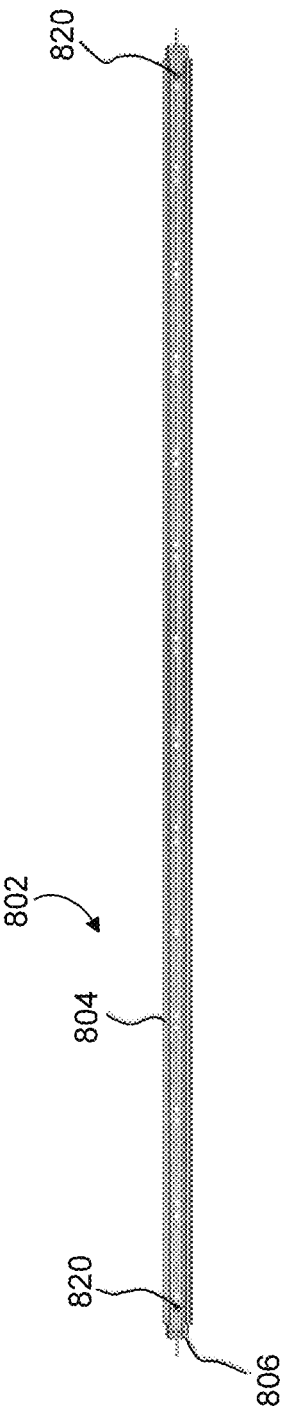
Figure 8E:
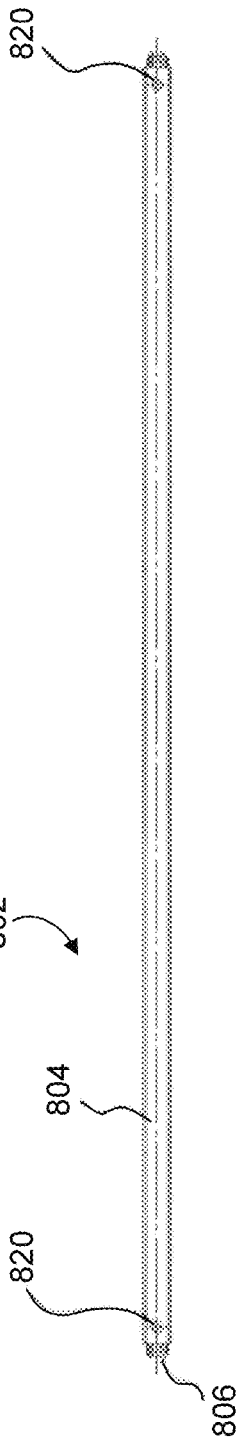

FIG. 8D illustrates a side cut-away view of the drive chain assembly 802 along a section line A-A of FIG. 8C, according to one or more embodiments. FIG. 8E illustrates a top view of the drive chain assembly 802 of FIG. 8A, whereas FIG. 8F illustrates a bottom view of the drive chain assembly 802 of FIG. 8A. In the illustrated embodiment, the chain 806 has a length that is longer than the length of the channel member 804 (i.e., longer than the chain rail 814) such that when the chain 806 is disposed within the chain channel 816, extra lengths of chain exist and extend out of the chain channel 816 at each end; these extra lengths of chain may then be wrapped around the chain rail 814 into the inner channel where they are secured to the channel member 804, for example, via a pin 820. In the illustrated embodiment, a pin 820 is utilized to secure the chain 806 to the channel member 804 at each end thereof by extending (i) through the web portion 812 of the channel member 804, (ii) through the extra length of chain 806 that is wrapped into the inner channel 818, (iii) through the chain rail 814, and (iv) through a portion of the chain 806 disposed within the chain channel 816. It will be appreciated, however, that other means may be utilized to secure the chain 806 to the channel member 804. For example, the pin may extend through the web portion 812 and engage the chain 806 within the inner channel 818 with enough pressure such that the chain 806 is secured therein, similar to a press fit.

The channel member 804 may also include a mounting slot 830 at (at least) a first end 832 of the channel member 804. The mounting slot 830 may be arranged to receive a mounting bracket pin as described below with reference to FIG. 9. In the illustrated embodiment, however, a second end 834 of the channel member 804 is configured to be attached to the slide-out room 22 via the bracket 450 as described above with reference to FIG. 5C; however, the second end 834 may be similarly configured as with the first end 832.

Figure 8G:
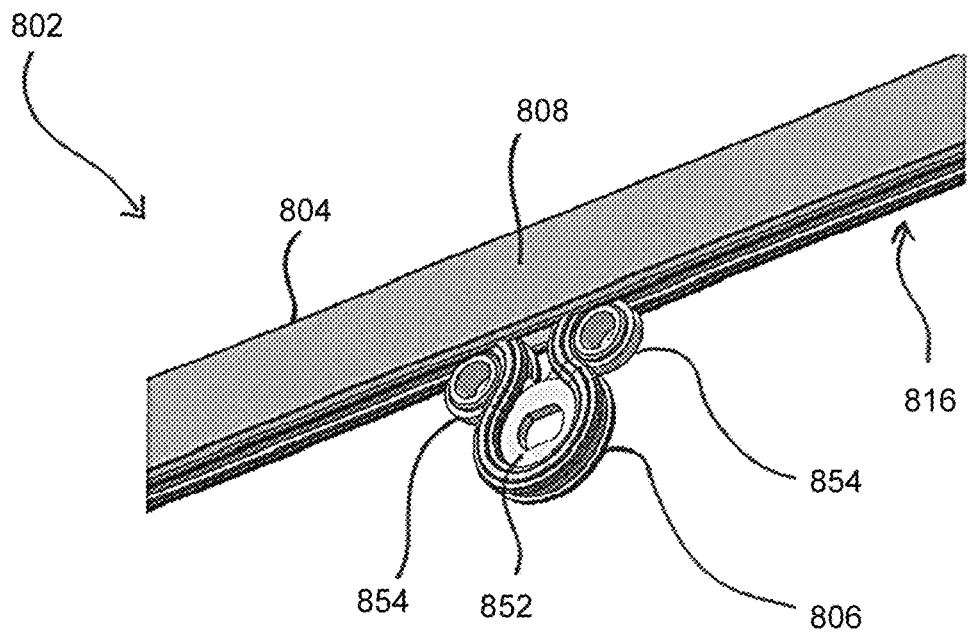
Figure 8H:
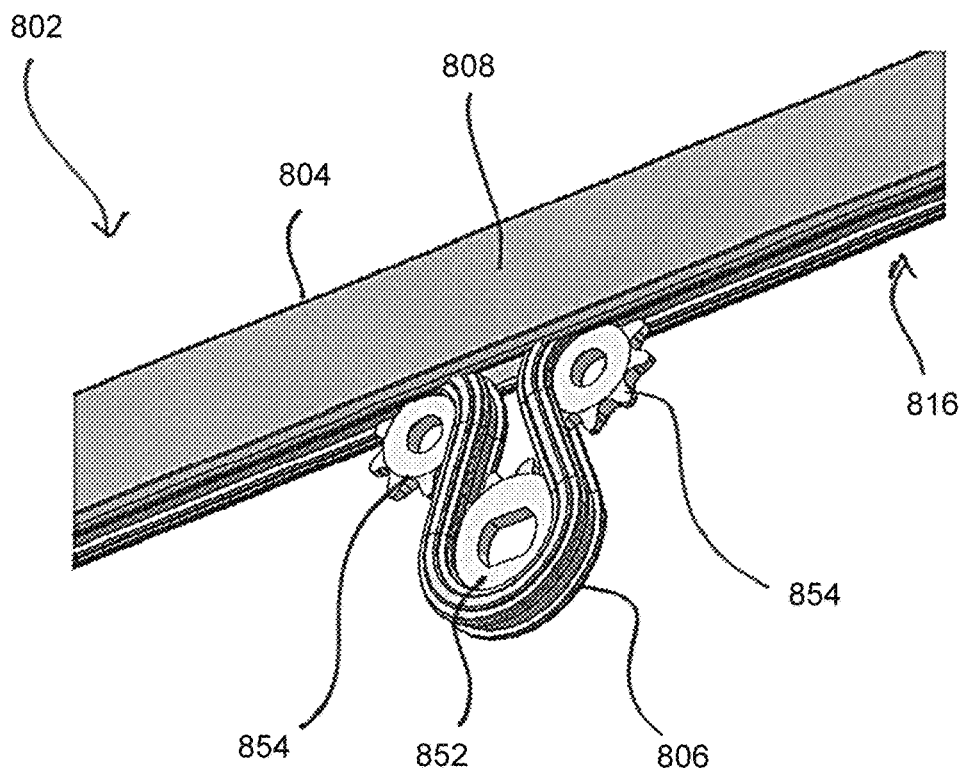

FIGS. 8G and 8H illustrate alternate embodiments of the drive chain assembly 802 according to one or more other embodiments. In particular, FIGS. 8G and 8H illustrate an embodiment where the chain 806, or at least a portion of the chain 806, may extend outward of the chain channel 816 to engage a drive member, such as a drive sprocket 852, and be held within the chain channel 816 via a pair of chain guides 854. In the illustrated embodiment, the drive sprocket 852 engages a top side of the chain 806 rather than engaging the underside of the chain 806, as previously described with reference to FIGS. 8A-8F. Here, either or both of the drive sprockets 410,412 may be arranged as the drive sprocket 852 of FIGS. 8G-8H, where the drive sprocket 852 is offset or spaced from the channel member 804 such that its teeth or cogs engage a top side of the chain 806 at a location outside of the chain channel 816. In these embodiments, the chain 806 rests within the chain channel 816, but then exits the chain channel 816 to wrap around and engage at least a bottom portion of the drive sprocket 852. In some embodiments, the drive chain assembly 802 may include one or more chain guides 854 and, in the illustrated embodiments, two such chain guides 854 are provided to maintain the chain 806 within the chain channel 816 when not engaged by the drive sprocket 852. The chain guides 854, where utilized, may have various configurations. For example, the chain guides 854 of FIG. 8G are arranged as rollers, whereas the chain guides 854 of FIG. 8H are arranged as sprockets. The chain guides 854 may be secured to the drive chain assembly 802 at, for example, the channel member 804 (e.g., at the sidewalls 808/810). Alternatively, the chain guides 854 may be secured to the vehicle body 12, for example, via the jamb 20 (e.g., connected to the channel member 702). In even other embodiments, the chain guides 854 are coupled to the motor 424 and arranged to drive (or assist in driving) the slide-out room 22 as described herein; and in such configurations, the chain guides may be timed with the drive sprocket 852. In addition, one or more roller members 418 may be provided to ensure engagement between the drive sprocket 852 and the drive chain assembly 802 as hereinbefore described, and such roller members 418 may each extend from the roller shaft 420 as previously described.

Figure 9:
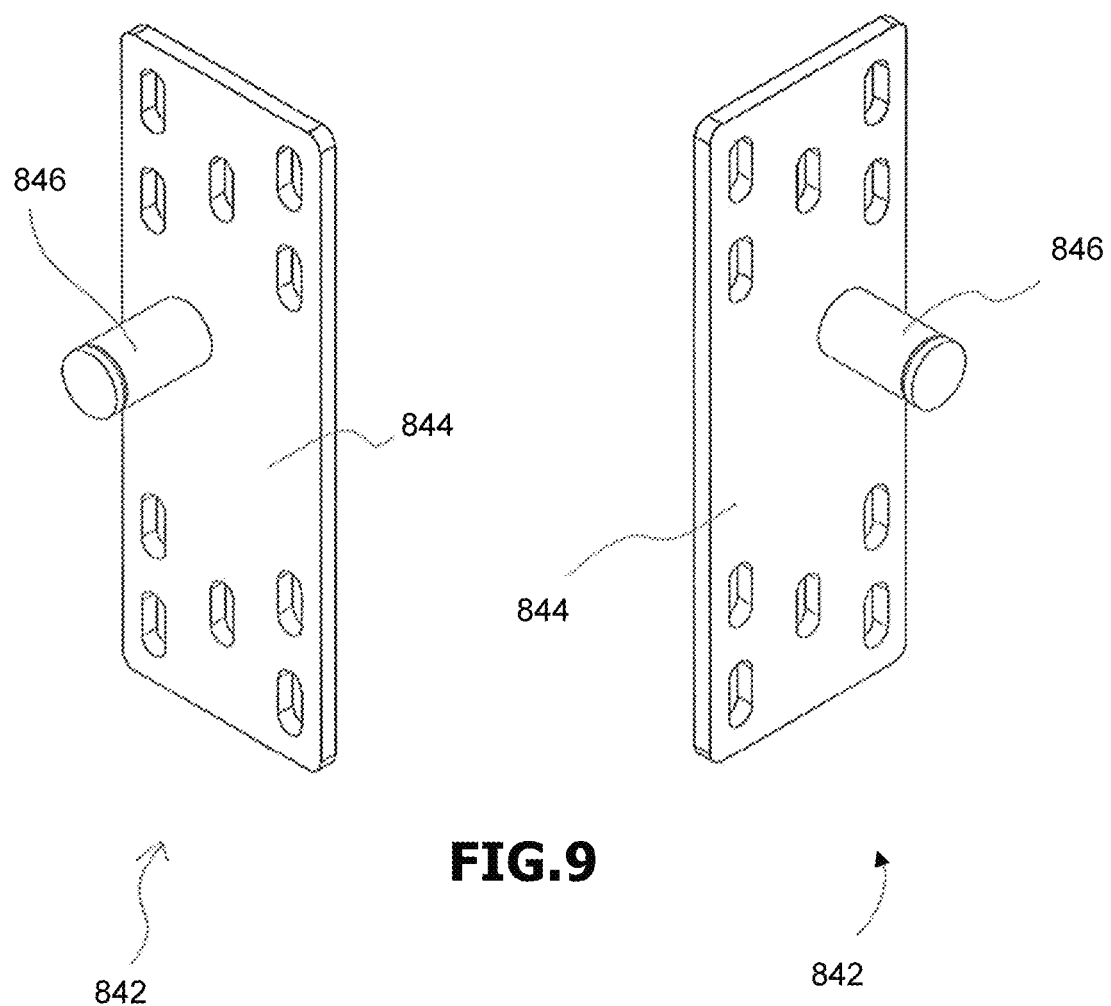
FIG. 9 illustrates a pair of mounting brackets utilized to attach the drive chain assemblies of FIGS. 8A-8E to a slide-out unit, according to one or more embodiments.

FIG. 9 illustrates a pair of mounting brackets 842 according to one or more embodiments. The mounting brackets 842 may be utilized to attach the first end 832 (and/or the second end 834) of the drive chain assembly 802 to the slide-out room 22 as mentioned above. Here, each of the mounting brackets 842 includes a base 844 secured to the slide-out room 22 and a pin 846 extending outwardly therefrom. The base 844 may be attached to the slide-out room 22 via a number of fastening methods, for example, via utilization of fasteners or adhesives. The pin 846 is arranged within the mounting slot 830 such that the channel member 804 is able to rotate about the pin 846 relative to the plate 844 (and the slide-out room 22 secured thereto), thereby permitting the second end 834 to vertically translate within the channel 452 of the bracket 450 as described above with reference to FIG. 5C. In some embodiments, the pin 846 is made from a lubricious material; however, in other embodiments, a bushing or sleeve may be provided between the pin 846 and the mounting slot 830 to facilitate smooth rotation. Accordingly, in the illustrated embodiment, the first end 832 of the drive assembly 802 is mounted to the slide-out room 22 via pin 846 that permits relative rotation (about the pin 846) between the slide-out room 22 and the vehicle structure 12, whereas the second end 834 of the drive assembly 802 is mounted to the slide-out room 22 via the bracket 450 that permits relative movement between the slide-out room 22 and the vehicle body 12 (in at least a vertical direction).

It will be appreciated that, while not illustrated, the left side slide-out drive assembly 402a may be arranged similar to the right side slide-out drive assembly 402b as described in FIGS. 4-9.

It will also be appreciated that in certain environments, it may be desirable to protect the drive chain assemblies from dirt, debris, and/or moisture. This may be true in embodiments where the drive chain assemblies are mounted to the ceiling or upper surface of slide-out room 22. To this end, a protective surface (not illustrated) may be utilized to cover vulnerable drive chain assemblies, for example, the chain 806 therein. The protective surface may be a thin membrane or have a suitably configured sleeve that travels along any portion of drive chain assembly, and/or the chain 806 disposed therein, that may be subject to the accumulation of unwanted material. However, it is appropriate that the protective surface not enter the engagement between a drive chain sprocket (e.g., 410,412) and a chain (e.g., the chain 806) in a drive chain assembly (e.g., 404,406). In some embodiments, a router (not illustrated) may be employed to channel the protective surface around such engagement and, in one such embodiment, the router includes a series of traveler members therein that help to move the protective surface away from the sprocket/chain engagement as the slide-out room 22 is moved between retracted and extended positions. Alternatively, the protective surface could be collected and dispensed via an arrangement of one or more spools in which such spools are biased and take up excess slack as the slide-out unit drive assembly actuates.

The slide-out drive assembly 402 may also be modified in a number of ways. For example, the motor 424 may be moved from its position that is proximate to the (lower) drive shaft 422 (as illustrated in FIGS. 4 and 5A) to an upper position proximate to the (upper) drive shaft 430 (as illustrated in FIGS. 10A and 10C), and/or the motor 424 may be inverted so that its cylindrically extending base portion extends upward (as illustrated in FIGS. 10B and 10C) rather than downward (as illustrated in FIGS. 4, 5A and 10A). It will be appreciated that the motor 424 (or any of them, if more than one) may be differently oriented to extend at angles other than those illustrated in the figures, as may be needed in a particular application.

FIG. 10A illustrates the right side of a slide-out drive assembly 1002 according to one or more other embodiments. Here, the motor 424 and gear box 426 are disposed at an upper portion of the right sidewall 36 so as to the (upper) drive shaft 430 instead of the (lower) drive shaft 422 as illustrated in FIG. 4. Here, the (lower) drive shaft 422 includes a timing sprocket 1004 disposed thereon in a similar manner in which the timing sprocket 432 is disposed on the (upper) drive shaft 430 in FIG. 4.

FIG. 10B illustrates a slide-out drive assembly 1010 according to one or more other embodiments. The slide-out drive assembly 1010 is similar to the slide-out drive assembly 402 illustrated in FIG. 4, except that the motor 424 and the gear box 426 are inverted so that a body of the motor 424 extends upwards as illustrated in FIG. 10B.

FIG. 10C illustrates a slide-out drive assembly 1020 according to one or more other embodiments. The slide-out drive assembly 1020 is similar to the slide-out drive assembly 1002 illustrated in FIG. 10A, except that the motor 424 and the gear box 426 are inverted so that a body of the motor 424 extends upwards in a similar fashion as described with reference to FIG. 10B.

As mentioned above, some embodiments described herein may utilize multiple motors 424. For example, each of the corners A,B,C,D may have an actuator associated therewith as illustrated in the example embodiment of FIGS. 11A-11B. These example embodiments utilize multiple actuators on each side of the slide-out drive assembly, such as a pair of motors 1104. Here, utilizing multiple motors eliminates the need for mechanical timing components (e.g. timing belts, shafts, or bevel gear arrangements) to synchronize or time the upper and lower motors 1104. Instead, the motors 1104 may be synchronized using Hall Effect sensors as detailed above or using logic (e.g., a programmable logic controller). Also, while embodiments described herein illustrate just one or two of the motors, it will be appreciated that in some applications it may be beneficial to utilize two or more motors 424 that are synchronized (or controlled with feedback) to drive either or both of the drive chain assemblies 404,406.

FIG. 11A illustrates a right side slide-out drive assembly 1102 that includes two motors 1104, according to one or more embodiments. Here, each of the motors 1104 includes a gear box 1106 integrally attached and extending from a base 1108 of the motor 1104. As will be appreciated, the gear box 1106 is arranged to transfer a rotation force (torque) to a shaft such as the drive shafts 422,430. It will be appreciated that in some applications it may be beneficial to utilize two or more motors 424 that are synchronized (or controlled with feedback) to drive either or both of the drive chain assemblies 404,406.

FIG. 11B is an alternate embodiment of a right side slide-out drive assembly 1120, according to one or more embodiments. Here, the right side slide-out drive assembly 1120 includes a pair of motors 1130 oriented with their bases extending downward. Each of the motors 1130 includes a bevel gear 1132 extending from a top side of the motor 1130. Each of the bevel gears 1132 is oriented to rotate around a vertical axis (of its corresponding motor 1130) and drives a mating bevel gear 1134 that engages the slide-out room 22 (e.g., at the drive chain assembly 404). One of the mating bevel gears 1134 is disposed on each of the lower and upper drive shafts 422,430, and arranged thereon so that the bevel gears 1134 each rotate with their corresponding one of the drive shafts 422,430. Accordingly, a rotation of the bevel gear 1132 around the vertical axis drives the mating bevel gear 1134 engaged therewith, which in turn causes the corresponding one of the drive shafts 422,430 to rotate. The drive chain sprockets 410,412 rotate with the drive shafts 422,430 and actuate the drive chain assemblies 404,406 that are attached to the right sidewall 36 of the slide-out unit 22.

Also in this embodiment, the drive shafts 422,430 may extend from the right sidewall 36 of the slide-out room 22 rather than jamb assembly as previously described. In addition, a roller 1138 may be provided with a shaft 1140 that similarly secures it to the right sidewall 36 of the slide-out room 22. In these embodiments, it will be appreciated that the first bevel gears 1134 is attached to a portion of the vehicle body 12, for example, via a jamb assembly.

FIG. 12A illustrates an alternate embodiment of a right side slide-out drive assembly 1202, according to one or more embodiments. Here, the right side slide-out drive assembly 1202 is similar to the right side slide-out drive assembly 402b of FIG. 4, except that the motor 424 utilizes a gear box 1204 having a first bevel gear 1204 that is arranged to engage and drive a second bevel gear 1206. The second bevel gear 1206 is arranged on the drive shaft 422 such that they rotate together. Accordingly, the motor 424 transmits rotational force to the (lower) drive shaft 422 via bevel gear arrangement of the bevel gears 1204,1206. Also, the (upper) drive shaft 430 rotates with the (lower) drive shaft 422 via the timing elements such as the timing belt 428.

FIG. 12B illustrates an alternate embodiment of a right side slide-out drive assembly 1212, according to one or more embodiments. Here, the right side slide-out drive assembly 1212 is similar to the right side slide-out drive assembly 1202 of FIG. 12A, except that the present right side slide-out drive assembly 1212 includes a drive extension assembly 1214 that permits the motor 424 and the bevel gear box 1204' attached thereto to be located further away from the drive shafts 422,430. Here, the drive extension assembly 1214 includes a bevel drive gear 1216 disposed proximate to the bevel gear box 1204' so as to be engaged and driven thereby. The bevel drive gear 1216 is secured within a jamb structure (not illustrated) but in other embodiments may be secured to the sidewall 36 of the slide-out room 22. The drive extension assembly 1214 also includes an extension drive chain 1218 that couples the bevel drive gear 1216 to the (lower) drive shaft 422 so that they rotate with each other in unison. Thus, the drive chain 1218 wraps around an extension drive sprocket 1220 that is attached to (and rotates with) the bevel drive gear 1216, and also wraps around a corresponding sprocket 1222 that is disposed on the (lower) drive shaft 422 at a location thereon proximate to the drive chain sprocket 410. As such, the drive shaft 422 includes a pair of sprockets (i.e., the drive chain sprocket 410 and the sprocket 1222) and is thus sometimes referred to as a double sprocket configuration.

FIG. 12C illustrates an alternate embodiment of a right side slide-out drive assembly 1232, according to one or more embodiments. Here, the right side slide-out drive assembly 1232 is similar to the right side slide-out drive assembly 1212 of FIG. 12B, except that the motor 424 and the bevel gear box 1204' are instead oriented along the (upper) drive chain assembly 406 rather than along the (lower) drive chain assembly 404 as illustrated in FIG. 12B. Thus, the (upper) drive shaft 430 has the double-sprocket configuration in this embodiment because both the drive chain sprocket 412 and the sprocket 1222 that corresponds with the extension drive sprocket 1220 are disposed thereon.

In other embodiments, timing elements are utilized other than belts and chains. FIGS. 13A-13B, for example, each illustrate an alternate embodiment of a right side slide-out drive assembly 1302A,B that utilize a timing shaft 1304 rather than a belt or chain such as the timing belt 428, according to one or more embodiments. Here, the timing shaft 1304 is operatively connected to the motor 1306. Also disposed on the timing shaft 1304 are a pair of bevel gears 1310,1312 that rotate with the timing shaft 1304. The bevel gears 1310,1312 are disposed at opposing ends of the timing shaft 1304, for example, at locations thereon that correspond with the drive chain assemblies 404,406. Here, the roller members 418 and the drive shafts 422,430 are secured directly into the right sidewall 36 of the right hand slide-out room assembly 1302A. In addition, each of the drive shafts 422,430 include a bevel gear 1314,1316 arranged thereon such that the bevel gear 1314 rotates with the (lower) drive shaft 422 and the bevel gear 1316 rotates with the (upper) drive shaft 430. The drive shafts 422,430 are disposed proximate to the drive chain assemblies 404,406, such that the motor 1306 rotates the timing shaft 1304, which in turn causes the pair of bevel gears 1310,1312 attached thereto to rotate with the timing shaft 1304; and each of the pair of bevel gears 1310,1312 engages and rotates its corresponding one of the bevel gears 1314,1316 such that the drive shafts 422,430 attached thereto rotate.

As illustrated in the example embodiment of FIG. 13A, the motor 1306 and the first bevel gear 1310 are disposed on the timing shaft 1304 proximate to the (lower) drive chain assembly 404 and the second bevel gear 1312 is disposed on the timing shaft 1304 proximate to the (upper) drive chain assembly 406. Similarly in the example embodiment illustrated in FIG. 13B, the motor 1306 and the first bevel gear 1310 are disposed on the timing shaft 1304 proximate to the (upper) drive chain assembly 406 and the second bevel gear 1312 is disposed on the timing shaft 1304 proximate to the (lower) drive chain assembly 404.

In these embodiments, a bushing 1320 and bushing bracket 1322 may be arranged on the timing shaft 1304 at locations thereon proximate to the first and second bevel gears 1310,1312 as a means of maintaining and/or securing the timing shaft 1304 in a position such that the bevel gear 1310 engages the bevel gear 1314 and so that the bevel gear 1312 engages the bevel gear 1316. The bushing 1320 may be secured to the timing shaft 1304 via a pin 1324 so that it rotates with the timing shaft 1304 within an aperture arranged to rotatably receive the timing shaft 1304. In some embodiments, the timing shaft 1304 is secured within a jamb assembly as previously described utilizing one or more of the busing brackets and, in such embodiments, the motor 1306 may also be provided on the same jamb assembly or elsewhere on the vehicle body 12.

An exemplary operation of an apparatus according to one embodiment of this disclosure will now be described with reference to FIG. 4, FIGS. 5A-5C, and FIGS. 6A-6C. When it is desired to move the slide-out room 22 from a first or retracted position as shown in FIG. 1 to a second or extended position as shown in FIG. 2, the actuator (e.g., the motor 424) is started, for example, by means of a switch (not shown), and is caused to turn in one direction. The motor 424 drives the drive shaft 422, which in turn causes the drive sprocket 410 to rotate. The timing belt 428 couples the (lower) drive shaft 422 to the (upper) drive shaft 430, so that they are "timed" and the (upper) drive shaft 430 rotates in unison with the (lower) drive shaft 422; and rotation of the (upper) drive shaft 430 in turn causes the (upper) drive sprocket 412 to rotate therewith. The lower and upper drive sprockets 410,412 are respectively engaged with a drive chain assembly 404,406 that is attached to the slide-out room 22. Accordingly, actuation of the motor 424 causes the drive sprockets 410,412 to rotate and drive the drive chain assemblies 404,406 engaged therewith such that the slide-out room 22 is translated along its path relative to and outward from the vehicle body 12. In an alternate embodiment (not shown), the motor 424 is not provided and the slide-out room 22 is only manually driven. In other embodiments, the vehicle 10 includes the slide-out compartment 30, which is driven either manually or via the motor 424 as detailed herein.

Figure 14:
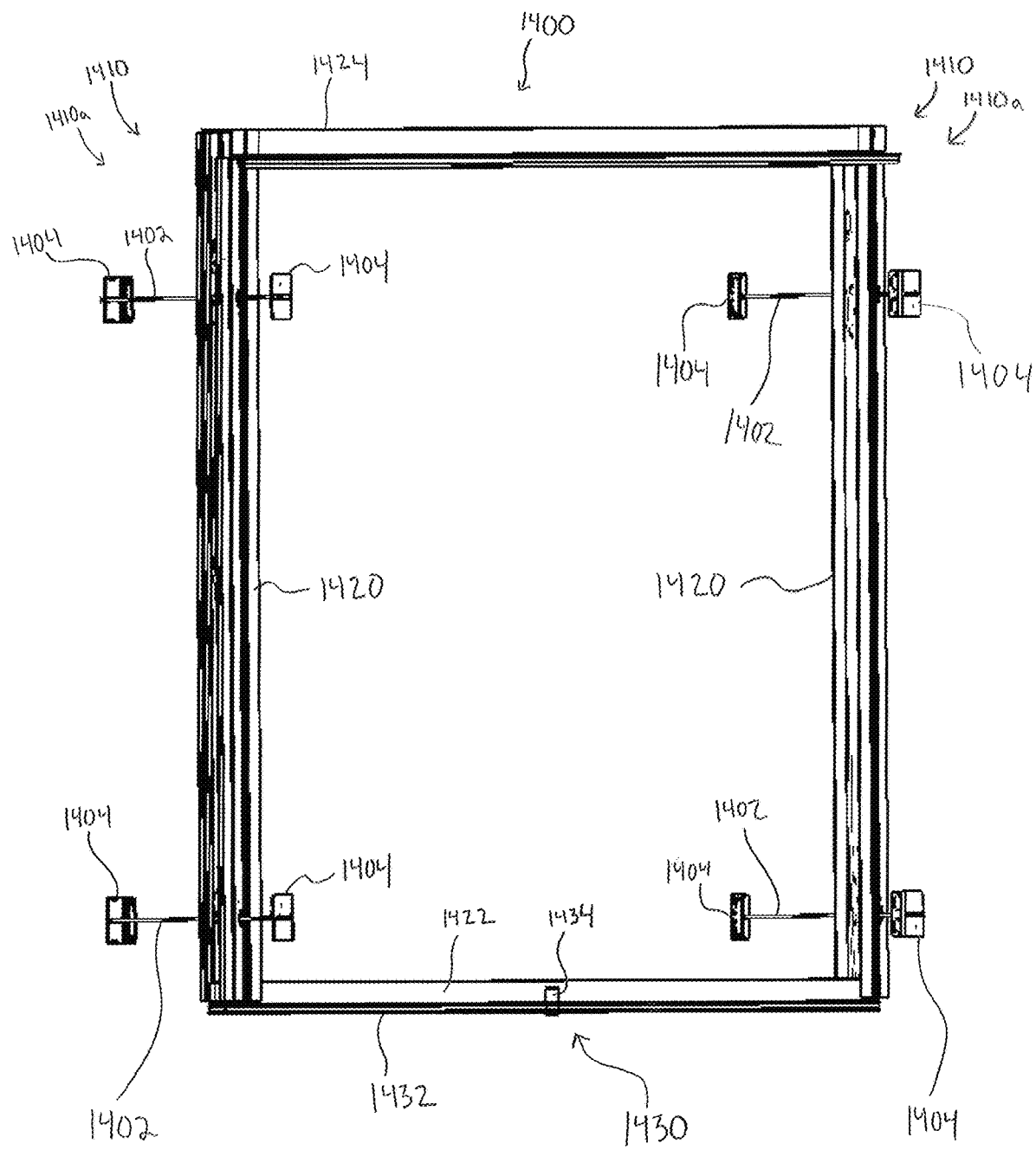
FIG. 14 illustrates a slide-out drive assembly configured to articulate the slide-out room between a retracted and extended position via a plurality of drive cables, according to one or more embodiments.
Figure 17A:
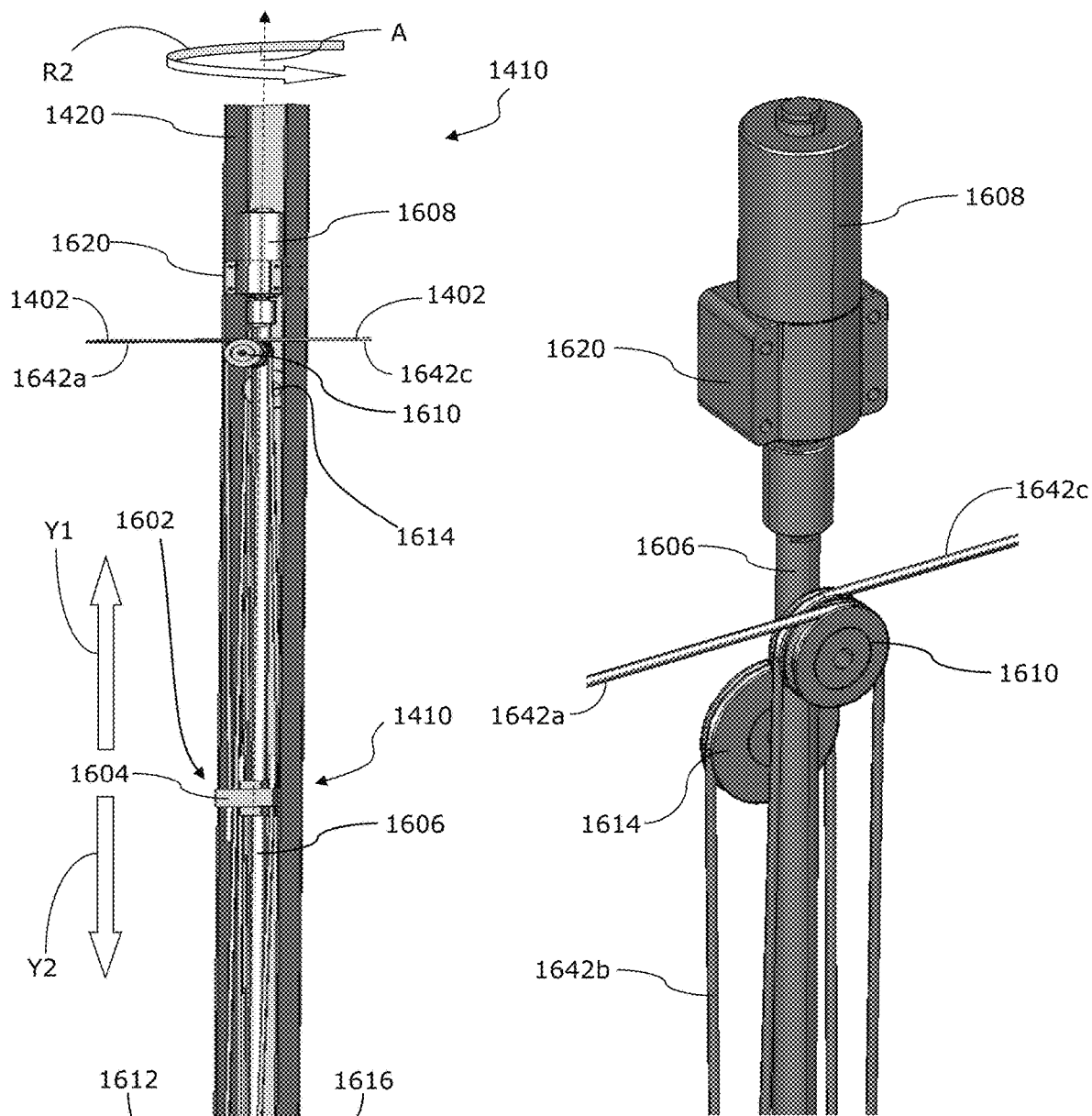
FIG. 17A illustrates a close up of an upper end of the jamb assembly of FIG. 16.
Figure 19:
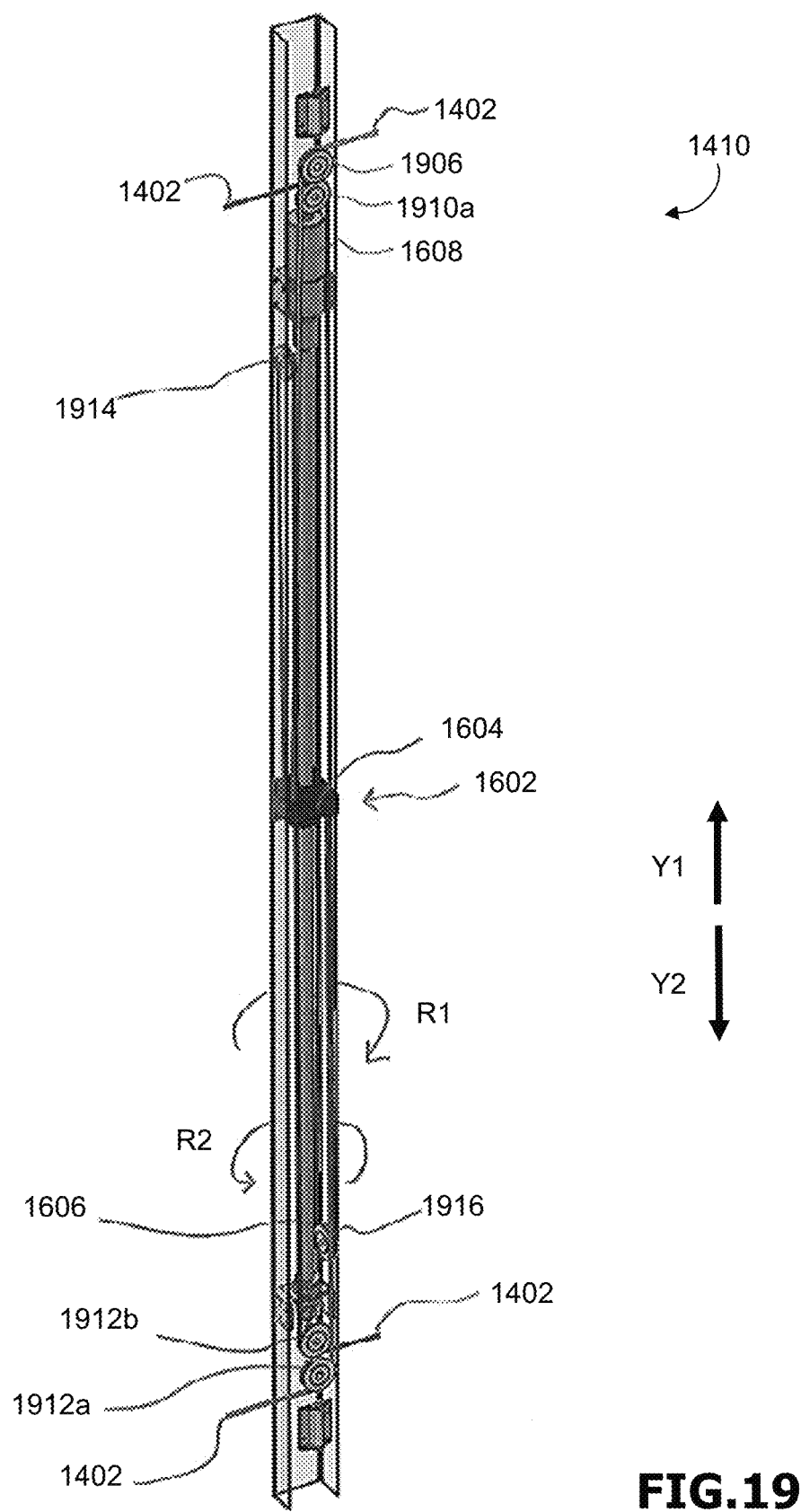
FIG. 19 illustrates another exemplary jamb assembly of FIG. 14 wherein a screw drive assembly actuates the drive cables, according to one or more embodiments.
Figure 20C:
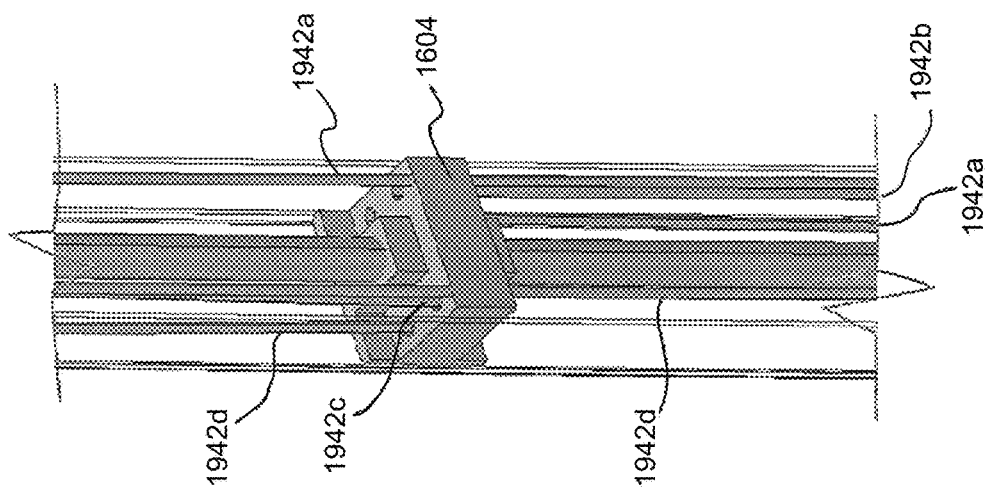
FIG. 20C illustrates a close up of a middle portion of the jamb assembly of FIG. 19.
Figure 20B:
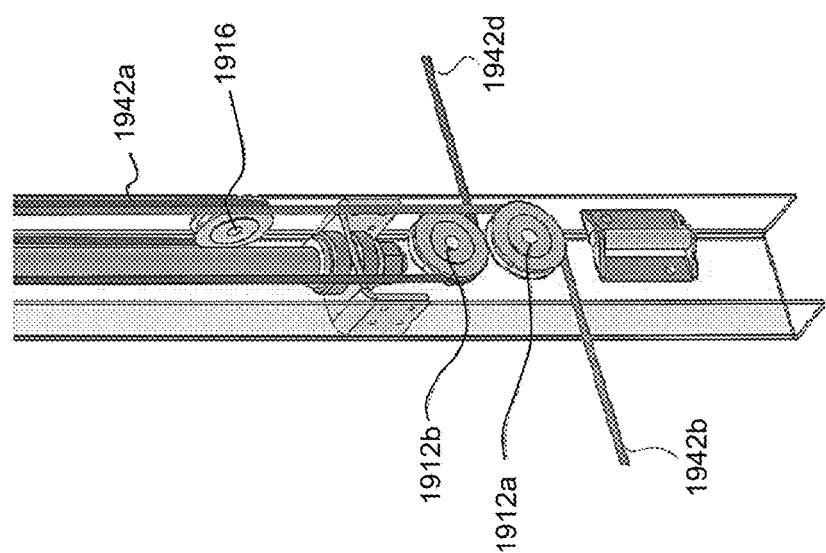
FIG. 20B illustrates a close up of a lower end of the jamb assembly of FIG. 19.
Figure 20A:
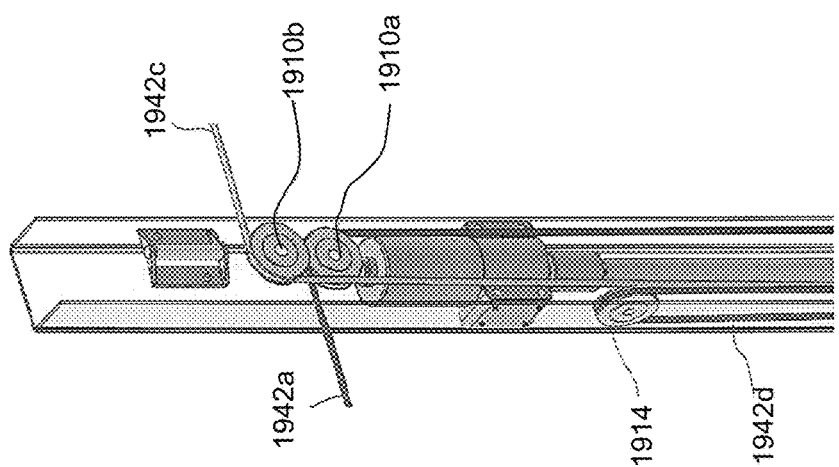
FIG. 20A illustrates a close up of an upper end of the jamb assembly of FIG. 19.
Figure 24:
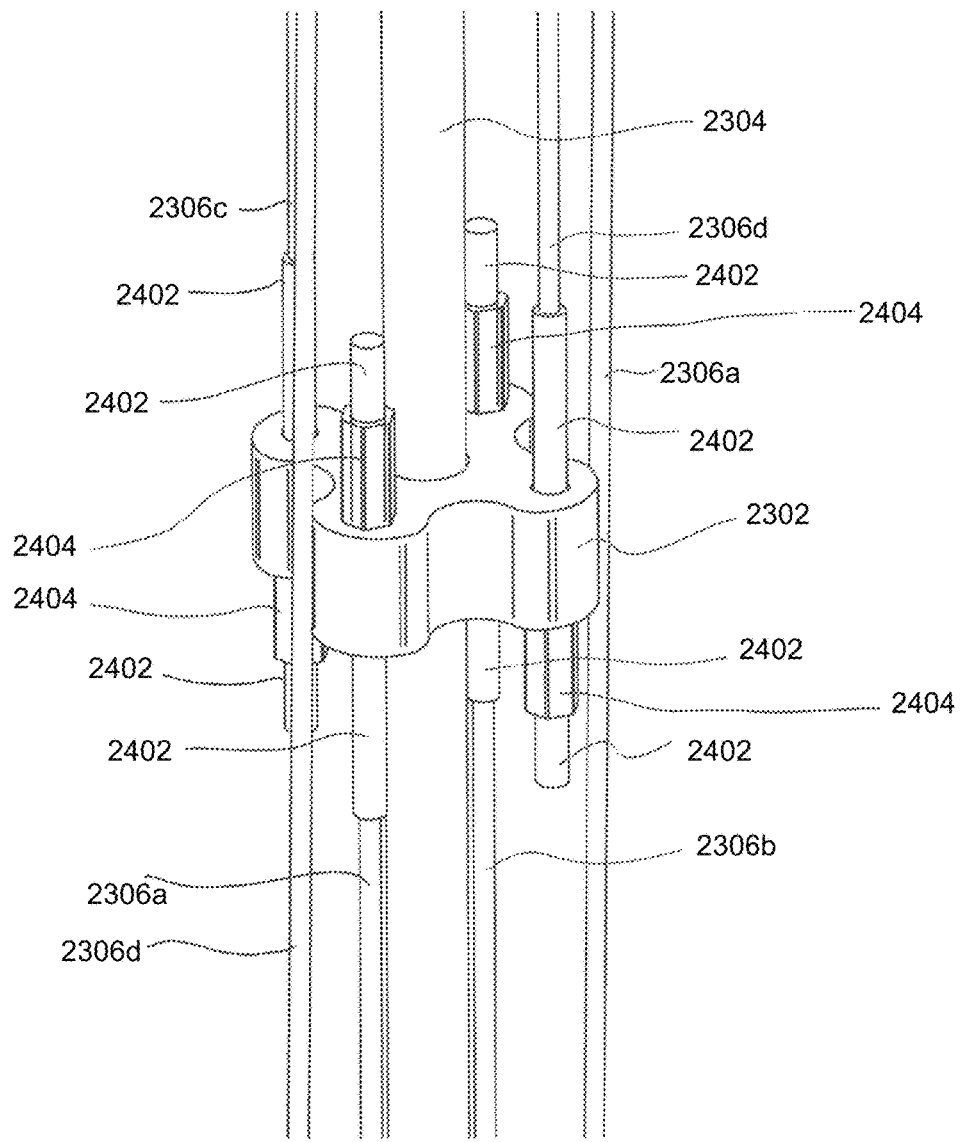
FIG. 24 illustrates a drive nut and drive cables of the screw drive assembly of FIG. 23, according to one or more embodiments.
Figure 23:
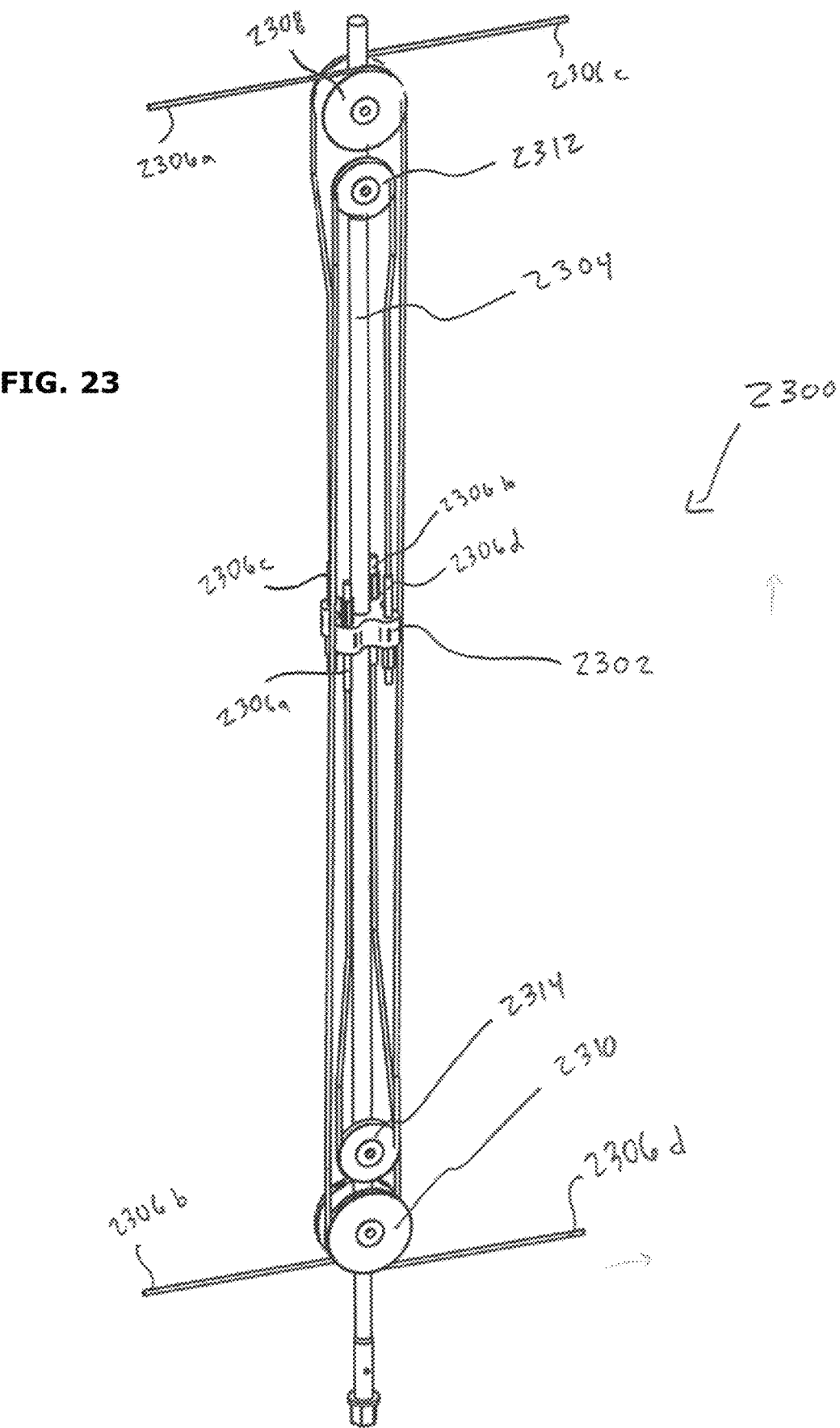
FIG. 23 illustrates an alternate screw drive assembly configured to actuate the drive cables to extend or retract the slide-out room from a vehicle, according to one or more embodiments.
Figure 25:
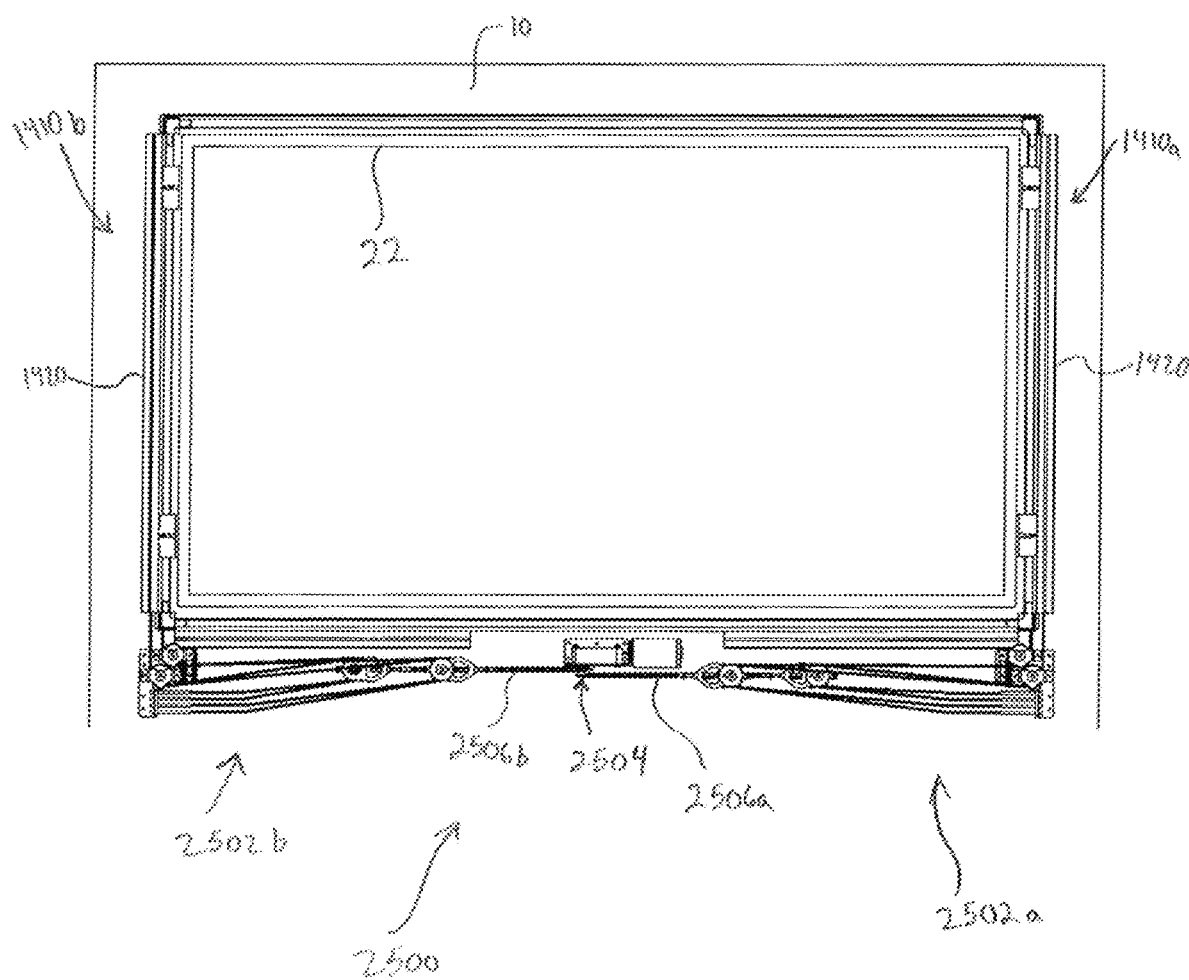
FIG. 25 illustrates a block and tackle drive assembly configured to articulate the slide-out room, according to one or more embodiments.
Figure 26:
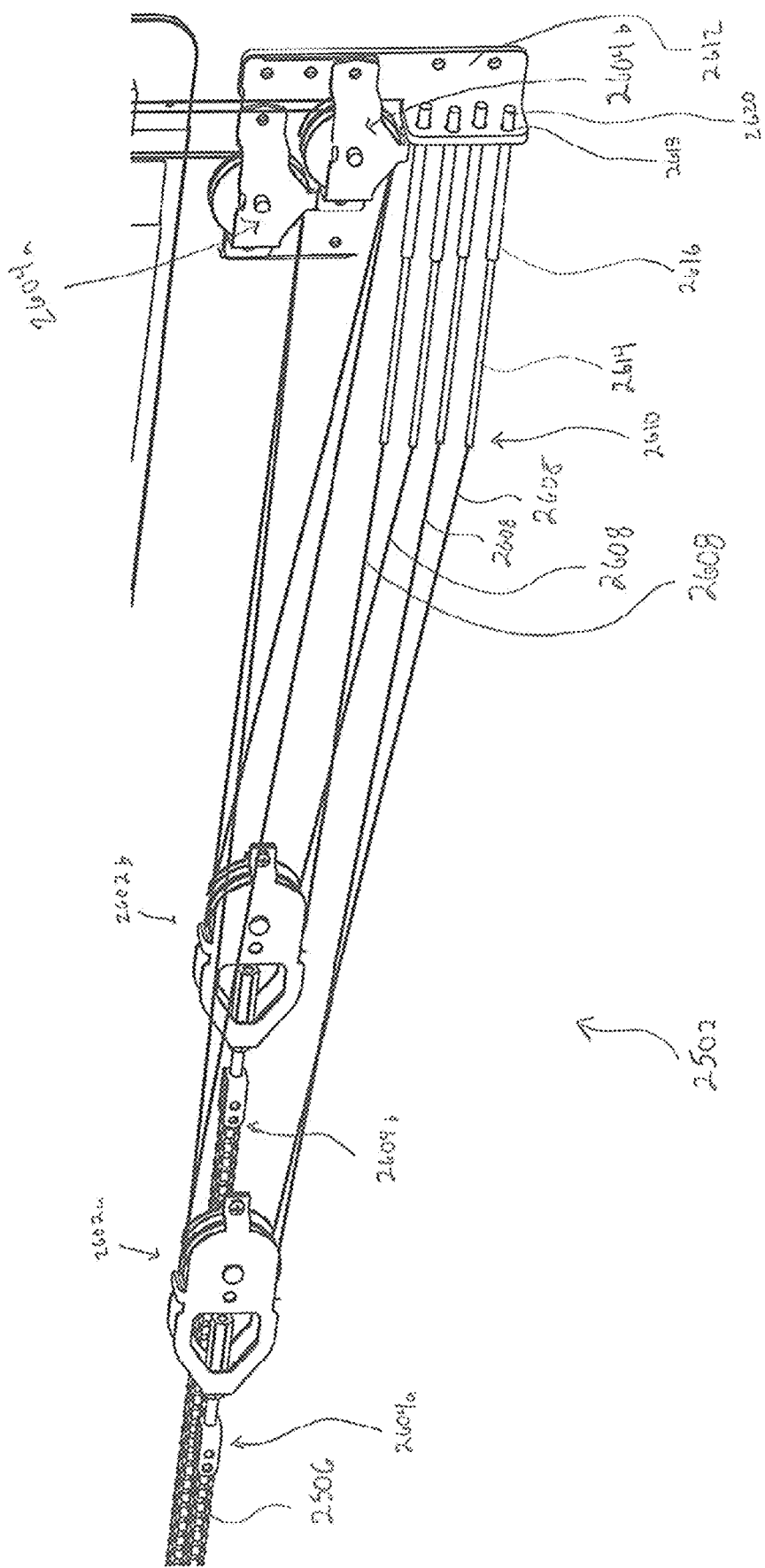
FIG. 26 illustrates a close up of one of the block and tackle assemblies of FIG. 25.
Figure 27:
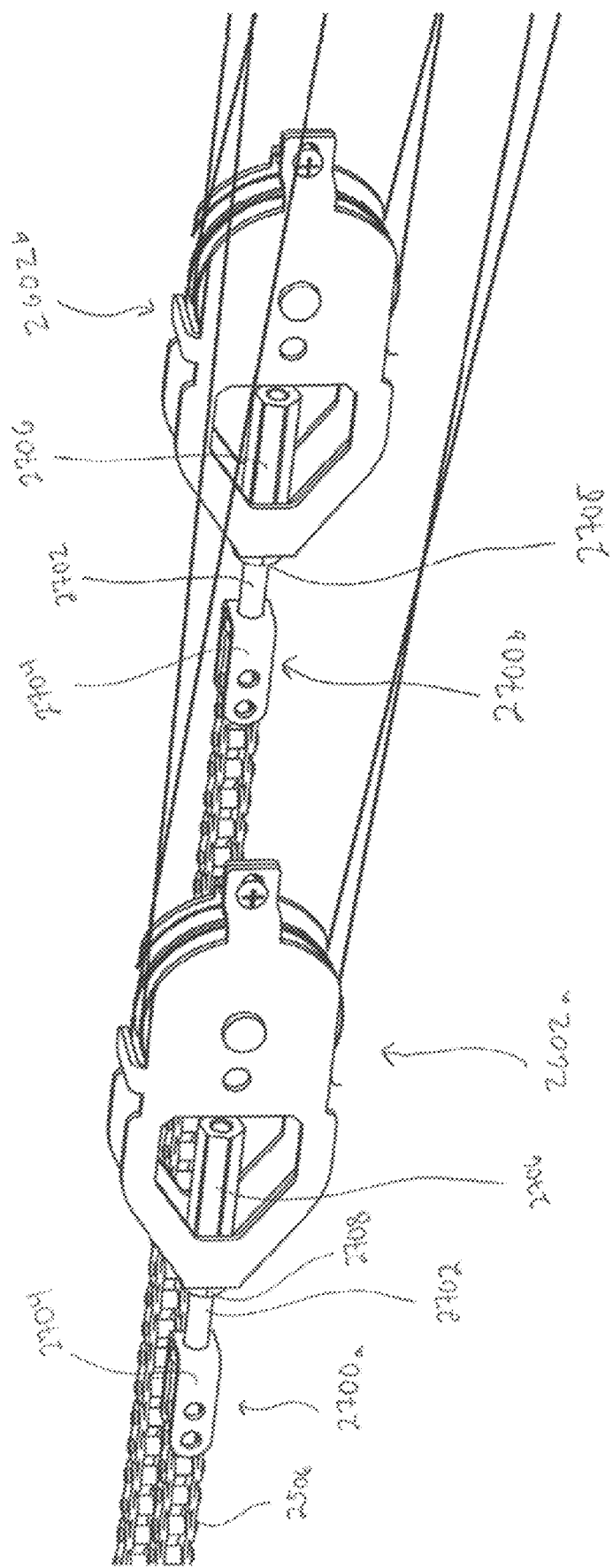
FIG. 27 illustrates a close up of the moving blocks and drive chain of FIG. 26.

Also described herein are various embodiments of jamb mounted slide-out drive assemblies utilizing cables to extend and retract the slide-out room 22 and which may be mounted along the jambs 20 of the opening 18 in the vehicle 10. FIG. 14 illustrates an exemplary jamb mounted slide-out drive assembly 1400 (hereinafter, the assembly 1400) configured to articulate the slide-out room 22 between a retracted and extended position via a plurality of drive cables 1402, according to one or more embodiments. The assembly 1400 is incorporated into the jambs surrounding the slide-out room 22 and may include various different configurations for actuating the drive cables 1402. For example, FIGS. 15A-15D illustrate an example of the assembly 1400 configured to actuate the drive cables 1402 via a drive chain 1502, according to one or more embodiments. As described below, the drive cables 1402 are adjustably connected to the drive chain 1502 that is in engagement with and driven by a motor 1504, such that actuation of the motor 1504 rotates the drive chain 1502, which in turn actuates the drive cables 1402. FIGS. 16-18 illustrate an example of the assembly 1400 configured to actuate the drive cables 1402 via a screw drive 1602, according to one or more embodiments. As described below, the screw drive 1602 includes a trunnion or drive nut 1604 and a threaded rod or drive shaft 1606 that is rotatable by a motor 1608. In these examples, the plurality of drive cables 1402 are adjustably connected to the drive nut 1604 that is in threaded engagement with the drive shaft 1606, such that actuation of the motor 1608 rotates the drive shaft 1606, thereby driving (or translating) the drive nut 1604 (linearly along the drive shaft 1606), which in turn actuates the drive cables 1402. FIGS. 19-21 illustrate yet another example of the assembly 1400 configured to actuate the drive cables 1402 via the screw drive 1602, according to one or more alternate embodiments. FIGS. 23-24 illustrate yet another example where the drive cables 1402 are actuated via an alternate screw drive assembly, according to one or more alternate embodiments. FIGS. 25-27 illustrate an example where the drive cables 1402 are actuated via a block and tackle drive assembly, according to one or more alternate embodiments. FIGS. 28-29 illustrate an example where a drive chain (e.g., configured as a continuous loop of chain, as a discontinuous segment or strand of chain, etc.) tensions one of the drive cables 1402 (or one cable end of one of the drive cables 1402) to move the slide-out room 22, such that the slide-out room 22 simultaneously activates the remaining drive cables 1402 to synchronize movement of the slide-out room 22, according to one or more alternate embodiments. As more fully described below, any of these configurations for actuating the drive cables 1402 may be incorporated into the jambs surrounding the slide-out room 22 and, therefore, incorporated into the assembly 1400.

With reference to FIGS. 14-15, each of the drive cables 1402 includes a first end and a second end, where the first ends of the drive cables 1402 may be secured to the slide-out room 22 via a cable mount 1404 and where the second ends of the drive cables may be coupled to the drive chain 1502. The length of the drive cables 1402 may be adjusted and, in the illustrated examples, the second ends of the drive cables 1402 are attached to a threaded rod 1406 to facilitate such adjustment as hereinafter described. Thus, the drive cables 1402 may be configured such that their length is adjusted at their second ends. In some examples, the first ends of the drive cables 1402 are also or instead configured to permit adjustment of the length of the drive cables 1402. For example, the first ends of the drive cables 1402 may include a threaded rod that is adjustable at the cable mount 1404.

In the illustrated examples, the assembly 1400 includes a pair of jamb assemblies 1410 (each, a jamb assembly 1410). For example, the pair of jamb assemblies 1410 may include a right jamb assembly 1410*a* and a left jamb assembly 1410*b* that correspond to the right sidewall 36 and the left sidewall 34, respectively, of the slide-out room 22. In other embodiments, the pair of jamb assemblies 1410 may be installed at a top and bottom of the opening 18, such that they correspond with a top side and a bottom side of the slide-out room 22. Where the pair of jamb assemblies 1410*a*re utilized, they may be similarly configured. In even other embodiments, just one of the jamb assemblies 1410 is provided on one side of the slide-out room 22, for example, the top jamb assembly 1410, the bottom jamb assembly 1410, the right jamb assembly 1410*a*, or the left jamb assembly 1410*b*. In one example, just one of the jamb assemblies 1410 is provided on the bottom side of the slide-out room 22.

Regardless of how the assembly 1400 is configured to actuate the drive cables 1402, it may be mounted within the opening 18 in the vehicle body 12 and, in particular, at the jambs 20 arranged about the opening 18. In the illustrated examples, each of the jamb assemblies 1410 includes a jamb member or frame member 1420 configured to secure the jamb assembly 1410 to the vehicle 20 (e.g., to the sidewall 16 thereof). In addition, the frame member 1420 is configured as a shroud to house the various drive components of the jamb assembly 1410*a*nd thereby protect such drive components. Thus, the frame member 1420 may secure the jamb assembly 1410*a*nd its various internal drive components (detailed below) to the vertical and/or horizontal edges of the opening 18. Here, the frame members 1420 secure the jam assemblies 1410 to the vertical edges of the opening 18. The jamb assemblies 1410 may also include one or more additional jamb members or frame members such that the assembly 1400 defines a frame about the slide-out room 22. Here, for example, jamb assemblies 1410 also includes a bottom frame member 1422 and a top frame member 1424, such that the frame members 1420 (i.e., of the left and right jamb assemblies 1410*a*,1410*b*), the bottom frame member 1422, and the top frame member 1424 together define a square shaped frame surrounding the slide-out room 22. Also, any or all of the frame members 1420, the bottom frame member 1422, and the top frame member 1424 may be configured to form a seal with the slide-out room 22 to inhibit ingression of debris to within the vehicle 10. In addition, as described below, any or all of the frame members 1420, the bottom frame member 1422, and the top frame member 1424 may be configured to guide or track the slide-out room 22 evenly within the opening 18 in the vehicle 10 and/or be configured to cover or house timing mechanisms that synchronize operation of the jamb assemblies 1410*a*,1410*b*. For example, any or all of the frame members 1420, the bottom frame member 1422, and the top frame member 1424 may include a tracking roller assembly as described with reference to FIG. 22.

Each of the jamb assemblies 1410 may include a motor or actuator, as described below. In some embodiments, just one of the jamb assemblies 1410 includes a motor. The motors may be arranged within the frame member 1420 or exterior of the frame. The frame member 1420 may have various configuration and, in the illustrated examples, the frame member 1420 is an extruded member having a web portion and a pair of opposing sidewalls (or flanges) in the form of a "C" beam.

Regardless of how many motors are utilized and where they are arranged, however, the jamb assemblies 1410 may be "timed" or synchronized such that they operate in unison. Where each of the jamb assemblies 1410 includes a separate motor/actuator, the motors/actuators may be electronically timed via sensors and/or feedback. The jamb assemblies 1410 may also be mechanically "timed" or synchronized via a timing mechanism such as a timing shaft or cross bar 1412. For example, where each of the jamb assemblies 1410 includes a separate motor/actuator, a mechanical timing mechanism 1430 may be utilized to ensure that the jamb assemblies 1410 operate in unison. Also, where just one of the jamb assemblies 1410 includes a motor, the mechanical timing mechanism 1430 may be utilized to transfer power to the jamb assembly 1410 without the motor. In some examples, each of the jamb assemblies 1410 includes a separate motor/actuator and the separate motors/actuators are both electronically timed and mechanically timed (e.g., the mechanical timing mechanism 1430).

In the illustrated example, the mechanical timing mechanism 1430 includes a timing shaft 1432; however, other timing mechanisms may be utilized in addition to or in lieu thereof, such as a timing belt. Here, the timing shaft 1432 is shrouded by the bottom frame member 1422 and is supported therein via a support 1434. Thus, in the illustrated example, timing mechanism 1430 is configured within the bottom frame member 1422; however, the bottom frame member 1422 and/or the support 1434 are optional. In other examples, the timing shaft 1432 may instead be arranged within the top frame member 1424. In even other examples, both the bottom frame member 1422 and the top frame member 1424 include the timing mechanism 1430.

Figure 15A:
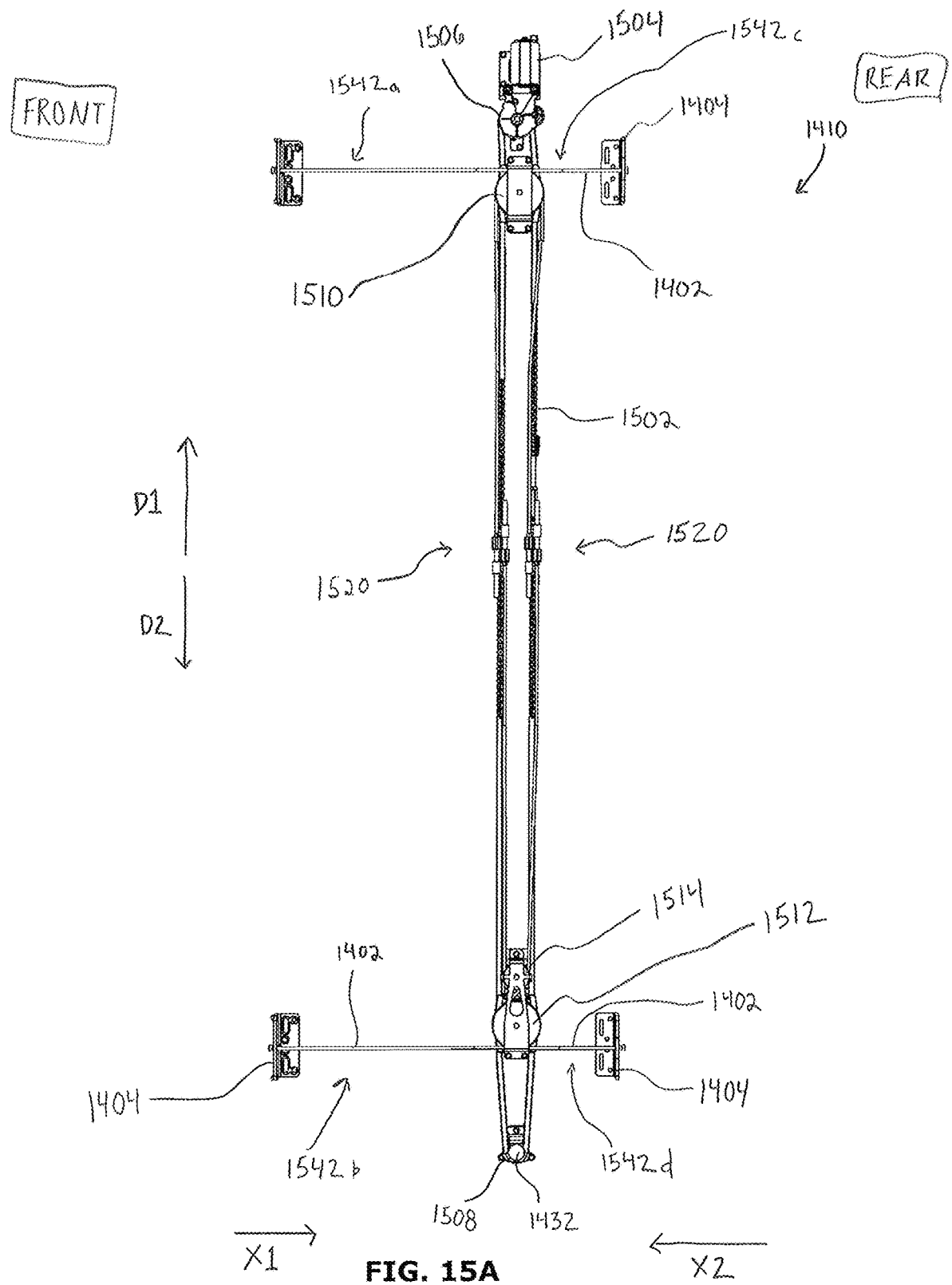
FIG. 15A illustrates an exemplary jamb assembly of FIG. 14 wherein the drive cables are actuated via a drive chain, according to one or more embodiments.
Figure 15B:
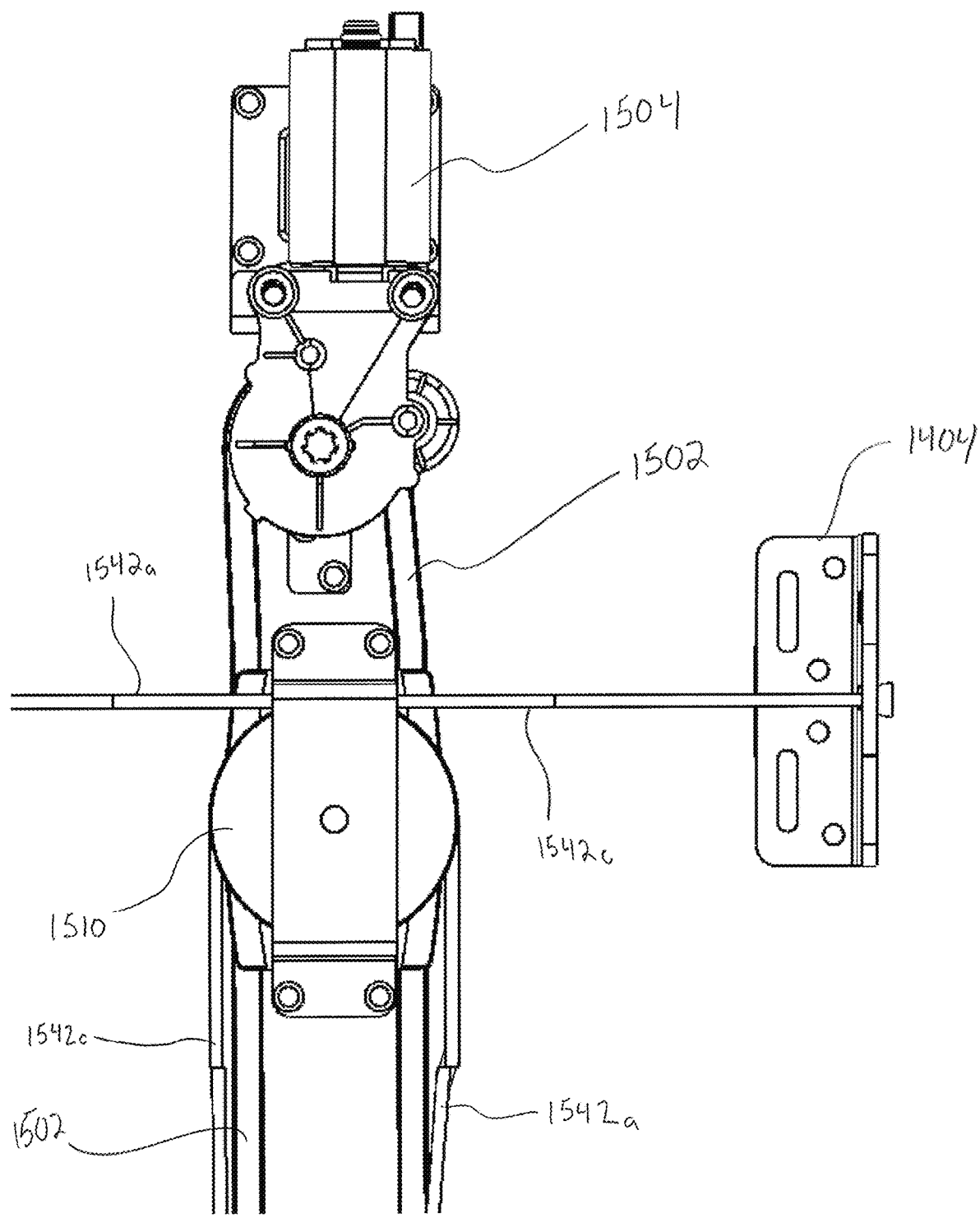
FIG. 15B illustrates a close up of an upper end of the jamb assembly of FIG. 15A.
Figure 15C:
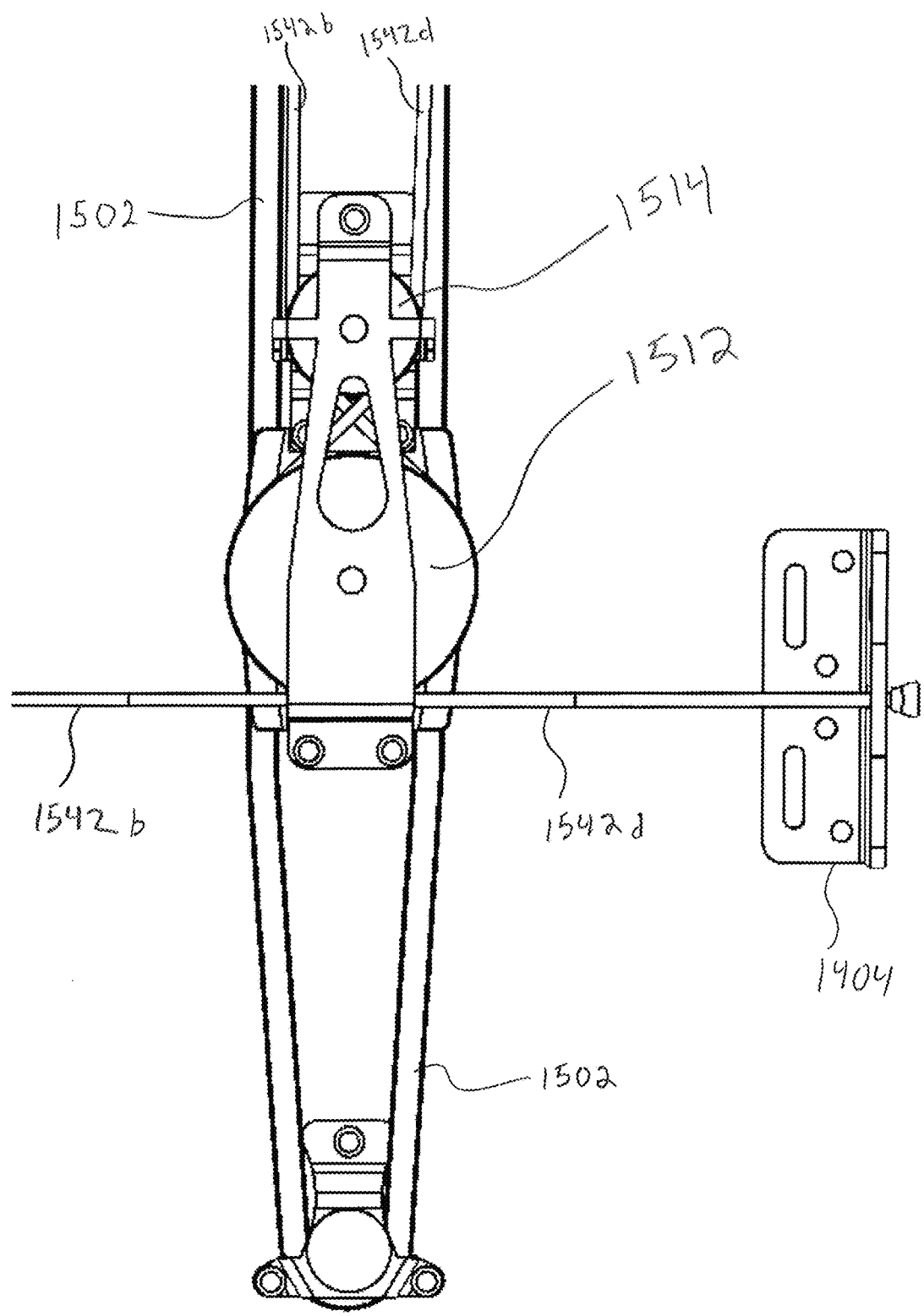
FIG. 15C illustrates a close up of a lower end of the jamb assembly of FIG. 15A.
Figure 15D:
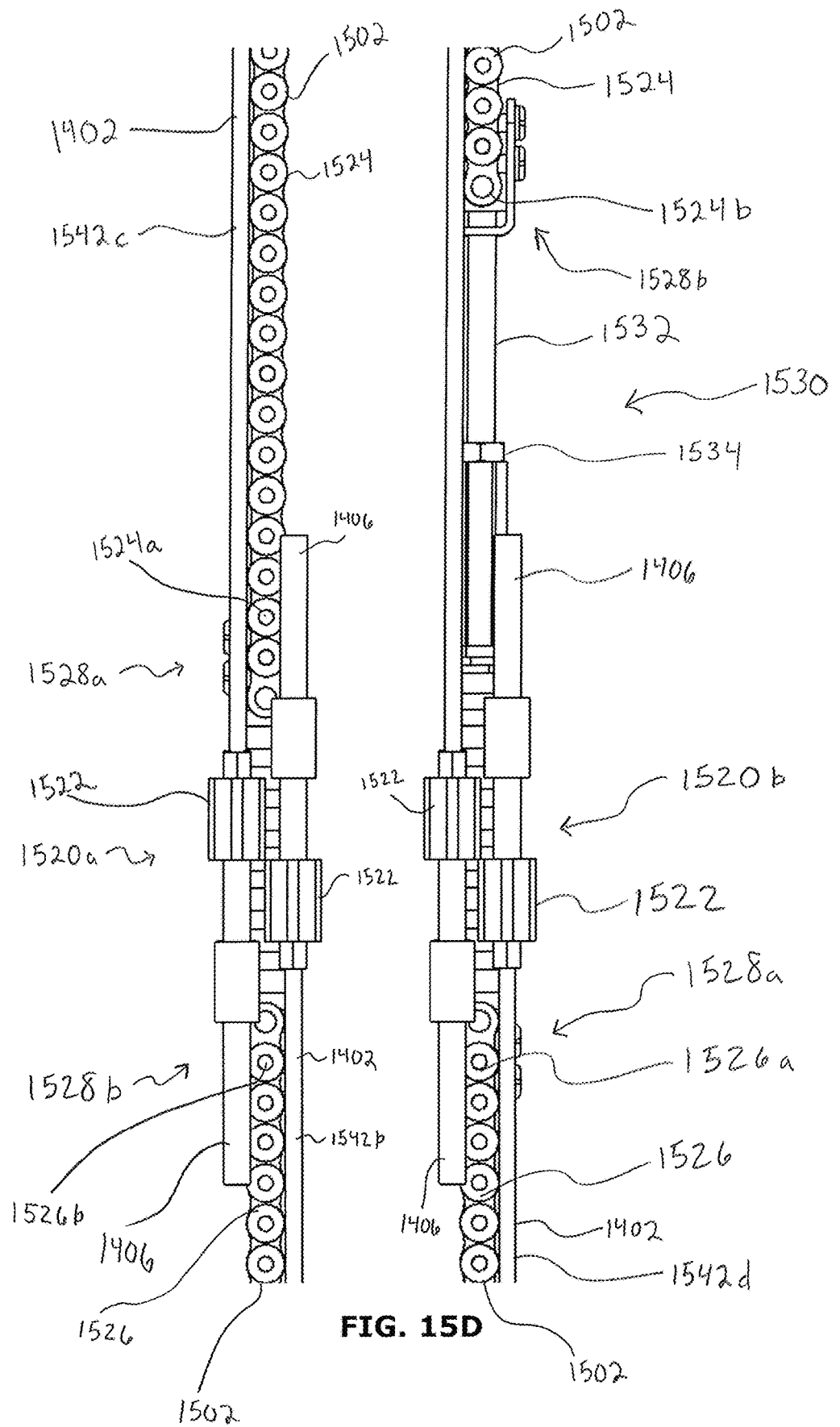
FIG. 15D illustrates a close up of a middle portion of the jamb assembly of FIG. 15A.
Figure 16:
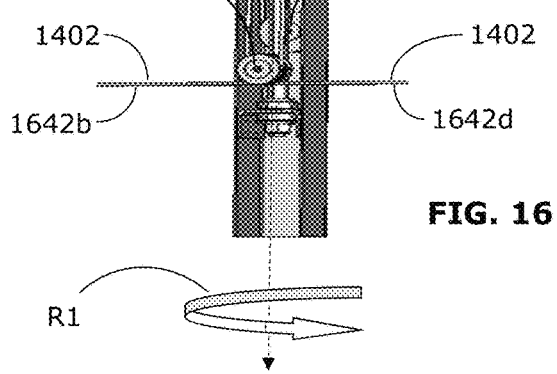
FIG. 16 illustrates an exemplary jamb assembly of FIG. 14 wherein a screw drive assembly actuates the drive cables, according to one or more embodiments.

FIGS. 15A-15D illustrate one of the jamb assemblies 1410 configured to actuate the drive cables 1402 via the drive chain 1502, according to one or more embodiments. FIG. 15A is a side view of the jamb assembly 1410 configured with the drive chain 1502. FIG. 15B illustrates a close up of a top end of the jamb assembly 1410 of FIG. 15A. FIG. 15C illustrates a close up of a bottom end of the jamb assembly 1400 of FIG. 15A. FIG. 15D illustrates a close up of a middle portion of the jamb assembly 1410 of FIG. 15A.

In the exemplary embodiment of FIGS. 15A-15D, the drive chain 1502, the motor 1504, and other drive components of the jamb assembly 1400 are arranged within the frame member 1420. The frame member 1420, however, is not illustrated in these figures to facilitate illustration of the drive chain 1502, the motor 1504, and the other drive components arranged therein. In these illustrated examples, the jamb assembly 1410 further includes a drive sprocket 1506 and an idler sprocket 1508 that are configured to receive the drive chain 1502. The motor 1504 is coupled to the drive sprocket 1506 such that the motor 1504 may impart rotation to the drive sprocket 1506. In addition, the drive sprocket 1506 and the idler sprocket 1508 each include teeth that mesh with the drive chain 1502. Thus, rotation of the drive sprocket 1506 causes the drive chain 1502 to travel along a predefined path according to the geometry and placement of the drive sprocket 1506 and the idler sprocket 1508. The drive sprocket 1506 and idler sprocket 1508 may be secured at various locations within the frame member 1420 and, in the illustrated embodiment, the drive sprocket 1506 is secured at a top end of the frame member 1420 and the idler sprocket 1508 is secured at a bottom end of the frame member 1420. Similarly, the motor 504 may be arranged within the frame member 1420.

The drive sprocket 1506 is configured to be rotated, and thereby drive the drive chain 1502. Torque may be imparted to the drive sprocket 1506 via any number of manners. For example, the drive sprocket 1506 may be manually rotated or coupled to an electronically controlled actuator such as the motor 1504 that is configured to impart torque to the drive sprocket 1506. Accordingly, the motor 1504 may be actuated to rotate the drive chain 1502 in a first or second direction about the drive sprocket 1506 and the idler sprocket 1508.

The idler sprocket 1508 may be configured with a timing shaft to synchronize operation of the pair of jamb assemblies 1410. In the illustrated example, the idler sprocket 1508 is coupled to the timing shaft 1432 configured to synchronize the right and left jamb assemblies 1410*a*,1410*b*. Not only does the timing shaft 1432 time or synchronize operation of the jamb assemblies 1410, but it facilitates manually overriding one of the jamb assemblies 1410, as an individual one of the jamb assemblies 1410 (e.g., the right jamb assembly 1410*a*) may be manually manipulated and that action will be communicated to the other one of the jamb assemblies 1410 (e.g., the left jamb assembly 1410*b*) via the timing shaft 1432. In the illustrated embodiment, the timing shaft 1432 couples the idler sprocket 1508 of the right jamb assembly 1410*a* to the idler sprocket 1508 of the left jamb assembly 1410*b*. Accordingly, the motor 1504 in each of the jamb assemblies 1410 will be timed or synchronized. In other embodiments, the motor 1504 may be provided in only one of the jamb assemblies 1410and, in these other embodiments, the timing shaft 1432 operates as a drive member for the jamb assembly 1410 without the motor 1504 by transferring torque thereto.

The jamb assemblies 1410 may also be configured with a plurality of guides or pulleys for routing the drive cables 1402 as hereinafter described. In the illustrated embodiment, a top and bottom cable guide 1510,1512 are provided and secured at top and bottom ends of the frame member 1420, respectively. Here, the top and bottom cable guides 1510, 1512 are configured as double pulleys such that they each may receive a pair of the drive cables 1402 without interfering with each other or causing rubbing or friction between the drive cables 1402. The top and bottom cable guides 1510,1512 may be configured as double pulleys. This means, for example, that the top cable guide 1510 includes a pair of independent pulleys that may rotate relative to each other, or include independent cable tracks, so as to permit a pair of drive cables 1402 to travel therein in opposing direction without interference; and the bottom cable guide 1512 may be similarly configured. Also in this embodiment, a cable idler 1514 is provided proximate to the bottom cable guide 1512 for redirecting the path of any of the drive cables 1402 as hereinafter described; and, where utilized, the cable idler may also be configured as a double pulley, such that it may guide a pair of the drive cables 1402 without interference, rubbing, or friction between the drive cables 1402.

In the illustrated embodiment, the drive chain 1502 is coupled to the drive cables 1402 and, as the drive chain 1502 is rotated in a first direction D1 or a second direction D2 about the drive sprocket 1506 and the idler sprocket 1508, the drive chain 1502 pulls the drive cables 1402 to extend or retract the slide-out room 22.

After extended use of the assembly 1400, the drive cables 1402 may become stretched from their original lengths, and the different drive cables 1402 may be stretched different amounts such that they have different overall lengths, thereby causing misalignment that may inhibit the slide-out room 22 from being fully retracted. For example, the bottom set of drive cables 1402 may be subject to the greatest load of all of the drive cables 1402 and, therefore, the working length thereof may stretch out or expand to a greater degree than the other cables, and this may result in the assembly 1400 becoming misaligned. Thus, the drive cables 1402 may need to be adjusted periodically to ensure that they are of the optimal working length. In the illustrated examples, the drive cables 1402 are adjustably coupled to drive chain 1502 via a pair of cable chain connectors 1520 (hereinafter, individually referred to as the "connector 1520"). The connector 1520 is configured to couple the drive chain 1502 to one or more drive cables 1402 such that the drive cables 1402 extend or retract from the jamb assembly 1410*a*s the drive chain 1502 rotates.

FIG. 15D illustrates a close-up view of a first connector and a second connector 1520*a*,1520, according to one or more embodiments. The first and second connectors 1520a, 1520b may be identically configured or be differently configured with respect to each other. In particular, a first pair of the cables 1402 are adjustably connected to the drive chain 1502 via the first connector 1520a and a second pair of the drive cables 1402 are adjustably connected to the drive chain 1502 via the second connector 1520b. Thus, two connectors 1520 (i.e., the first and second connectors 1520a, 1520b) may be utilized to couple the four (4) drive cables 1402 to the drive chain 1502. However, a single connector 1520 may be utilized to connect the four (4) drive cables 1402 to the drive chain 1502 if two (2) of the drive cables 1402 are re-routed over pulleys or guides.

The connector 1520 is configured to secure to the drive chain 1502 and to secure to an end of the cable 1402 (i.e., the end that is not secured to the slide-out room 22), such connector 1520 interconnects the drive cables 1402 and the drive chain 1502. In this manner, the cable 1402 is coupled to the drive chain 1502 such that the cable 1402 will move with the drive chain 1502. Also, the connector 1520 is configured to be attached to the drive chain 1502 regardless of whether the drive chain 1502 is provided as a closed loop (without any free ends), or whether the drive chain 1502 is open with first and second loose ends, or whether the drive chain 1502 is formed from a pair of open chains that each include a pair of loose ends. Thus, the drive chain 1502 defines an endless loop during operation regardless of how it is provided.

The connectors 1520 are configured to permit adjustment of the drive cables 1402 and the drive chain 1502. The connector 1520 is configured to permit adjustment of the drive cables 1402, such that the working length of the drive cables 1402 may be lengthened or shortened as needed in a particular application. As used herein, the term "working length" of a particular one of the drive cables 1402 means the length of the drive cable extending between the cable mount 1404 and the connector 1520. In the illustrated example, the connectors 1520 each include an adjustment nut 1522 that receives the threaded rod 1406 of the drive cables 1402. Here, the adjustment nut 1522 may be rotated to move the threaded rod 1406 extending there-through, forward or backward, which in turn will add tension or remove tension from the drive cable 1402 associated therewith. Thus, the working length of the drive cables 1402 may be adjusted by rotating the adjustment nut 1522.

As mentioned, the connector 1520 may also be configured to permit adjustment of the chain 1502. In the illustrated example, the drive chain 1502 is comprised of a first and second chain length 1524,1526 that each include a first and second loose end. Thus, the first chain length 1524 includes a pair of loose ends 1524a,1524b and the second chain length 1526 includes a pair of loose ends 1526a,1526b. Here, each of the connectors 1520,1520b has a first and second chain mounting end 1528a,1528b, such that the loose ends 1524a,1524b of the first chain length 1524 are secured to the first mounting end 1528a of the first connector 1520a and the second mounting end 1528b of the second connector 1520b, receptively, and such that the loose ends 1526a, 1526b of the second chain length 1526 are secured to the first mounting end 1528a of the second connector 1520b and the second mounting end 1528b of the first connector 1520a, respectively. The drive chain 1502 may be secured to the connector 1520 via a variety of manners and, in the illustrated example, the loose ends 1524a,1524b,1526a,1526b of the first and second chain lengths 1524,1526 are pinned to the first and second mounting ends 1528a,1528b, respectively. Either or both of the connectors 1520a,1520b may be configured to permit adjustment to the chain lengths 1524, 1526. In the illustrated example, the second mounting end 1528b of the second connector 1520b includes a chain adjustment portion 1530. Here, the chain adjustment portion 1530 includes a threaded rod 1532 and an adjustment nut 1534, where rotation of the adjustment nut 1534 will extend or retract the threaded rod 1532, thereby effectively increasing the length of the chain length 1524 and, thus, the overall length of the drive chain 1502. The chain adjustment portion 1530 may instead be provided on the first mounting end 1528a, or provided on both the first and second mounting ends 1528a,1528b; also, the first and/or second mounting ends 1528a,1528b of the first connector 1520a may similarly be configured with the chain adjustment portion. Thus, just one of the connectors 1520 may have the chain adjustment portion 1530, or both of the connectors 1520a,1520b may have at least one chain adjustment portion 1530.

As previously mentioned, the drive cables each include a first end where they are attached to an anchor mount 1404 and a second at which they are attached to the connector 1520. Thus, the drive cables 1402 are coupled to the slide-out room 22 at their first ends and coupled to the vehicle 10 body at their second ends. In the illustrated embodiment, the anchor 1404 is a bracket that is mounted to the sidewall of the slide-out room 22. However, the drive cables 1502 may be differently secured to the slide-out room 22 via other anchoring means.

In the illustrated embodiments, eight (8) of the drive cables 1402 are utilized, where four (4) of the drive cables 1402 may be utilized for pulling the slide-out room 22 out of the vehicle 10 (i.e., connected proximate to the rear frame 408 of the slide-out room 22) and where the other four (4) drive cables 1402 may be utilized for pulling the slide-out room 22 into the vehicle 10 (i.e., connected proximate to the outside wall 38 of the slide-out room 22). Accordingly, four (4) of the drive cables 1402 may be arranged on each of the opposing left and right sidewalls 34,36 of the slid-out room 22, with each of the drive cables 1402 being secured at one of its first end to a corner of the slide-out room 22. Each of the drive cables 1402 then extends into its associated jamb or frame member 1420, wraps around a guide member(s) or pulley(s) arranged within the frame member 1420, and connects (at its second end) to the drive chain 1502 via the connector 1520. Thus, for example, when the drive chain 1502 rotates in the first direction D1, it pulls the four (4) drive cables 1402 attached at the upper and lower corners of the sidewalls that are proximate to the front wall 14 of the slide-out room 22, and simultaneously gives slack in the other four (4) drive cables 1402 attached at the upper and lower corners of the sidewalls that are proximate to the rear wall of the slide-out room 22. For example, rotation of the drive chain 1502 in the first direction D1 pulls a front upper and front lower drive cable 1542a,b in a direction X1, while simultaneously providing slack to a rear upper and rear lower drive cable 1542c,d to facilitate retraction of the slide-out room 22; whereas, rotation of the drive chain 1502 in the second direction D2 pulls a rear upper and rear lower drive cable 1542c,d in a direction X2, while simultaneously providing slack to the front upper and front lower drive cable 1542a,b to facilitate extension of the slide-out room 22 from the vehicle 10.

In the illustrated embodiment, the drive chain 1502 is connected to a pair of the connectors 1520, and each of the connectors 1520 is secured to two (2) of the drive cables 1402. Also, the cables 1402 extend from opposite sides of the connector 1520 such that, as the drive chain 1502 rotates in the first direction D1, some of the cables 1402 (i.e., the rear upper and rear lower drive cables 1542*c,d*) will give slack in direction X1 and the other drive cables 1402 (i.e., the front upper and front lower drive cables 1542*a,b*) will be pulled in that direction X1.

In the illustrated example of FIGS. 15A-15D, the first connector 1520*a* is coupled to the rear upper drive cable 1542*c* and the front lower drive cable 1542*b*, where the rear upper drive cable 1542*c* is secured to an upper rear side of the slide-out room 22 and the front lower drive cable 1542*b* is secured to a lower front side of the slide-out room 22. Similarly, the second connector 1520*b* is coupled to the front upper drive cable 1542*a* and the rear lower drive cable 1542*d*, where the front upper cable 1542*a* is secured to an upper front side of the slide-out room 22 and the rear lower drive cable 1542*d* is secured to a lower rear side of the slide-out room 22. The front upper drive cable 1542*a* extends upward from the second connector 1520*b* towards the upper end of the frame member 1420, up and around a first cable track of the top cable guide 1510, and out a front upper opening in the frame member 1420 towards the front of the slide-out room 22. The rear lower drive cable 1542*d* extends downward from the second connector 1520*b*, along a first cable track of the cable idler 1514 (thereby redirecting the rear lower drive cable 1542*d*), down and around a first cable track of the bottom cable guide 1512, and out a rear lower opening in the frame member 1420 towards the rear of the slide-out room 22. The front lower drive cable 1542*b* extends downward from the first connector 1520*a*, along a second cable track of the cable idler 1514 (thereby redirecting the front lower drive cable 1542*b*), down and around a second cable track of the bottom cable guide 1512, and out a front lower opening in the frame member 1420 towards the front of the slide-out room 22. Finally, the rear upper drive cable 1542*c* extends upward from the first adjuster 1520*a* toward the upper end of the frame member 1420, up and around a second cable track of the top cable guide 1510, and out a rear upper opening in the frame member 1420 towards the rear of the slide-out room 22.

Accordingly, when the drive chain 1502 rotates in the first direction D1, the drive chain 1502 pulls the front upper drive cable 1542*a* and the front lower drive cable 1542*b* and pushes or slackens (i.e, provides slack in) the rear upper drive cable 1542*c* and the rear lower drive cable 1542*d*. In this manner, the front side of the slide-out room 22 may be pulled towards the opening 18 in the vehicle 10 via the front upper and lower drive cables 1542*a*,1542*b* such that the slide-out room 22 is retracted within the vehicle 10. When the drive chain 1502 rotates in the second direction D2, the drive chain 1502 pulls the rear upper drive cable 1542*c* and the rear lower drive cable 1542*d*, while pushing or slackening (i.e., providing slack in) the front upper and lower drive cables 1542*a*,154*bc*. In this manner, the rear side of the slide-out room 22 may be pulled towards the opening 18 in the vehicle 10 via the rear upper drive cable 1542*c* and the rear lower drive cable 1542*d* such that the slide-out room 22 is extended from within the vehicle 10.

In these embodiments, the motor 1504 may be arranged in each of the jamb assemblies 1410*a*,1410*b* to drive one of the sprockets (e.g., the drive sprocket 1506 or the idler sprocket 1508) therein and engage the other sprocket therein (e.g., the idler sprocket 1508 or the drive sprocket 1506) via the drive chain 1502 configured as an endless chain that is also arranged therein; and in such embodiments, the motors 1504 in the opposing jamb assembly 1410 may be synchronized or timed, for example, via a Hall effect sensor. In even other embodiments, the slide-out drive assembly includes a timing shaft or belt that synchronizes the rotation of the drive sprockets that are arranged in the opposing jambs. In some of these embodiments, a single motor may be provided within one of the jambs (i.e., the drive side jamb) to power the drive sprocket in the drive side jamb as well as the timing shaft or belt, and the timing shaft or belt in turn drives the drive sprocket arranged in the opposing jamb (i.e., the slave side jamb) such that the drive sprockets in the drive side jamb and the slave side jamb are synchronized, as will be appreciated by those skilled in the art. In even other embodiments, both the drive side jamb and the slave side jamb include a motor and their respective drive sprockets (and/or idler sprockets) are synchronized with a timing shaft or belt, as will be appreciated by those skilled in the art.

As mentioned, the assembly 1400 may include the screw drive 1602 that is configured to actuate the drive cables 1402. FIGS. 16-18 illustrate an example of the jamb assembly 1410 configured with the screw drive 1602 according to one or more embodiments, whereas FIGS. 19-21 and FIGS. 23-24 illustrate alternate examples of screw drives utilizable with the jamb assembly 1410, according to various alternate embodiments. In these examples, the screw drive 1602 may be arranged within the frame member or jamb member 1420. Here, the motor 1608 is arranged within an upper end of the frame member 1420 and the drive shaft 1606 extends, vertically along an axis A of the drive shaft 1606, from the upper end of the frame member 1420 towards a lower end of the frame member 1420. The drive shaft 1606 is coupled to the motor 1608, such that actuation of the motor 1608 rotates the drive shaft 1606 in a first or second rotational direction R1,R2 about the axis A. The drive shaft 1606 may be configured as a threaded rod. Also, the drive nut 1604 includes a bore through which the drive shaft 1606 extends. The bore of the drive nut 1604 is configured to engage the drive shaft 1606, such that rotation of the drive shaft in the first rotational direction R1 causes the drive nut 1604 to translate along the axis A of the drive shaft 1606 in a first axial direction Y1, and rotation of the drive shaft 1606 in the second rotational direction R2 (that is opposite the first rotational direction R1) causes the drive nut 1604 to translate along the axis A of the drive shaft 1606 in a second axial direction Y2 (that is opposite of the first axial direction Y1). The manner in which the screw drive 1602 translates rotation of the drive shaft 1606 into linear movement of the drive nut 1604 may vary. For example, the screw drive 1602 may be configured as an acme screw, a ball screw, etc.

In these examples, the jamb assemblies 1410 may also be configured with a plurality of guides or pulleys for routing the drive cables 1402 as hereinafter described. In the illustrated example of FIGS. 16-18, a top and bottom cable guide 1610,1612 are provided and secured at top and bottom ends of the frame member 1420, respectively. The top and bottom cable guides 1610,1612 may be configured as double pulleys such that they each may receive a pair of the drive cables 1402 without interfering with each other or causing rubbing or friction between the drive cables 1402. This means, for example, that the top cable guide 1610 includes a pair of independent pulleys that may rotate relative to each other, or include independent cable tracks, so as to permit a pair of the drive cables 1402 to travel therein in opposing direction without interference; and the bottom cable guide 1612 may be similarly configured. Here, the top and bottom cable guides 1610,1612 are configured as double pulleys; however, in other examples, a pair of top cable guides and a pair of bottom cable guides may be utilized instead, as described below. Also in the illustrated example, an upper cable idler 1614 is arranged proximate to the top cable guide 1610 and a lower cable idler 1616 is arranged proximate to the bottom cable guide 1612. As hereinafter described, the upper and lower cable idlers 1614,1616 are configured to redirect the path of any of the drive cables 1402; and, where utilized, the cable idler may also be configured as a double pulley, such that it may redirect and guide a pair of the drive cables 1402, without interference, rubbing, or friction between the drive cables 1402. In the illustrated example, the upper and lower cable idlers 1614,1616 are attached to the web portion of the frame member 1420; however, they may be differently arranged within the frame member 1420, for example, on the same sidewall thereof, on opposing sidewalls, on the web portion and a sidewall, etc.

The internal components of the jamb assembly 1410 configured with the screw drive 1602 may be coupled or fastened within the frame member 1420 via a variety of manners. In some examples, the motor 1608 is mounted within the frame member 1420 via a collar 1620, and, in some of these examples, the collar 1620 may include one or more dampeners and/or be otherwise configured to inhibit or counteract vibrations from the motor 1608. The motor 1608 may be differently arranged within the frame member 1420. Also, a far end of the shaft 1606 (i.e., the end of the shaft 1606 that is opposite from an opposing end of the shaft 1606 at which the motor 1608 is mounted) may mounted to the frame member 1420 via a variety of manners. In the illustrated example, the far end of the shaft 1606 is coupled within the frame member 1420 via a bracket 1622. Here, a bearing or bearing assembly 1624 is arranged within the bracket 1622 such that the shaft 1606 may rotate when secured within the bracket 1622.

Figure 18B:
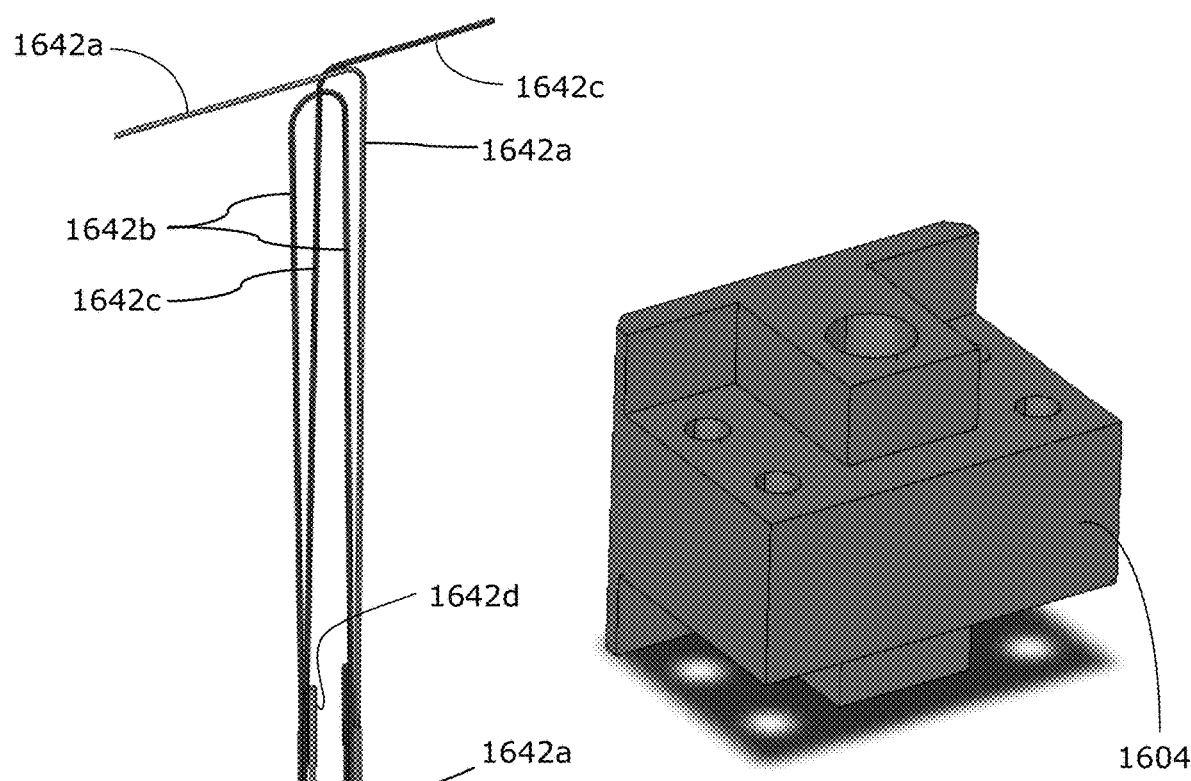
FIG. 18B illustrates an exemplary drive nut that may be utilized to organize the routing of drive cables illustrated in FIG. 18A.
Figure 18A:
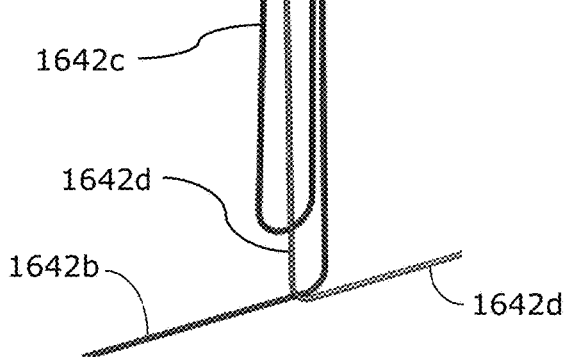
FIG. 18A illustrates an exemplary routing of drive cables that may be utilized with the jamb assembly of FIG. 16.

FIG. 18A illustrates the path of the drive cables 1402 utilized in the example of FIGS. 16-17, and FIG. 18B illustrates an example of the drive nut 1604 configured to actuate the drive cables along the path of FIG. 18A. The drive cables 1402 include a front upper drive cable 1642a (which is secured to a front upper side of the slide-out room 22), a front lower drive cable 1642b (which is secured to a front upper side of the slide-out room 22), a rear upper drive cable 1642c (which is secured to a rear upper side of the slide-out room 22), and a rear lower drive cable 1642d (which is secured to a rear lower side of the slide-out room 22). In the illustrated example, the front upper drive cable 1642a and the front lower drive cable 1642b extend from an upper side of the drive nut 1604, and the rear upper drive cable 1642c and the rear lower drive cable 1642d extend from a lower side of the drive nut 1604. In this manner, the front upper drive cable 1642a and the front lower drive cable 1642b are actuated together and the rear upper drive cable 1642c and the rear lower drive cable 1642d are actuated together opposite from the front upper drive cable 1642a and the front lower drive cable 1642b. More particularly, movement of the drive nut 1602 in the first axial direction Y1 pushes the front upper drive cable 1642a and the front lower drive cable 1642b out of the frame member 1420 (i.e., provides slack), while pulling the rear upper drive cable 1642c and the rear lower drive cable 1642d into the frame member 1420; whereas movement of the drive nut 1602 in the second axial direction Y2 pulls the front upper drive cable 1642a and the front lower drive cable 1642b into the frame member 1420, while pushing (i.e., slackening) the rear upper drive cable 1642c and the rear lower drive cable 1642d out from the frame member 1420.

Also in the illustrated example, the front upper drive cable 1642a, the front lower drive cable 1642b, the rear upper drive cable 1642c, and the rear lower drive cable 1642d are each an adjustably secured drive nut 1604. Thus, they may be unattached from the drive nut 1604, pulled tight, and reattached to the drive nut 1604 as needed to adjust their lengths. Also, the drive nut 1604 may be configured to guide any of the drive cables 1402 such that the cables 1402 are organized within the frame member 1410and do not become tangled. Here, for example, the drive nut 1604 includes a pair of guide slots formed therein. In particular, the first such guide slot is formed within the drive not 1604 for receiving the front lower drive cable 1642b (after being re-routed over the upper idler 1614) and organizes the front lower drive cable 1642b between the front upper drive cable 1642a and the rear upper drive cable 1642c; and, the second such guide slot is formed within the drive not 1604 for receiving the rear upper drive cable 1642c (after being re-routed over the lower idler 1616) and organizes the rear upper drive cable 1642c between the front lower drive cable 1642b and the rear lower drive cable 1642d. However, the drive nut 1604 may be differently configured to organize any or all of the drive cables 1402.

As illustrated, the front upper drive cable 1642a extends upward from the upper side of the drive nut 1604, towards the upper end of the frame member 1420, up and around a first cable track of the top cable guide 1610, and out a front upper opening in the frame member 1420 towards the front upper corner of the slide-out room 22. The front lower drive cable 1642b extends upward from the upper side of the drive nut 1604, around and along a cable track of the upper cable idler 1614 (thereby redirecting the front lower drive cable 1642b downward within the frame member 1420 and through the guide slot formed in the drive nut 1604), down and around a first cable track of the bottom cable guide 1612, and out a front lower opening in the frame member 1420 towards the front lower corner of the slide-out room 22. The rear upper drive cable 1642c extends downward from the bottom side of the drive nut 1604, around and along a cable track of the lower cable idler 1616 (thereby redirecting the rear upper drive cable 1642c upward within the frame member 1420 and through the guide slot formed in the drive nut 1604), up and around a second cable track of the top cable guide 1610, and out a rear upper opening in the frame member 1420 towards the rear upper corner of the slide-out room 22. Finally, the rear lower drive cable 1642d extends downward from the bottom side of the drive nut 1604, toward the lower end of the frame member 1420, down and around a second cable track of the bottom cable guide 1612, and out a rear lower opening in the frame member 1420 towards the lower rear corner of the slide-out room 22.

Accordingly, upon rotation of the drive shaft 1606 in the first rotational direction R1, thereby translating the drive nut 1604 linearly along the axis A in the first axial direction Y1, the drive nut 1604 pulls the rear upper drive cable 1642c and the rear lower drive cable 1642d and pushes or slackens the front upper drive cable 1542a and the front lower drive cable 1542c. In this manner, the rear side of the slide-out room 22 may be pulled towards the opening 18 in the vehicle 10 via the rear upper and lower drive cables 1642c,1642d such that the slide-out room 22 is extended from the vehicle 10. When the drive shaft 1606 rotates in the second rotational direction R2, the drive nut 1604 pulls the front upper drive cable 1542a and the front lower drive cable 1542b, while pushing or slackening (i.e., providing slack in) the rear upper and lower drive cables 1542c,1542d. In this manner, the front side of the slide-out room 22 may be pulled towards the opening 18 in the vehicle 10 via the front upper drive cable 1542a and the front lower drive cable 1542b, such that the slide-out room 22 is retracted within the vehicle 10.

FIGS. 19-21 illustrate example of the jamb assembly 1410 configured with the screw drive 1602 having a different configuration of guide members and pulleys such that the drive cables 1402 are differently routed. Here, the jamb assembly 1410 includes a pair of top cable guides 1910a, 1910b and a pair of bottom cable guides 1912a,1912b. In the illustrated example, the top and bottom cable guides 1910a, 1910b,1912a,1912b are each configured as single pulleys, and each include a single cable track for accommodating one of the drive cables 1402; however, in other examples, any or all of the top and bottom cable guides 1910a,1910b,1912a, 1912b may be configured with more than one cable track for accommodating more than one of the drive cables 1402 and, in such examples, may further be configured as a double pulley that permits independent actuation of the drive cables 1402. Also in the illustrated example, an upper cable idler 1914 is arranged proximate to the top cable guides 1910a, 1910b and a lower cable idler 1916 is arranged proximate to the bottom cable guides 1912a,1912b. As hereinafter described, the upper and lower cable idlers 1914,1916 are configured to redirect the path of any of the drive cables 1402; and, where utilized, the cable idlers 1914,1916 may also be configured as a double pulley, such that it may redirect and guide a pair of the drive cables 1402, without interference, rubbing, or friction between the drive cables 1402. In the illustrated example, the upper and lower cable idlers 1914,1916 are attached to opposing sidewalls of the frame member 1420 (i.e., the upper cable idler 1914 is attached to a first sidewall and the lower cable idler 1916 is attached to a second sidewall opposite to the first sidewall); however, they may be differently arranged within the frame member 1420, for example, on the same sidewall thereof, on the web portion thereof, on the web portion and a sidewall, etc.

FIG. 21A illustrates the path of the drive cables 1402 utilized in the example of FIGS. 19-20, and FIG. 21B illustrates an example of the drive nut 1604 configured to actuate the drive cables along the path of FIG. 21A. The drive cables 1402 include a front upper drive cable 1942a (which is secured to a front upper side of the slide-out room 22), a front lower drive cable 1942b (which is secured to a front upper side of the slide-out room 22), a rear upper drive cable 1942c (which is secured to a rear upper side of the slide-out room 22), and a rear lower drive cable 1942d (which is secured to a rear lower side of the slide-out room 22). In the illustrated example, the front upper drive cable 1942a and the front lower drive cable 1942b extend from the lower side of the drive nut 1604, and the rear upper drive cable 1942c and the rear lower drive cable 1942d extend from the upper side of the drive nut 1604. In this manner, the front upper drive cable 1942a and the front lower drive cable 1942b are actuated together and the rear upper drive cable 1942c and the rear lower drive cable 1942d are actuated together. More particularly, movement of the drive nut 1602 in the second axial direction Y2 pushes the front upper drive cable 1942a and the front lower drive cable 1942b out of the frame member 1420 (i.e., provides slack), while pulling the rear upper drive cable 1942c and the rear lower drive cable 1942d into the frame member 1420; whereas movement of the drive nut 1602 in the first axial direction Y1 pulls the front upper drive cable 1942a and the front lower drive cable 1942b into the frame member 1420, while pushing (i.e., slackening) the rear upper drive cable 1942c and the rear lower drive cable 1942d out from the frame member 1420.

As with the drive nut 1604 in the examples illustrated with respect to FIGS. 16-18, the front upper drive cable 1942a, the front lower drive cable 1942b, the rear upper drive cable 1942c, and the rear lower drive cable 1942d may each be an adjustably secured drive nut 1604. Thus, they may be unattached from the drive nut 1604, pulled tight, and reattached to the drive nut 1604 as needed to adjust their lengths. Also, the drive nut 1604 may be configured organize any or all of the drive cables 1942a,1942b,1942c,1942d within the frame member 1410 so that they do not become tangled. Here, for example, the drive nut 1604 includes a pair of guide slots formed therein, where a first such guide slot receives the front upper drive cable 1942a (after being re-routed over the lower idler 1916) and organizes it at a first corner of the drive nut 1604, and a second such guide slot receives the rear lower drive cable 1942d (after being re-routed over the upper idler 1914) and organizes it at a second corner of the drive nut 1604. However, the drive nut 1604 may be differently configured to organize any or all of the drive cables 1402.

As illustrated, the front upper drive cable 1942a extends downward from the lower side of the drive nut 1604, towards the lower end of the frame member 1420, around and along a cable track of the lower cable idler 1916 (thereby redirecting the front upper drive cable 1942a upward within the frame member 1420 and through the guide slot formed in the drive nut 1604), up and around the (first) top cable guide 1910a, and out a front upper opening in the frame member 1420 towards the front upper corner of the slide-out room 22. The front lower drive cable 1942b extends downward from the lower side of the drive nut 1604, down and around the (first) bottom cable guide 1912a, and out a front lower opening in the frame member 1420 towards the front lower corner of the slide-out room 22. The rear upper drive cable 1942c extends upward from the upper side of the drive nut 1604, up and around the (second) top cable guide 1910b, and out a rear upper opening in the frame member 1420 towards the rear upper corner of the slide-out room 22. Finally, the rear lower drive cable 1942d extends upward from the upper side of the drive nut 1604, around the upper cable idler 1914 (thereby redirecting the rear lower drive cable 1942d downward within the frame member 1420 and through the guide slot formed in the drive nut 1604), toward the lower end of the frame member 1420, down and around a track of the (second) bottom cable guide 1912b, and out a rear lower opening in the frame member 1420 towards the lower rear corner of the slide-out room 22.

Accordingly, upon rotation of the drive shaft 1606 in the second rotational direction R2, thereby translating the drive nut 1604 linearly along the axis A in the second axial direction Y2, the drive nut 1604 pulls the rear upper drive cable 1942c and the rear lower drive cable 1942d and pushes or slackens the front upper drive cable 1942a and the front lower drive cable 1942b. In this manner, the rear side of the slide-out room 22 may be pulled towards the opening 18 in the vehicle 10 via the rear upper and lower drive cables 1942c,1942d such that the slide-out room 22 is extended from the vehicle 10. When the drive shaft 1606 rotates in the first rotational direction R1, thereby translating the drive nut 1604 in the first axial direction Y1, the drive nut 1604 pulls the front upper drive cable 1942a and the front lower drive cable 1942b, while pushing or slackening (i.e., providing slack in) the rear upper and lower drive cables 1942c,1942d. In this manner, the front side of the slide-out room 22 may be pulled towards the opening 18 in the vehicle 10 via the front upper drive cable 1942a and the front lower drive cable 1942b, such that the slide-out room 22 is retracted within the vehicle 10.

Figure 22:
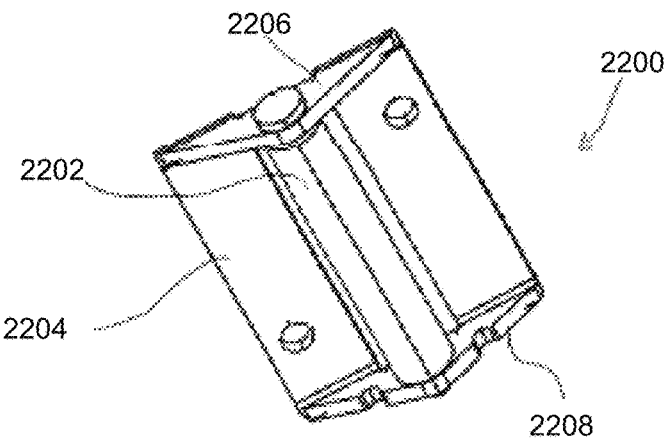
FIG. 22 illustrates an exemplary tracking roller assembly that may be utilized with any of the foregoing jamb assemblies to evenly guide the slide-out room between the left and right jamb assemblies and maintain the slide-out room centered within the opening of the vehicle.

FIG. 22 illustrates an exemplary tracking roller assembly 2200, according to one or more examples. For example, the tracking roller assembly 2200 may be utilized with any of the cable driven slide-out assemblies described herein, including but not limited to those illustrated with respect to FIGS. 14-21 of FIGS. 23-29. The tracking roller assembly 2200 may be utilized to evenly guide the slide-out room 20 and maintain it in a centered position within the opening 18 of the vehicle 10. In the illustrated example, tracking roller assembly 2200 includes a roller 2202 and a mounting bracket 2204 having a pair of flanges 2206,2208 for holding the roller 2202. The roller 2202 is arranged between the flanges 2206,2208 such that the roller 2202 may rotate relative to the mounting bracket 2204. Thus, the roller 2202 is rotatably mounted to or rotatably arranged within the mounting bracket 2204. The tracking roller assembly 2200 may be attached to an outer surface of the frame member 1420 that is proximate to the slide-out unit 22. Here, for example, the mounting bracket 2204 is secured to an outer surface of the web of the frame member 1420. Also, the tracking roller assembly 2200 may be provided at an upper end of each jamb assembly 1410, a lower end of each jamb assembly 1410, a middle of each jamb assembly 1410, or any combination thereof. Here, for example, each of the left and right jamb assemblies 1410a,1410b includes a tracking roller assembly 2200 at the upper and lower ends of the frame member 1420. In some examples, bearings are provided within the roller 2202 to engage a shaft (not illustrated) connected between the flanges 2206,2208; whereas, in other examples, the roller 2202 includes an integral shaft that is rotatably attached within apertures in the flanges 2206,2208 and a bearing may be provided within the apertures of the flanges 2206,2208.

FIG. 23 illustrates an alternate screw drive assembly 2300 configured to actuate the drive cables to move the slide-out room 22 relative to the vehicle 10. The screw drive assembly 2300 may be provided in a jamb assembly and secured to the vehicle 10 as previously described. For example, the screw drive assembly 2300 may be provided in the left and right jamb assembly 1410a,1410b which are secured within the opening 18 in the vehicle 10.

In the illustrated example, the screw drive assembly 2300 includes a drive nut 2302 that translates axially along a drive rod 2304 upon rotation of the drive rod 2304. Here, a plurality of drive cables 2306 are connected to the drive nut 2302 such that they move with the drive nut 2302 as it translates along the drive rod 2304. The drive cables 2306 are routed, from the drive nut 2302, about one or more pulleys. In particular, the screw drive assembly 2300 includes a pair of double pulleys 2308, 2310 and a pair of guide members 2312,2314. The double pulleys 2308,2310 are configured to allow movement of a pair of the drive cables 2306, independently from each other, whereas the guide members 2312,2314 are configured as single pulleys for re-routing the drive cables 2306 as described above. Here, a first of the drive cables 2306a extends downward from the drive nut 2302, around the guide member 2314 where it is re-routed upward, and around a first track of the double pulley 2308; a second of the drive cables 2306b extends downward from the drive nut 2302 and around a first track of the double pulley 2310, such that it moves in the same direction as the first drive cable 2306a; a third of the drive cables 2306c extends upward from the drive nut 2302 and around a second track of the double pulley 2308; and a fourth of the drive cables 2306d extends upward from the drive nut 2302, around the guide member 2312 where it is re-routed downward, and around a second track of the double pulley 2310, such that it moves in the same direction as the third drive cable 2306c.

The drive cables 2306 are adjustably connected to one or more aspects of the screw drive assembly 2300. In some examples, the drive cables 2306 are adjustably connected to the drive nut 2302, such that the tension of the drive cables 2306 may be adjusted at the drive nut 2302. FIG. 24 illustrates an example of the drive nut 2302 configured to permit adjustment of the drive cables 2306, according to one or more embodiments. In the illustrated examples, each of the drive cables 2306 (i.e., the first, second, third, and fourth drive cables 2306a-d) include a threaded rod 2402 at their ends proximate to the drive nut 2302. The drive cables 2306 may also include threaded rod (not illustrated) at their other terminal end proximate to the slide-out room 22. The threaded rod 2402 of the drive cables 2306 may be secured to the drive nut 2302 via a nut 2404, whereby rotation of the nut 2404 causes the threaded rod 2402 to translate linearly through the drive nut 2302. Thus, the nut 2404 may be rotated in a first direction to move the threaded rod 2402 in a first direction that tensions the corresponding drive cable 2306, or rotated in a second direction to move the threaded rod 2402 in a second opposite direction that un-tensions the corresponding drive cable 2306. Lock washers may be utilized to maintain tension in the drive cables 2306. For example, lock washers may be provided on a side of the drive nut 2302 opposite of the nut 2304. Alternatively, lock washers may be provided within the drive nut 2302.

FIGS. 25-27 illustrate an exemplary drive assembly 2500 that articulates the slide-out room 22 via a block and tackle configuration, according to one or more embodiments. FIG. 25 illustrates the drive assembly 2500 from an interior of the vehicle 10. The drive assembly 2500 includes at least one block and tackle assembly 2502. In the illustrated example, the drive assembly 2500 is secured to the vehicle 10 at a location beneath the slide-out room 22 and includes a pair of block and tackle assemblies 2502a,2502b corresponding with the left and right side of the slide-out unit 22. In other examples, however, the drive assembly 2500 may be secured to the vehicle 10 at a location above the slide-out room 22. In even other examples, the drive assembly 2500 may be differently arranged about the slide-out room 22, for example proximate to the left or right side of the opening 18 in the vehicle 10, and the block and tackle assemblies 2502a,2502b may correspond with a top and bottom of the slide-out room 22.

Here, the drive assembly 2500 includes a drive sprocket 2504 that articulates the block and tackle assemblies 2502a, 2502b. The drive sprocket 2504 may be driven by a variety of means. For example, the drive sprocket 2504 may be connected to a motor or other actuator or may be manually driven via a crank shaft. In the illustrated example, the drive sprocket 2504 is configured as a double sprocket that drives a pair of drive chains 2506a,2506b, with the block and tackle assembly 2502a connected to the ends of the drive chain 2506a and the block and tackle assembly 2502b connected to the ends of the drive chain 2506b.

FIG. 26 illustrates the block and tackle assembly 2502 of FIG. 25, according to one or more embodiments. While FIG. 26 illustrates only one block and tackle assembly 2502 (e.g., the block and tackle assembly 2502a), it will be appreciated that both of the block and tackle assemblies 2502a,2502b may be similarly configured.

The block and tackle assembly 2502 includes a pair of moving blocks 2602a,2602b that are each connected to the drive chain 2506. The block and tackle assembly 2502 further includes a pair of fixed blocks 2604a,2604b that are connected to the vehicle 10. As illustrated, the moving blocks 2602a,2602b and the fixed blocks 2604a,2604b are each configured as double pulleys (or double blocks), and thus each include a pair of pulleys that may rotate independent from each other.

The block and tackle assembly 2502 includes four (4) drive cables 2608. Each of the drive cables 2608 is provided as a cable length having a pair of cable ends 2610, with a first cable end (obscured from view) being affixed to the slide-out unit 22 and the second cable end 2610 being attached to the vehicle 10. Here, the four (4) drive cables 2608 are routed, from their cable ends 2610, around the moving blocks 2602a,2602b and around the fixed blocks 2604a,2604b, to the opposing cable ends secured to the slide-out room 22. Thus, the drive cables 2608 are each arranged about the moving blocks 2602a,2602b and the fixed blocks 2604a, 2604b in a double tackle configuration, such that rotation of the moving blocks 2602a,b via the drive chain 2506 in a first rotational direction causes two (2) of the drive cables 2608 to be pulled towards the opening 18 in the vehicle and causes the other two (2) of the drive cables 2608 to be pushed away (i.e., slackens) from the opening 18 in the vehicle 10.

The drive cables 2608 may be adjustably attached to the vehicle 10. Here, for example, each of the drive cables 2608 is adjustably attached to a frame member 2612 that is secured to the vehicle 10. In the illustrated example, each cable end 2610 of the drive cables 2608 includes a stud 2614 extending therefrom and a threaded rod 2616 extending from the stud 2614. The threaded rod 2616 may be rotatably attached to the stud 2614 such that the stud 2614 and the threaded rod 2616 may rotate relative to each other, and thereby inhibit twisting of the drive cables 2606 when tensioning the same as hereinafter described. The threaded rod 2616 extends through an aperture 2618 in the frame member 2612 and is received by a nut 2620, whereby rotation of the nut 2620 causes axial translation of the threaded rod 2616 through the aperture 2618, thereby adding tension or removing tension from the drive cable 2608 corresponding therewith. In this example, rotation of the drive cable 2608 may be inhibited via the joint coupling stud 2614 and the threaded rod 2616 and permits relative rotation there between.

Different means may be utilized to adjustably connect the drive cables 2608 to the frame member 2612, however. For example, the frame member 2612 may include four (4) cable adjustment mechanisms (not illustrated) that are rotatably attached within apertures 2618 in the frame member 2612, such that each of the cable adjustment mechanisms may rotate within the apertures 2618 of the frame member 2612. Also in this example, each of the cable adjustment mechanisms is configured as an elongated nut having a threaded bore for receiving a threaded rod or stud that is connected to the cable ends 2610 of the drive cable 2608. The threaded rod includes a thread that corresponds with the thread of the cable adjustment mechanism. Thus, rotation of the cable adjustment mechanism will cause the threaded rod arranged therein to translate axially within the threaded bore of the cable adjustment mechanism, thereby adding tension or removing tension from the drive cable 2608 associated therewith. In some examples, the cable ends 2610 of the drive cable 2608 include a joint configured to permit relative rotation between the threaded rod and the drive cables 2608, to thereby inhibit the drive cables 2608 from being twisted when tensioning them.

Other means may be utilized to adjust the drive assembly 2500. FIG. 27 illustrates a close up of the moving blocks 2602a,2602b configured to be adjusted relative to the drive chain 2506. The drive chains 2506 may each be provided as a segment or strand of chain having two opposing ends 2700a,2700b that are unconnected to each other (i.e., an open chain configuration). In such embodiments, the moving blocks 2602a,2602b are connected to the opposing ends 2700a,2700b, respectively, of the drive chain 2506. The moving blocks 2602a,2602b may be adjustably connected to the drive chain 2506, which may facilitate adjusting the tension in drive assembly 2500 to ensure smooth and even movement of the slide-out room 22 driven thereby. Here, a stud 2702 is coupled to each of the opposing ends 2700a, 2700b via a link bracket 2704 that is pinned to one or more links of the drive chain 2506. The studs 2702 are attached to the link brackets 2704 and, in some examples, are permitted to rotate relative to the link brackets 2704. The studs 2702 include a threaded portion and extend through a corresponding aperture (obscured from view) in the frames of the moving blocks 2602a,2602b. An adjustment nut 2706 is provided within the moving blocks 2602a,2602b, and a second nut 2708 may be provided exterior of the moving blocks 2602a,2602b on the opposite side of the aperture from the adjustment nut 2706. The adjustment nut 2706 may be rotated to linearly translate the threaded portions of the studs 2702 within the aperture of the moving blocks 2602a, 2602b, and thereby adjust the tension of the moving blocks 2602a,2602b and the drive cables 2608 arranged therein relative to the drive chain 2506. In addition, one or more lock washers may be utilized to help lock the location of the stud 2702 relative to the moving blocks 2602a,2602b.

Other means of adjusting the drive cables 2608 may be provided in addition to or in lieu of the foregoing. For example, the fixed blocks 2604a,2604b may be adjustably secured to the vehicle 10 such that they may move to adjust the tension of the drive cables 2608 arranged therein. In one non-illustrated example, the fixed blocks 2604a,2604b are secured on tracks within the vehicle 10 and may slide along the tracks as needed to adjust the tension in the drive cables 2608. For example, tracks may be provided on an interior wall or frame of the vehicle 10 proximate to the opening 18, and the fixed blocks 2604a,2604b may be configured to translate along those tracks in a direction approximately perpendicular to the direction in which the drive chain 2506 rotates. Here, a ratchet mechanism may be utilized to translate either or both of the fixed blocks 2604a,2604b along the tracks. The fixed blocks 2604a,2604b may be adjusted together via a single ratchet mechanism, or they may be adjusted individually via separate ratchet mechanisms. Thus, the ratchet mechanism or other means may be utilized to move either or both of the fixed blocks 2604a, 2604b downward (away from the slide-out room 22) to thereby add tension to the drive cables 2608 associated with the fixed blocks 2604a,2604b that have been ratcheted to a new location.

The drive chain and/or the drive cables may be differently configured to articulate the slide-out room 22. FIGS. 28-29 illustrate exemplary slide-out drive assemblies 2800,2900, wherein movement of the slide-out room 22, via a first of a plurality of drive cable (or a first cable end of a first of a pair of drive cables), engages one or more of the remaining drive cables (or one or more of the remaining cable ends of the pair of drive cables) to simultaneously pull the slide-out room 22 in the same direction, according to one or more alternate embodiments. In this manner, the slide-out drive assemblies 2800,2900 (hereinafter, the drive assemblies 2800,2900) tension a single drive cable (or a single cable end of a first drive cable) to move the slide-out room 22 in a first direction, which in turn synchronizes activation or tensioning of one or more remaining drive cables (or cable ends of a second drive cable). As more fully described below, the drive assembly 2800 of FIG. 28 includes a discontinuous segment or strand of drive chain; whereas, the drive assembly 2900 of FIG. 29 utilizes a continuous loop of drive chain, which may permit utilization of a timing shaft. Regardless of the configuration of the drive chain, however, the drive chain of both drive assemblies 2800,2900 tensions a single cable (or single cable end) to move the slide-out room 22, and at least one of the remaining cables (or cable ends) are tensioned via such movement of the slide-out room 22 such that the slide-out drive assemblies 2800,2900 synchronize movement of the remaining cables or cable ends through the slide-out room 22.

The slide-out drive assemblies 2800,2900 may be jamb mounted and, therefore, are shown incorporated into the left and right jamb assemblies 1410a,b of FIG. 14. However, the drive assemblies 2800,2900 may instead be incorporated into either the left jamb assembly 1410a or the right jamb assembly 1410b, or the drive assemblies 2800,2900 may be incorporated into a top and/or bottom jamb assembly in addition to or in lieu of either or both of the left and right jamb assemblies 1410a,1410b.

As more fully described below, the drive assemblies 2800,2900 may actuate a plurality of drive cables, which are routed through either or both of the left and right jamb assemblies 1410a,1410b. In the illustrated example, each of the left and right jamb assemblies 1410a,1410b includes four drive cables routed there-through, from the drive chain, to opposing sides of the slide-out room 22; however, as previously mentioned, the four drive cables may be provided in just one of the left or right jamb assemblies 1410a,1410b. Thus, in these examples, the drive chain tensions a first of four drive cables to pull the slide-out room 22 in a first direction, which causes the slide-out room 22 to activate or tension two of the remaining three drive cables to pull the slide-out room 22 in the first direction, simultaneously with the first drive cable. In other examples, the left and right jamb assemblies 1410a,1410b each includes a pair (i.e., two) of drive cables routed there-through and interconnecting opposing sides of the slide-out room 22, where at least one of the two drive cables is secured relative to the drive chain; however, as previously mentioned, the two drive cables may be provided in just one of the left or right jamb assemblies 1410a,1410b. In this latter example, each of the pair of drive cables is connected to the drive chain at a connector, and the opposing ends or portions of each drive cable extending from the connector may each be conceptualized as an individual drive cable, such that the pair of drive cables effectively functions as if it had four drive cables. Thus, in these examples, the drive chain tensions a first cable end of the first drive cable to pull the slide-out room 22 in a first direction, which causes the slide-out room 22 to activate or tension the second drive cable's opposing cable ends to pull the slide-out room 22 in the first direction simultaneously with the first drive cable's first cable end.

Figure 28A:
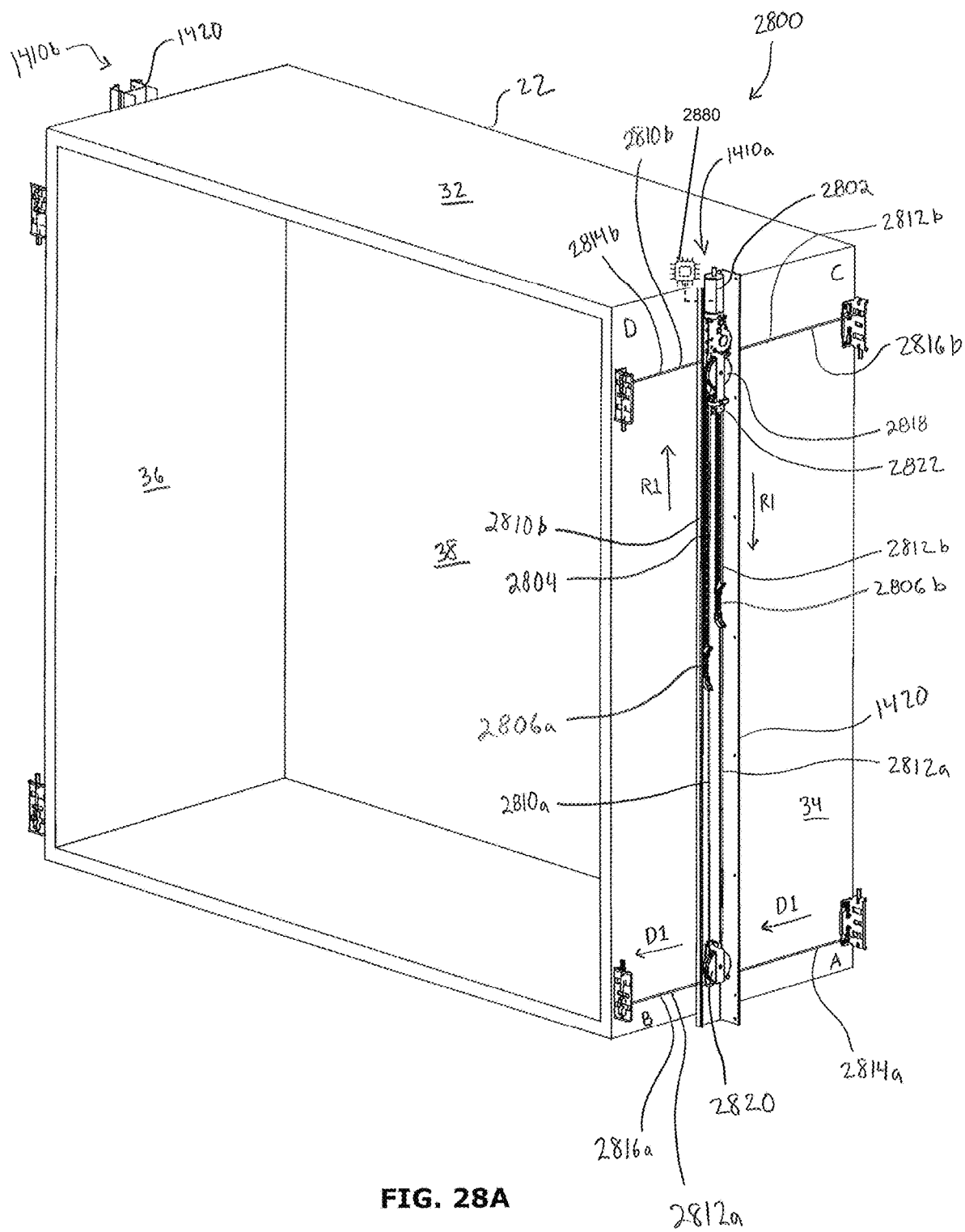
FIGS. 28A-28C illustrate a cable drive assembly that may be incorporated with the jamb assemblies to move the slide-out room between an extended and retracted position.
Figure 28B:
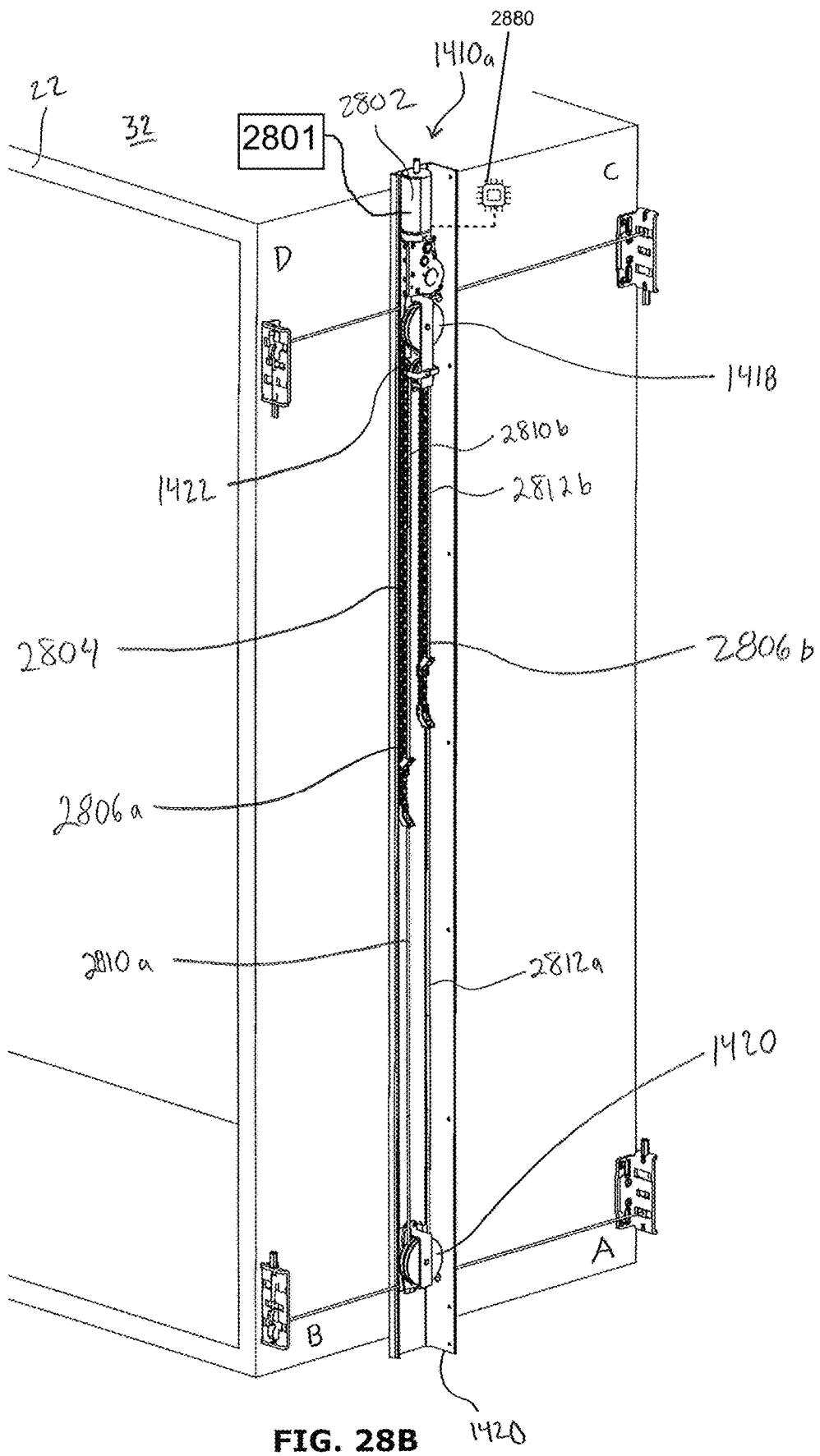

With reference to FIG. 28A, the drive assembly 2800 is incorporated into the left and right jamb assemblies 1410a, 1410b. However, the drive assembly 2800 may be incorporated into other jamb assemblies or combination of jamb assemblies provided about the opening 18 of the vehicle 10. FIG. 28B illustrates an individual jamb assembly (e.g., the left or right jamb assembly 1410a,1410b) incorporating the drive assembly 2800; however, it will be appreciated that one or more other jamb assemblies arranged around the slide-out room 22 may be similarly configured. As illustrated, the drive assembly 2800 includes a motor 2802 and a drive chain 2804. A drive sprocket (obscured from view) is operatively coupled to the motor 2802, and the drive chain 2804 extends around and engages the teeth of the drive sprocket, such that the motor 2802 may impart rotation on the drive sprocket (e.g., clockwise or counter-clockwise) to correspondingly drive or rotate the drive chain 2804. For example, clockwise rotation of the drive sprocket rotates the drive chain 2804 as indicated by directional arrows R1, whereas counter-clockwise rotation of the drive sprocket would reverse movement of the drive chain 2804 in an opposite direction.

The motor 2802 may be positioned at various locations relative to the slide-out room 22. In the illustrated example, the motor 2802 is mounted within an upper end of the frame members 1420 of the jamb assemblies 1410a,1410b and thus oriented proximate to the ceiling 32 of the slide-out room 22. However, the motor 2802 may be located elsewhere relative to the slide-out room 22, for example, located about the floor of the slide-out room 22 (see, for example, FIG. 29A) or located at various locations there-between.

As with other embodiments described herein, the drive assembly 2800 may be configured to synchronize or time the operation of the jamb assemblies 1410a,1410b. For example, the drive assembly 2800 may be configured to electronically time or synchronize operation of the motors 2802 mounted in the frame members 1420 of the opposing jamb assemblies 1410a,1410b and drive chains 2804 drive thereby. In the illustrated example, the drive assembly 2800 utilizes sensors and/or feedback to electronically time or synchronize operation of the motor 2802 incorporated in the left jamb assembly 1410a with the motor 2802 incorporated in the right jamb assembly 1410b. However, other means (electronic or mechanical) may be utilized to time or synchronize operation of the jamb assemblies 1410a,1410b, in addition to or in lieu of the foregoing. For example, timing or synchronization may be achieved via a timing shaft (or belt) arranged under the floor of the slide-out room 22 and/or connecting or linking (i.e., hard-wiring or wireless) the motors 2802 of the jamb assemblies 1410a,1410b to allow communication there-between.

In some embodiments, electronic timing of the motors 2802 is accomplished via Back Electromotive Force voltage ("BEMF" or "back EMF"). During operation, each of the motors 2802 may generate a back EMF, which is an electromotive force or voltage that opposes the change in current which induced it. Back EMF may be monitored and utilized to adjust voltage input to control the speed of either or both of the motors 2802. For example, a supply voltage is applied to a first motor 2802 and a second motor 2802, and this supply voltage causes the first and second motors 2802 to operate at respective output speeds. Operation of the first motor 2802 at its output speed generates a back EMF in the first motor 2802 that is proportional to its output speed and, similarly, operation of the second motor 2802 at its output speed generates a proportional back EMF in the second motor 2802. However, variations in one or both of the motors 2802 (e.g., differences in supplied voltages, differences in efficiencies, etc.) may result in unsynchronized operation of the motors 2802, which may in turn result in uneven extension or retraction of the slide-out room 22 (i.e., the drive assembly 2800 incorporated into the left jamb assembly 1410a may operate faster or slower than the drive assembly 2800 incorporated into the right jamb assembly 1410b). Accordingly, the drive assembly 2800 in opposing jamb members 1410a,1410b may be electronically synchronized or timed using back EMF.

The drive assembly 2800 in opposing jamb members 1410a, 1410b may be electronically timed by reading back EMF in the first and second motors 2802 and controlling their operation based on the measured or sensed back EMF. For example, a system 2801 may measure or read the back EMF in both the first motor 2802 and/or the second motor 2802, and compare these back EMF readings to identify a discrepancy between the back EMF in the first motor 2802 and the back EMF in the second motor 2802. Upon sensing a difference in back EMF between the first and second motor 2802, voltage supplied to the first motor 2802 and/or the second motor 2802 may be controlled to adjust the output speed of the first and/or second motor 2802. Thus, the system may time or synchronize operation of the first and second motors 2802 by comparing their back EMFs and then adjusting the voltage supplied to the faster and/or slower motor 2802 to equalize their output speeds. Such systems may include various types of sensors configured to measure back EMF. However, the system may instead (or in addition to sensors) utilize sensorless techniques to detect back EMF in the motors 2802, and such sensorless techniques may include various types of comparator circuits, controllers, and/or microcontrollers. Accordingly, the system may incorporate various components, systems, and methods for controlling motor velocity utilizing feedback indicative of back EMF, including those disclosed in U.S. Pat. No. 5,811,946 which is incorporated by reference in its entirety.

In some examples, a controller 2880 may determine that the back EMF in the first motor 2802 is greater than the back EMF sensed in the second motor 2802 because the first motor 2802 is operating faster than the second motor 2802. Here, the electronics (e.g., a controller 2880) of the drive assembly 2800 may then limit or reduce the voltage supplied to the first motor 2802 a sufficient amount to thereby decrease the speed of the first motor 2802 such that the first motor 2802 operates at the same speed as the second motor 2802 (i.e., slowing down the first motor 2802 to match the speed of the second motor 2802). This results in the first and second motors 2802 rotating their drive sprockets and drive chains 2804 at equal rates or speeds such that the slide-out room 22 is evenly extended or retracted at its opposing sides. In other examples, upon sensing that the back EMF in the first motor 2802 is greater than the back EMF sensed in the second motor 2802 (i.e., the first motor 2802 is operating faster than the second motor 2802), the controller 2880 may increase the voltage supplied to the second motor 2802 to thereby increase the speed of the second motor 2802 (i.e., speeding up the second motor 2802) to match or equal the output speed of the first motor 2802. This will also result in the first and second motors 2802 rotating their drive sprockets and drive chains 2804 at equal rates that permit even extension or retraction of the slide-out room 22 at its opposing sides. In even other examples, the voltage in both the first motor 2802 and the second motor 2802 may be adjusted to equalize their output speeds upon detection of a difference between the back EMF in the first motor 2802 and the back EMF in the second motor 2802 (i.e., slowing down the first motor 2802 and speeding up the second motor 2802 to equalize output speeds of the first and second motors 2802).

The drive chain 2804 may be provided as a non-continuous (or open) segment or strand of chain, which maintains engagement with the drive sprocket as it rotates in either direction. Here, for example, the drive chain 2804 is a U-shaped strand having opposing free ends 2806a,2806b. However, the drive chain 2804 may have different non-continuous configurations or, as more fully described below, the drive chain 2804 may be provided as a continuous (or closed) segment or loop of chain.

Each of the opposing free ends 2806a,2806b of the drive chain 2804 may be connected, adjustably or otherwise, to one or more drive cables. In the illustrated example, each of the opposing free ends 2806a,2806b of the drive chain 2804 is coupled to a pair of drive cables, with the first opposing free end 2806a of the drive chain 2804 connected to a first drive cable 2810a and a second drive cable 2810b and the second opposing free end 2806b of the drive chain 2804 connected to a first drive cable 2812a and a second drive cable 2812b. Thus, in this example, there are four drive cables 2810a,2810b,2812a,2812b. As discussed below, each of the drive cables 2810a,2810b,2812a,2812b is routed through the jamb assembly 1410 towards opposite sides of the slide-out room 22, with a cable end 2814a of the first drive cable 2810a connected to an exterior (or outer) side of the slide-out room 22, a cable end 2814b of the second drive cable 2810b connected to an interior (or inner) side of the slide-out room 22 (opposite the exterior side thereof), a cable end 2816a of the second drive cable 2812a connected to the interior side of the slide-out room 22, and a cable end 2816b of the second drive cable 2812b connected to the exterior side of the slide-out room 22. The cable ends 2814a,2814b,2816a,2816b may be connected at various locations about the slide-out unit 22 and, in some examples, are secured at the corners of a sidewall 34 (and/or opposing sidewall 36) of the slide-out unit 22. Here, the cable end 2814a of the first drive cable 2810a is routed through the jamb assembly 1410 and connected to a bracket secured at an outer lower corner A of the slide-out room 22; the cable end 2814b of the second drive cable 2810b is routed through the jamb assembly 1410 and connected to a bracket secured at an inner upper corner D of the slide-out room 22; the cable end 2816a of the first drive cable 2812a is routed through the jamb assembly 1410 and connected to a bracket secured at an inner lower corner B of the slide-out room 22; and the cable end 2816b of the second drive cable 2812b is routed through the jamb assembly 1410 and connected to a bracket secured at an outer upper corner C of the slide-out room 22. As mentioned, in other examples, each of the opposing free ends 2806a,2806b of the drive chain 2804 is coupled to one drive cable, with the first opposing free end 2806a of the drive chain 2804 connected to a first drive cable and the second opposing free end 2806b of the drive chain 2804 connected to a second drive cable. Here, the first drive cable (connected to free end 2806a of the drive chain 2804) includes opposing first and second ends routed through the jamb assembly 1410 and connected to the slide-out room 22 at the outer lower corner A and the inner upper corner D, respectively, and the second drive cable (connected to the opposing free end 2806b) includes opposing first and second ends routed through the jamb assembly 1410 and connected to the slide-out room 22 at the inner lower corner B and the outer upper corner C. The drive assembly 2800, however, operates in a similar manner regardless of how many discrete drive cables are utilized.

Figure 28C:
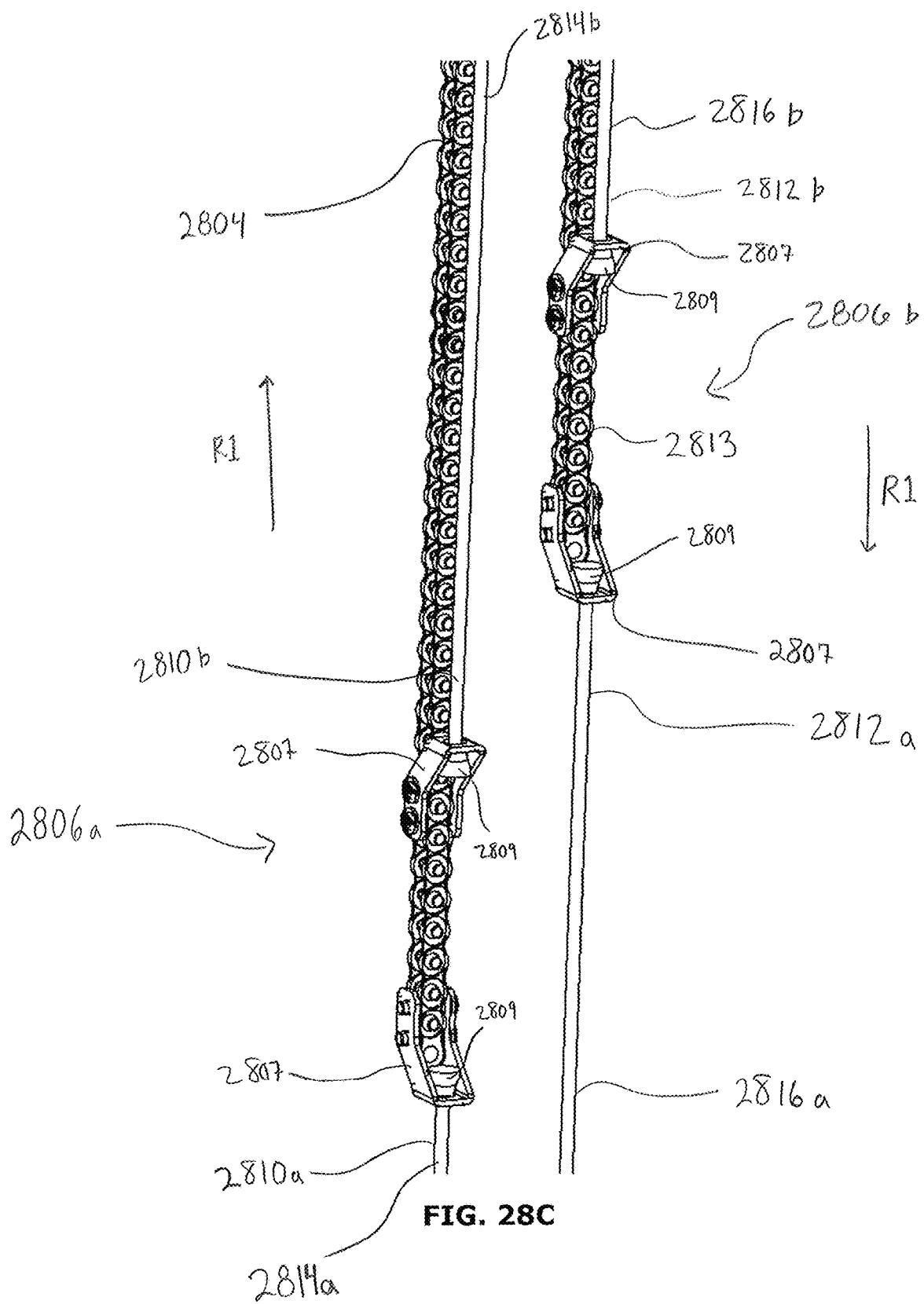

FIG. 28C illustrates the opposing free ends 2806a,2806b of the drive chain 2804, according to one or more embodiments of the present disclosure. The four drive cables 2810a,2810b,2812a,2812b each include a chain end at which they are coupled to the drive chain 2804. Here, a pair of cable connectors 2807 is attached at each opposing free end 2806a,2806b, such that each individual cable connector 2807 couples one of the four drive cables 2810a,2810b, 2812a,2812b to the drive chain 2804. Also, the chain end of each of the four drive cables 2810a,2810b,2812a,2812b includes a bead or retention member 2809 configured to engage the cable connector 2807 associated therewith. In some examples, the beads 2807 permit some movement of the drive cables 2810a,2810b,2812a,2812b while inhibiting other movements. For example, the beads 2809 may permit rotation of the drive cables 2810a,2810b,2812a,2812b relative to the cable connector 2807, and may permit axial movement of drive cables 2810a,2810b,2812a,2812b in one direction while inhibiting axial movement in the opposite direction. Here, the beads 2809 are sized larger than an aperture in the cable connector 2807 through which the chain end of the respective drive cable extends, such that the cable connector 2807 will engage the bead 2809 when the drive chain 2804 is rotated, thereby pulling the drive cable associated therewith. In this example, the bead 2807 is not rigidly secured to the cable connector 2807 such that, when the chain 2804 is rotated in a direction causing the free ends 2806a,2806b thereof to move towards the chain end of the drive cables, the cable connector 2807 may travel independent of its associated drive cable, with the aperture of the cable connector 2807 moving relative to the associated chain end. Thus, the beads 2809 may permit the cable connector 2807 to pull one of the drive cables 2810a,2810b,2812a, 2812b without the cable connector 2807 engaging or activating one or more of the remaining drive cables 2810a, 2810b,2812a,2812b. For example, movement of the drive chain in direction R1 may activate or tension the cable end 2814a of the first drive cable 2810a, and thereby pull the first drive cable 2810a, while the cable connector 2807 associated with the second drive cable 2810b travels over the chain end of the second drive cable 2810b such that the drive chain 2804 fails to engage or activate (i.e., fails to push) the cable end 2814b. In other examples, however, one or more of the beads 2809 may be fixed to its respective cable connector 2807 to inhibit relative axial movement in both axial directions, such that the cable connector 2807 would impart compression (or push) on the associated drive cable.

Referring again to FIGS. 28A and 28B, the drive cables 2810a,2810b,2812a,2812b are each routed, from the drive chain 2804, about one or more pulleys to the slide-out room 22. In the illustrated example, each of the jamb assemblies 1410a,1410b of the drive assembly 2800 includes a pair of cable guides 2818,2820. Here, the first cable guide 2818 is mounted within an upper portion of the frame member 1420 proximate to the ceiling 32 of the slide-out unit 22 and the second cable guide 2820 is mounted within a lower portion of the frame member 1420 proximate to the floor of the slide-out unit 22. Thus, the pair of cable guides 2818,2820 may be individually referred to as the upper cable guide 2818 and the lower cable guide 2820. However, the pair of cable guides 2818,2820 may be differently arranged within the frame member 1420. The pair of cable guides 2818,2820 may each be configured as double pulleys that permit independent actuation of the drive cables 2810,2812, and may thus each include an individual or unique cable track for individually accommodating each of the drive cables 2810a, 2810b,2812a,2812b; however, either or both of the pair of cable guides 2818,2820 may be differently configured, for example, as a pair of individual pulleys (i.e., single pulleys). Also in the illustrated example, a cable idler 2822 is provided to redirect the path of the drive cables 2810b,2812b. Here, the cable idler 2822 is arranged within an upper portion of the frame member 1420, proximate to the upper cable guide 2818, but may be arranged elsewhere within the frame member 1420, for example, at a lower portion thereof proximate to the lower cable guide 2820 to redirect the drive cables 2810a,2812a, or at various other locations therebetween. The cable idler 2822 may also be configured as a double pulley, such that it may redirect and guide a pair of the drive cables 2810b,2812b, without interference, rubbing, or friction between the drive cables 2810b,2812b. In other examples, one or more additional cable idlers may be provided, whether as single and/or as double pulleys, to redirect or re-route one or more of drive cables 2810a, 2810b,2812a,2812b. In the illustrated example, the pair of cable guides 2818,2820 and the cable idler 2822 are all attached to the web portion of the frame member 1420; however, one or more of them may be mounted on a sidewall of the frame 1420.

As illustrated, the chain ends of the first and second drive cables 2810a,2812b are attached to the free end 2806a of the drive chain 2804, and the opposing cable ends 2814a,2814b associated therewith extend in opposite directions therefrom towards the opposing outer and inner sides, respectively, of the slide-out room 22. The cable end 2814a of the first drive cable 2810a extends downward from the free end 2806a of the drive chain 2804, towards a lower end of the frame member 1420, around a first cable track of the lower cable guide 2820, and outward from an outward facing opening in the frame member 1420, towards the outer side of the slide-out room 22. The cable end 2814b of the second drive cable 2810b extends upward from the free end 2806a of the drive chain 2804, towards the upper end of the frame member 1420, along a first cable track of the cable idler 2822, over and around a first cable track of the upper cable guide 2818, and outward from an inward facing opening in the frame member 1420, towards the inner side of the slide-out room 22.

Similarly, the chain ends of the first and second drive cables 2812a,2812b are attached to the free end 2806b of the drive chain 2804, and the opposing cable ends 2816a,2816b associated therewith extend in opposite directions therefrom towards the opposing inner and outer sides, respectively, of the slide-out room 22. The cable end 2816a of the first drive cable 2812a extends downward from the free end 2806b of the drive chain 2804, towards the lower end of the frame member 1420, around a second cable track of the lower cable guide 2820, and outward from an inward facing opening in the frame member 1420, towards the inner side of the slide-out room 22. The cable end 2816b of the second drive cable 2812b extends upward from the free end 2806b of the drive chain 2804, toward the upper end of the frame member 1420, along a second cable track of the cable idler 2822, over and around a second cable track of the upper cable guide 2818, and outward from an outward facing opening in the frame member 1420, towards the outer side of the slide-out room 22.

Thus, the first and second drive cables 2810a,2810b associated with the free end 2806a of the drive chain 2804 connect to opposite sides of the slide-out room 22, and the first and second drive cables 2812a,2812b associated with the opposing free end 2806b of the drive chain 2804 similarly connect to opposite sides of the slide-out room 22. Also, the drive cables 2810a,2810b,2812a,2812b may connect to the slide-out room 22 at various vertical dimensions along the slide-out room 22. For example, the first and second drive cables 2810a,2810b that connect to opposite sides of the slide-out room 22 are positioned at lower and upper ends, respectively, of the slide-out room 22; and the first and second drive cables 2812a,2812b that also connect to opposite sides of the slide-out room 22 are similarly attached at lower and upper ends of the slide-out room 22. In the illustrated example, the cable end 2814a of the first drive cable 2810a connects to the outer lower corner A of the slide-out room 22, the cable end 2816a of the (second) first drive cable 2812 connects to the inner lower corner B of the slide-out room 22, the cable end 2814*b* of the second drive cable 2810*b* connects to the inner upper corner D of the slide-out room 22, and the cable end 2816*b* of the (second) second drive cable 2812*b* connects to the outer upper corner C of the slide-out room 22; however, either or both of the cable ends 2814*a*,2816*a* may instead be routed towards an upper corner (or upward from the lower end) of the slide-out room 22 and/or either or both of the cable ends 2814*b*,2816*b* may instead be routed towards a lower corner (or downward from the upper end) of the slide-out room 22).

The drive assembly 2800 generally operates as follows. The motor 2802 actuates the drive chain 2804 in the clockwise direction, causing the opposing free ends 2806*a*,2806*b* to move in corresponding directions as indicated by arrow R1. This movement of the free end 2806*a* creates interference between the cable connector 2807 and the bead 2809 of the first drive cable 2810*a*, such that the free end 2806*a* tensions the first drive cable 2810*a* and pulls the slide-out room 22 in a first direction as indicated by arrow D1. The first drive cable 2810*a* is connected proximate to the outer lower corner A of the slide-out room 22, and thus pulls the slide-out room 22 in the first direction D1 from that outer lower corner A. The second first drive cable 2812*a* is connected to an opposite side of the slide-out room 22, at the inner lower corner B, and the slide-out room 22 carries or pulls the first drive cable 2812*a* with it as it moves in the first direction D1, thereby activating or tensioning the first drive cable 2812*a*. Also, the first drive cable 2812*a* is connected relative to the second drive cable 2812*b*, such that they are pulled together. Here, for example, they are interconnected via a segment 2813 of chain at the free end 2806*b* of the drive chain 2804. Thus, movement of the slide-out room 22 in this first direction D1 engages or tensions the first drive cable 2812*a* (associated with the free end 2806*b*) at the inner lower corner B, which in turn engages or tensions the segment 2813 of chain at the free end 2806*b*, which in turn engages or tensions the second drive cable 2814*b* attached to the outer upper corner C of the slide-out room 22. In this manner, the first cable 2812*a*, the segment 2813 of chain, and the second drive cable 2812*b* effectively operate as an individual drive cable, and together pull the slide-out room 22 in the first direction D1, in concert with the first drive cable 2810*a*.

In particular, the rotation of the drive chain 2804 moves the chain ends 2806*a*,2806*b* in opposite directions. For example, rotation of the drive chain 2804 in a clockwise direction R1 moves the chain ends 2806*a*,2806*b* upward and downward directions, respectively. Here, the first drive cable 2810*a* is connected to the chain end 2806*a*, which pulls it in a corresponding direction D1 to create tension in the first cable end 2814*a* to retract the slide-out room 22. This rotation of the drive chain 2802, however, may not pull the remaining drive cables 2810*b*,2812*a*,2812*b* to create tension in the corresponding cable ends 2814*b*,2816*a*,2816*b*. Similarly, opposite rotation of the drive chain 2804 pulls the first drive cable 2812*a* in a corresponding opposite direction to create tension in the first cable end 2816*a* to extend the slide-out room 22. Thus, the drive chain 2804 may engage or tension just one of the first drive cable 2810*a* or the first drive cable 2812*a*, and then the slide-out room 22 may activate the remaining drive cables.

In the illustrated example, the cable end 2814*a* of the first drive cable 2810*a* is connected to a bracket positioned at the outer lower corner A of the slide-out room 22, such that this rotation of the drive chain 2804 pulls (or moves) the slide-out room 22 in a first direction D1 from the outer lower corner A. Also, the cable end 2814*b* of the second drive cable 2810*b* is connected to a bracket positioned at the inner upper corner D of the slide-out room 22, such that the chain end 2806*a* of the drive chain 2804 pushes and/or provides slack to (or slackens) the second drive cable 2810*b* as the slide-out room 22 is pulled (or moved) in the first direction D1 via the first cable end 2814*a*. Also, the cable end 2816*a* of the first drive cable 2812*a* is connected to a bracket positioned at the inner lower corner B of the slide-out room 22, on an opposite side of the slide-out room 22 from the outer lower corner A, such that the slide-out room 22 pulls the drive cable 2812*a* as it moves in the first direction D1, thereby tensioning the second drive cable 2812*b* which is secured relative to the first drive cable 2812*a*. Here, the cable end 2816*b* of the second drive cable 2812*b* is connected to a bracket positioned at the outer upper corner C of the slide-out room 22 and movement of the slide-out room 22 in the first direction D1, via the first drive cable 2810*a*, tensions the first and second drive cables 2812*a*,2812*b* to pull the slide-out room 22 at the outer upper corner C in the first direction D1. Thus, rotation of the drive chain 2804 engages (or tensions) the first drive cable 2810*a* to pull (or move) the slide-out room 22 in the first direction D1, and the resulting movement of the slide-out room 22 in the first direction D1 engages the second drive cable 2812*b* to also pull (or move) the slide-out room 22 in the first direction D1. Similarly, rotation of the drive chain 2804 in the opposite direction engages (or tensions) the first drive cable 2812*a* to pull (or move) the slide-out room 22 in a second direction (that is opposite the first direction D1), and the resulting movement of the slide-out room 22 in the second direction engages the second drive cable 2810*b* to also pull (or move) the slide-out room 22 in the second direction.

Depending on where the cable end 2814*a* of the drive cable 2810*a* is connected on the outer surface of the slide-out room 22 (e.g., at the outer lower or outer upper corner A,C, or there-between), the inner surface of the slide-out room 22 may or may not move evenly, for example, the inner lower corner B of the slide-out room 22 may move a different amount (and/or differently) at the inner lower corner B. But for the slide-out room 22 engaging one or more of the remaining drive cables, this may otherwise result in tipping (or rocking, tilting, etc.) of the slide-out room 22, because the chain end 2806*a* of the drive chain 2804 pushing (or moving, carrying, etc.) the cable end 2814*b* of the drive cable 2810*b* may fail to generate (or be incapable of generating) sufficient force to move the inner upper corner D of the slide-out room 22 in unison with the inner lower corner B; and, similarly, the chain end 2806*b* of the drive chain 2804 pushing (or moving, carrying, etc.) the drive cable 2812*b* in this direction may otherwise fail to generate (or be incapable of generating) sufficient tension in the cable end 2816*b* of the drive cable 2812*b* to pull the outer upper corner C of the slide-out room 22 in unison with the inner lower corner B. Thus, when activating the cable end 2814*a* via the drive chain 2804 to pull the outer lower corner A of the slide-out room 22 in the first direction D1, driven rotation of the drive chain 2804 may cause no movement of the outer upper corner C of the slide-out room 22 or may cause movement (or travel) in the first direction D1 less than the outer lower corner A; and, moreover, driven rotation of the drive chain 2804 may otherwise cause the outer upper corner C of the slide-out room 22 to move (or travel) in the first direction D1 less than the inner lower corner B, resulting in the inner lower corner B engaging (or tensioning) the drive cables 2812*a*,2812*b* to pull the outer upper corner C of the slide-out room 22 simultaneously with the outer lower corner A. Accordingly, the drive assembly 2800 may be configured to deploy the slide-out room 22 into its extended and retracted positions with a desired orientation and/or be configured to adjust orientation of the slide-out room 22 during deployment of the same.

The drive assembly 2800 cycles the drive chain 2804 to pull or engage just one drive cable 2810a,2810b,2812a, 2812b. This causes movement of the slide-out room 22, which in turn activates the remaining drive cables 2810a, 2810b,2812a,2812b. Thus, all of the drive cables 2810a, 2810b,2812a,2812b are activated by pulling just one of them, which moves the slide-out room 22 at one corner and sets the remaining corners of the slide-out room 22 in motion.

Figure 29A:
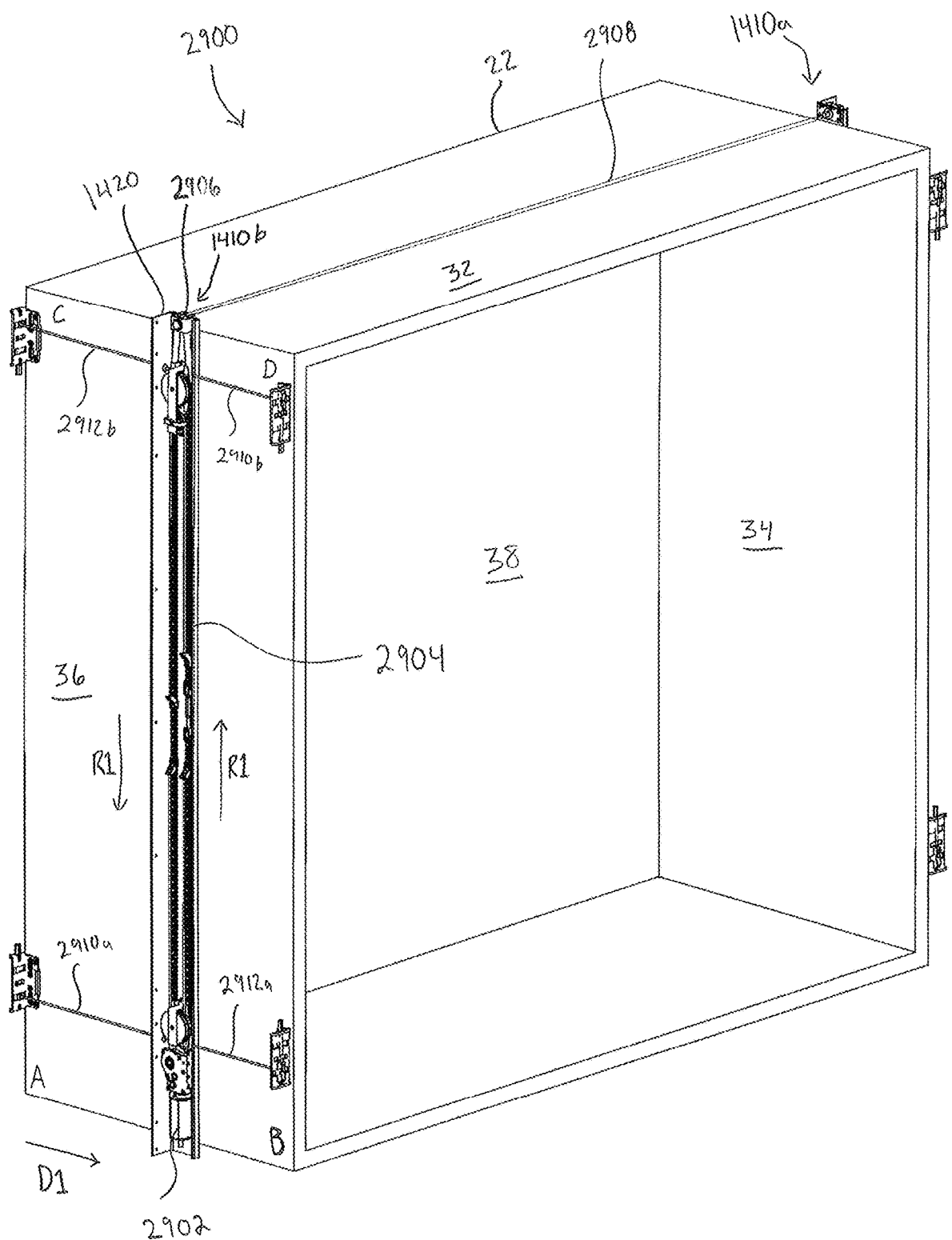
FIGS. 29A-29C illustrate an alternate cable drive assembly that may be incorporated with the jamb assemblies to move the slide-out room between an extended and retracted position.
Figure 29B:
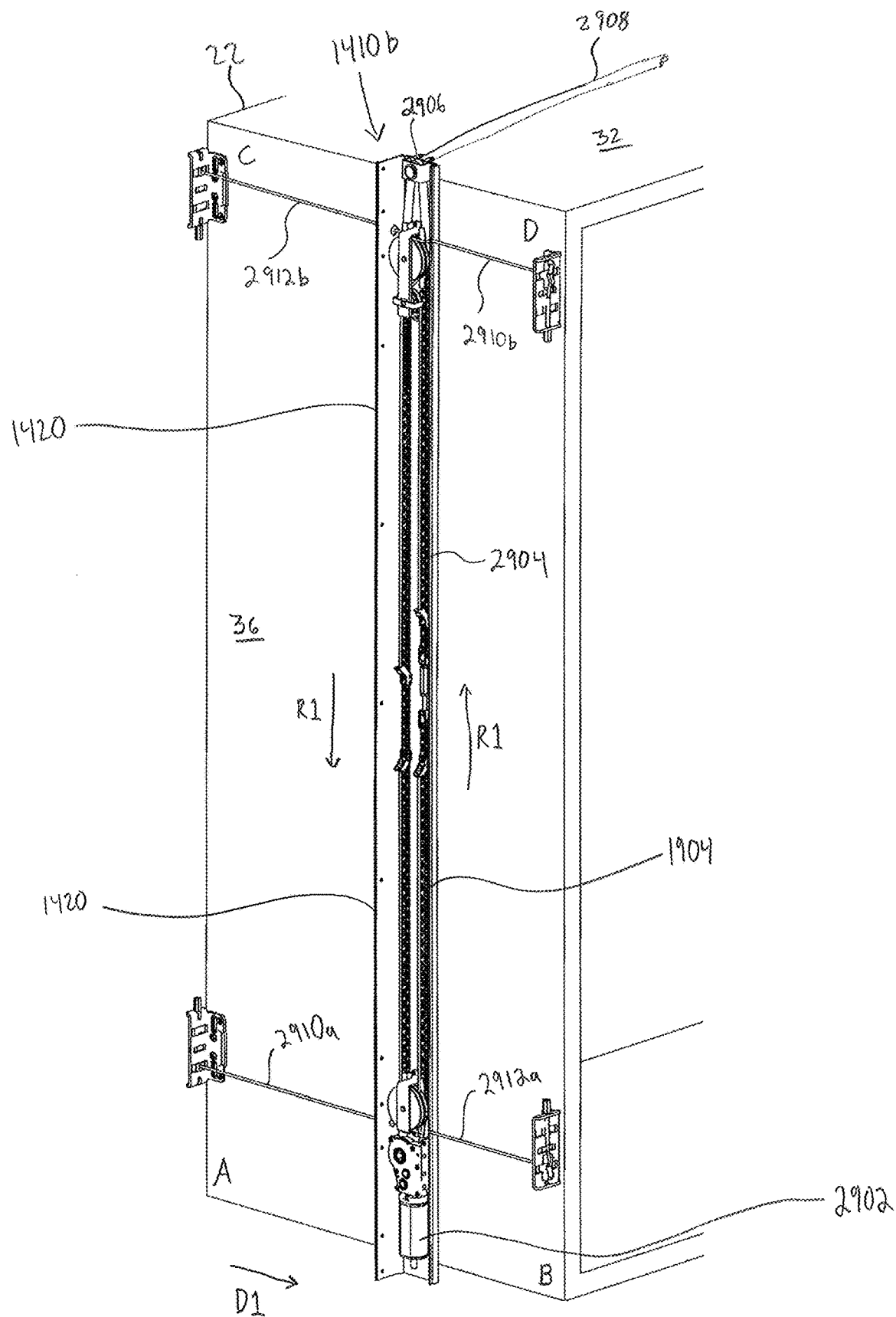
Figure 29C:
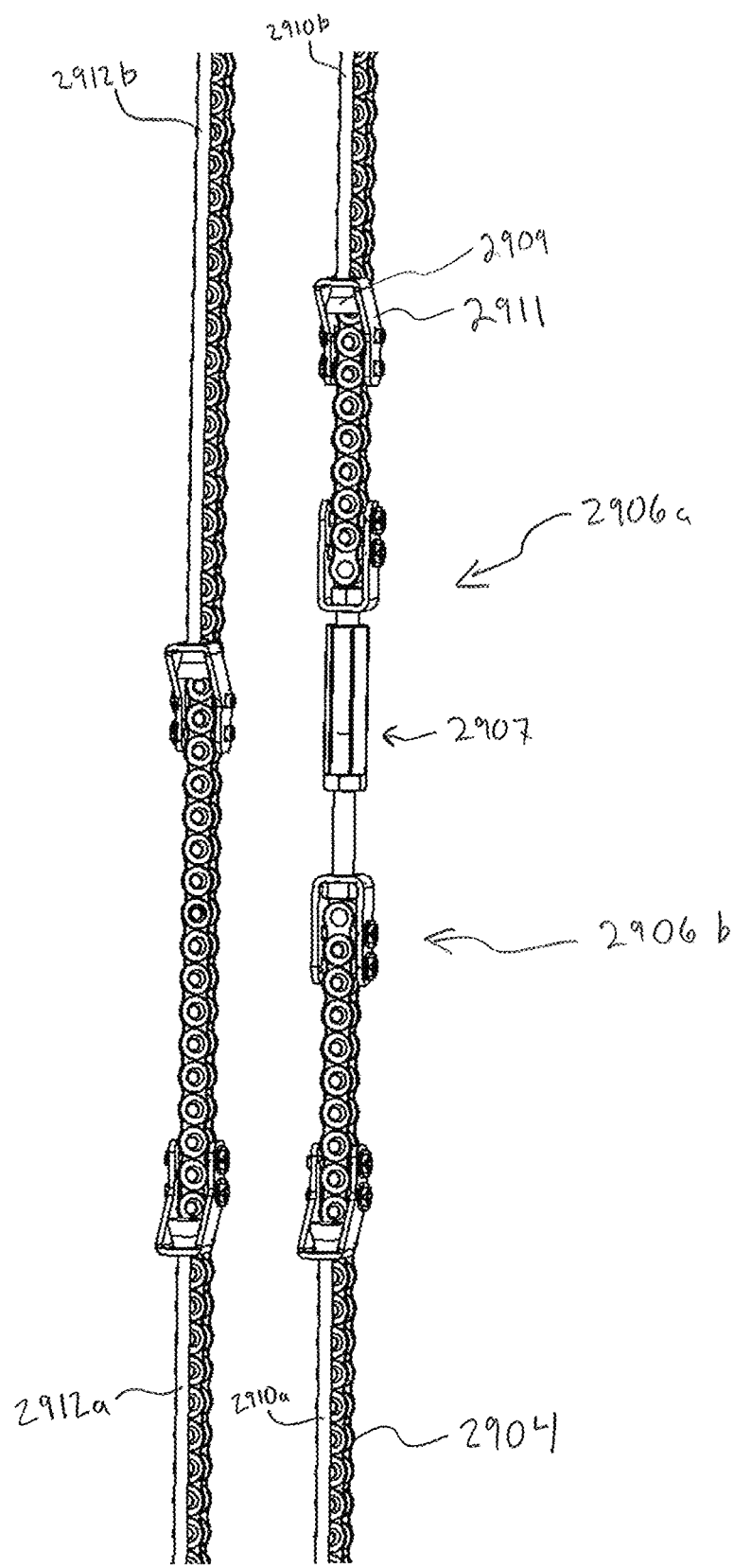

FIGS. 29A-29C illustrate an alternate drive assembly 2900, according to one or more alternate embodiments. With reference to FIGS. 29A-29B, the drive assembly 2900 may be incorporated into the left and right jamb assemblies 1410a,1410as previously described with regard to the drive assembly 2800 of FIGS. 28A and 28B. Thus, as to each of the jamb assemblies 1410a,1410b, the drive assembly 2900 includes a motor 2902 and a drive chain 2904. A drive sprocket (obscured from view) is operatively coupled to the motor 2902, and the drive chain 2904 extends around and engages the teeth of the drive sprocket, such that the motor 2902 may impart torque on the drive sprocket, causing it to rotate and drive or move the drive chain 2904. Also, an idler sprocket 2906 may be provided in each of the opposing jamb assemblies 1410a,b for guiding and maintaining orientation of the drive chain 2904 as it is actuated by the drive sprocket of the motor 2902. Here, the drive chain 2904 is provided as a continuous (or closed) segment or loop of chain arranged around the drive sprocket and the idler sprocket 2906 to maintain engagement with the drive sprocket as it rotates in either direction, such that the drive chain 2904 transmits power to the idler sprocket 2906 so that the idler sprocket 2906 rotates with the drive sprocket.

As illustrated, a timing shaft 2908 may extend between and interconnects the idler sprockets 2906 of the opposing jamb assemblies 1410a,b, such that they rotate in unison and operation of the drive assembly 2900 within each of the opposing jamb assemblies 1410a,b is synchronized or timed together. However, other mechanical timing mechanisms and/or non-mechanical timing systems may be utilized in addition to or in lieu of the foregoing. Also, it will be appreciated that the timing shaft 2908 (or other timing mechanism) may be provided at various locations about the slide-out room 22, for example, across a top side of the slide-out room 22, along a bottom side thereof, or along a sidewall thereof depending on the location about the slide-out room 22 that the drive assembly 2900 is oriented. Thus, the drive assembly 2900 is a variation of the drive assembly 2800 of FIGS. 28A-28C, wherein the motor 2902 is positioned at a lower side of the slide-out room 22 to permit configuration of the timing shaft 2908 across an upper side of the slide-out room 22. However, the timing shaft 2908 may be provided along a lower side of the slide-out room 22 in other examples.

FIG. 29C illustrates a close up view of a central portion of the drive chain 2904, according to one or more examples. Here, the drive chain 2904 is configured as a continuous chain, or closed loop of chain, and is thus connected at its free ends 2906a,2906b. Here, for example, the drive chain 2904 is adjustably connected at free ends 2906a,2906b via an adjustable chain connector 2907. Also, a pair of first drive cables 2910a,2910b and a pair of second drive cables 2912a,2912b are secured relative to the drive cable 2904. The drive cables 2910a,2910b,2912a,2912b may be adjustably connected to the drive chain 2904, or otherwise connected to the drive chain 2904. Here, the drive cables 2910a,2910b,2912a,2912b each include an integral bead or stop member 2909 received within a cable chain connector 2911 configured to permit both rotation of the drive cables 2910a,2910b,2912a,2912b within the cable chain connector 2911 as well as axial translation of the drive cables 2910a, 2910b,2912a,2912b through the cable chain connector 2911 until the bead 2909 contacts the cable chain connector 2911. In other examples, the drive cables 2910a,2910b,2912a, 2912b may be adjustably connected to the drive chain 2904.

Returning to FIGS. 29A-29B, the drive cables 2910a, 2910b,2912a,2912b are each connected to a bracket positioned on the slide-out room 22 at an outer lower corner A, inner lower corner B, outer upper corner C, and inner upper corner D, respectively, of the slide-out room 22. Rotation of the drive chain 2904 in either direction pulls or tensions one of the drive cables 2910a,2910b,2912a,2912b, which pulls the slide-out room 22, and this movement of the slide-out room 22 activates the remaining drive cables 2910a,2910b, 2912a,2912b. For example, rotation or cycling of the drive chain 2904 in a direction indicated by R1 tensions the first drive cable 2910a, such that the drive cable 2904 pulls the first drive cable 2910a causing the outer lower corner A of the slide-out room 22 to move in the first direction D1. This movement of the slide-out room 22 causes the inner lower corner B of the slide-out room 22 to move in the first direction D1 with the outer lower corner A being pulled by the first drive cable 2910a. The first drive cable 2912a is attached at the inner lower corner B of the slide-out room 22 and, at its other end, is fixed relative to the second drive cable 2912b (e.g., through the drive chain 2904) such that tensioning of the drive cable 2912a activates or tensions the second drive cable 2912b that is connected to the outer upper corner C. Thus, the slide-out room 22 activates or tensions the drive cables 2912a,2912b to pull the outer upper corner C of the slide-out room 22 as the drive chain 2904 activates or tensions the first drive cable 2910a to pull the outer lower corner A. Similarly, reverse operation of the drive chain 2904 would cause tensioning of the first drive cable 2912a to pull the inner lower corner B of the slide-out room in an opposite direction, which movement of the slide-out room 22 thereby tensions the drive cables 2910a,2910b interconnecting the outer lower corner A and the inner upper corner D to pull the slide-out room 22 at the inner upper corner D.

The slide-out room 22 may be balanced in a specific orientation during its extension or retraction. For example, the slide-out room 22 may be balanced in an orientation where the forward or outside wall 38 of the slide-out room 22 is parallel to the side 16 of the vehicle 10 and/or where the floor of the slide-out room 22 is parallel to the floor of the vehicle 10. In some examples, the slide-out room 22 is balanced on one or more rollers or bars that are secured to the vehicle 10. For example, the bottom jamb 20 of the opening 18, which is positioned proximate to the floor of the slide-out room 22, may include one or more rollers or bars on which the slide-out room 22 may be balanced in a constant orientation as it slides between its fully extended and retracted positions. In some examples, the roller(s) or bars or other balancing means may be positioned on the jambs 20 positioned next to the sidewalls 34,36 of the slide-out room 22. Regardless of whether any such rollers or bars are utilized and the location at which they are positioned about the opening 18 relative the slide-out room 22, the drive mechanisms disclosed herein (e.g., the drive assembly 2800,2900) may balance the slide-out room 22 in a specific orientation, and maintain the slide-out room 22 in that specific orientation, as the drive cables are actuated to move the slide-out room 22. Thus, the slide-out room 22 may maintain constant orientation as the drive cables pull it in either a first or second direction. In one examples, one or more of the drive cables pull the slide-out room 22 in a first direction towards and into its fully extended position in a manner that the floor of the slide-out room 22 maintains its orientation (e.g., parallel to the floor of the vehicle) during the entire time that it is moved in the first direction. Similarly, one or more of the drive cables will maintain that orientation of the slide-out room 22 and balance the slide-out room 22 as they pull the slide-out room 22 in the second direction towards and into its fully retracted position. Thus, the drive cables may balance the slide-out room 22 in a particular orientation as they actuate the slide-out room 22 in either the first direction or the second direction. Also, in this example one or more rollers, balancing members, or wear strips (or wear bars) may be positioned about the opening 18 in the vehicle 10 for at least partially supporting the slide-out room 22 as the drive out cables balance and actuate the slide-out room 22 in the first direction and/or second direction. The wear strip comprise a strip of plastic with a slick surface and which may operate as a seal too.

FIGS. 30A-30G illustrate various cable-chain adjusters configured to adjust tension of the drive cables and/or the drive chain, according various embodiments. The cable-chain adjusters illustrated in FIGS. 30A-30G, which are sometimes referred to as connectors, adjustably connect one or more drive chains 3000 to one or more drive cables 3002, and may be utilized with various slide-out drive assemblies, such as those described herein. The connecters described with reference to FIGS. 30A-30G may be utilized within jamb frames or elsewhere about the vehicle, such as beneath the slide-out room 22.

Figure 30A:
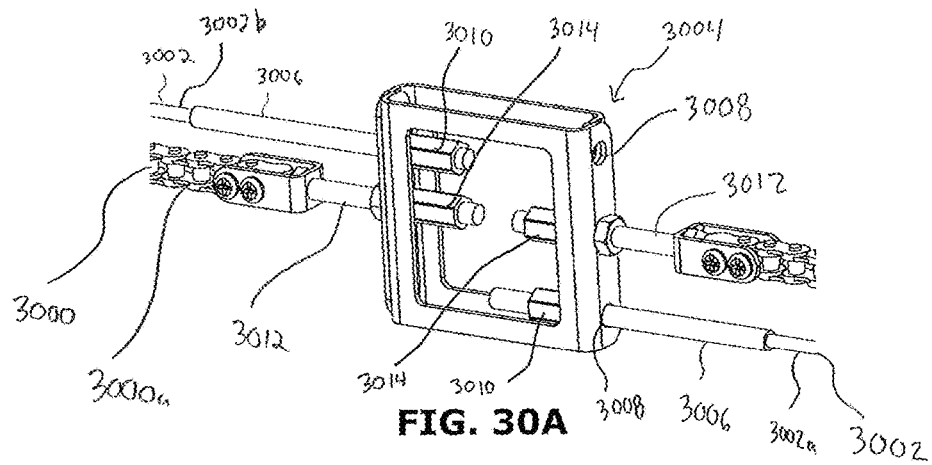

FIG. 30A illustrates a connector 3004 that interconnects a pair of drive chains 3000a,3000b and actuates a pair of drive cables 3002a,3002b, according to one or more embodiments. The connector 3004 may be utilized in a variety of slide-out drive assemblies, and, in some examples, a pair of the connectors 3004 may be utilized within a jamb mounted slide out drive assembly. A first drive cable 3002a extends from one end of the connector 3004 and a second drive cable 3002b extends from a second opposite end of the connector 3004. Here, the pair of drive chains 3000a,3000b are strands of chains having chain ends, and each chain ends of each drive chain 3000a,3000b is connected to a separate connector 3004. Thus, drive chains 3000a,3000b and the pair of the connectors 3004 form an endless loop that may rotate within a jamb assembly and that may be driven to actuate the drive cables 3002 extending from the jamb assembly. Each of the connectors 3004 may be formed from a pair of U-shaped members that are fastened together. Each drive cable 3002 includes a stud 3006 that extends through an aperture 3008 formed in each stamped U-shaped member and secured from an interior portion of the connector 3004 via a nut 3010. The stud 3006 may include a threaded portion that is inserted within and corresponds with a threaded bore portion of the nut 3010, and axially translates therein upon rotation of the nut 3010. In addition, the drive cables 3002a,3002b may be adjustable with respect to the connector 3004, for example, via a stud 3012 having a threaded portion that axially translates within a threaded bore of a nut 3014 upon rotation of the nut 3014. Either or both of the nuts 3008,3014 may be configured to inhibit it from "backing off" its respective stud 3006,3012 after being tightened. For example, the nuts 3008,3014 may include spring lock washers that help lock the nuts 3008,3014 in place and inhibit loosening due to vibration. The U-shaped members that together define the connector 3004 may be stamped and may be secured together via a variety of means, including welding and/or fasteners. In the illustrated example, the U-shaped members are held together via the studs 3006,3012. In some examples, a locking device such as a lock washer is provided in-between the U-shaped members and aligned with the apertures through which the studs 3006,3012 are inserted.

Figure 30B:
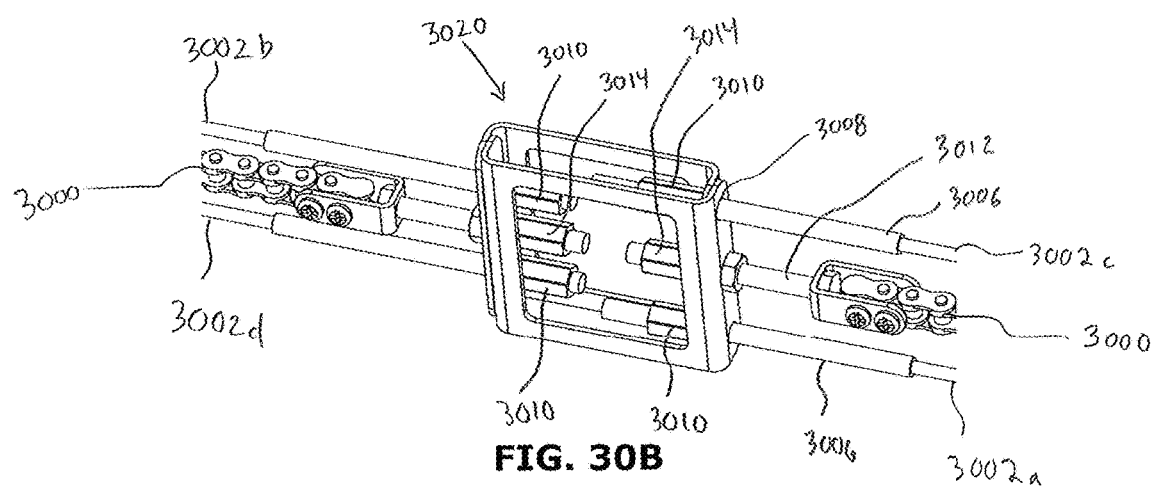

FIG. 30B illustrates an alternate connector 3020 that is spliced within the drive chain 3000 and actuates four (4) drive cables 3002a,3002b,3002c,3002d, according to one or more embodiments. The connector 3020 is similar to the connector 3004 of FIG. 30A, except that it is utilized with a single drive chain 3000, interconnecting opposing ends thereof to form an endless loop within a jamb assembly, and is adjustably attached to four (4) drive cables 3002a,3002b, 3002c,3002d, such that rotation of the drive cable 3000 activates all four (4) drive cables 3002a,3002b,3002c, 3002d. The connector 3020 may be utilized in a variety of slide-out drive assemblies, and, in the illustrated example, is utilized within a jamb mounted slide out drive assembly.

Figure 30C:
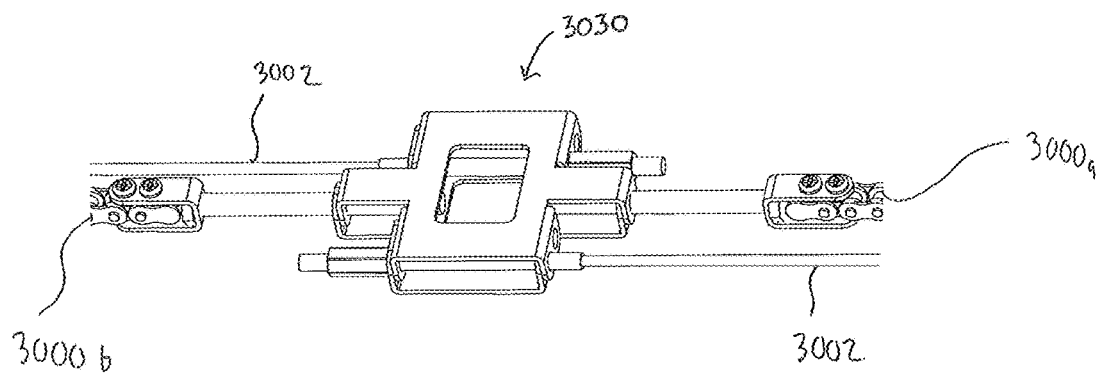

FIG. 30C illustrates an alternate connector 3030 interconnecting the pair of drive chains 3000a,3000b and actuates a pair of drive cables 3002a,3002b, according to one or more embodiments. As described with reference to FIG. 30, the pair of drive chains 3000a,3000b are strands of chains and a pair of the connectors 3030 are utilized to splice the drive chains 3000a,3000b together, thereby forming an endless loop within a jamb assembly that may be driven to actuate the drive cables 3002. Thus, the connector 3030 is similar to the connector 3004 of FIG. 30A, except that the connector 3030 provides greater adjustment of the drive cables 3002 in a relatively smaller envelope due to extension portions to which the drive cables 3002a,3002b are connected. Here, each of the U-shaped members that are held together to form the connector 3030 include a pair of oppositely extending chain connector portions such that, when the U-shaped members are assembled together as illustrated and described herein, the oppositely extending chain connector portions overlap and define the extension portions to which the ends of the drive chains 3000a,3000b are attached. In the illustrated example, the U-shaped members are held together via the studs of the drive cables and/or drive chains 3000a, 3000b. Also in the illustrated example, the nuts that are utilized to adjust tension in the drive cables 3002 are provided exterior an internal space of the connector 3030, proximate to the extension portion. Thus, the amount of travel of the stud is not limited by the amount of travel permitted within the internal space of the connector 3030, but, rather, the stud may translate through the 3030 and be adjusted to numerous lengths without obstruction from the body of the connector 3030. The connector 3030 may be utilized in a variety of slide-out drive assemblies, and, in the illustrated example, is utilized within a jamb mounted slide out drive assembly.

Figure 30D:
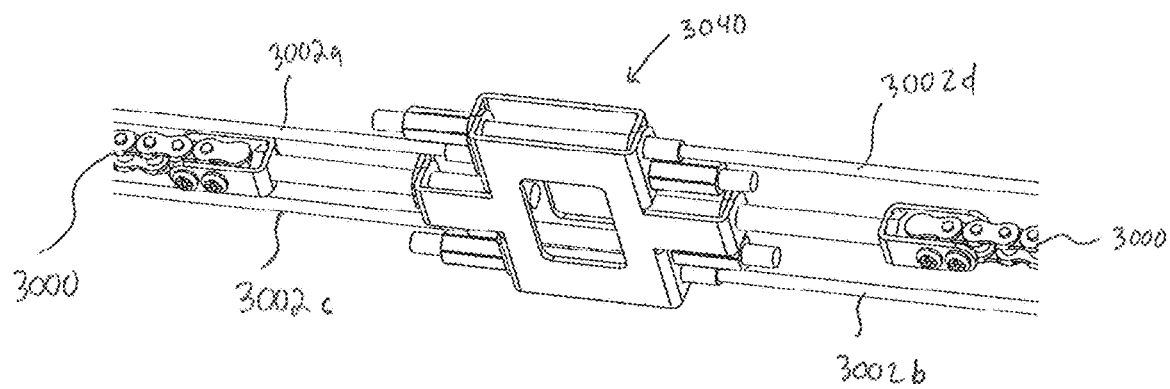

FIG. 30D illustrates an alternate connector 3040 that is spliced within the drive chain 3000 and actuates four (4) drive cables 3002a,3002b,3002c,3002d, according to one or more embodiments. The connector 3040 is similar to the connector 3030 of FIG. 30C, except that just one connector 3040 is utilized with a single drive chain 3000, interconnecting opposing ends of the drive chain 3000 to form an endless loop within the jamb assembly, and is adjustably attached to four (4) drive cables 3002a,3002b,3002c,3002d, such that rotation of the drive cable 3000 activates all four (4) drive cables 3002a,3002b,3002c,3002d. The connector 3040 may be utilized in a variety of slide-out drive assemblies, and, in the illustrated example, is utilized within a jamb mounted slide out drive assembly.

Figure 30E:
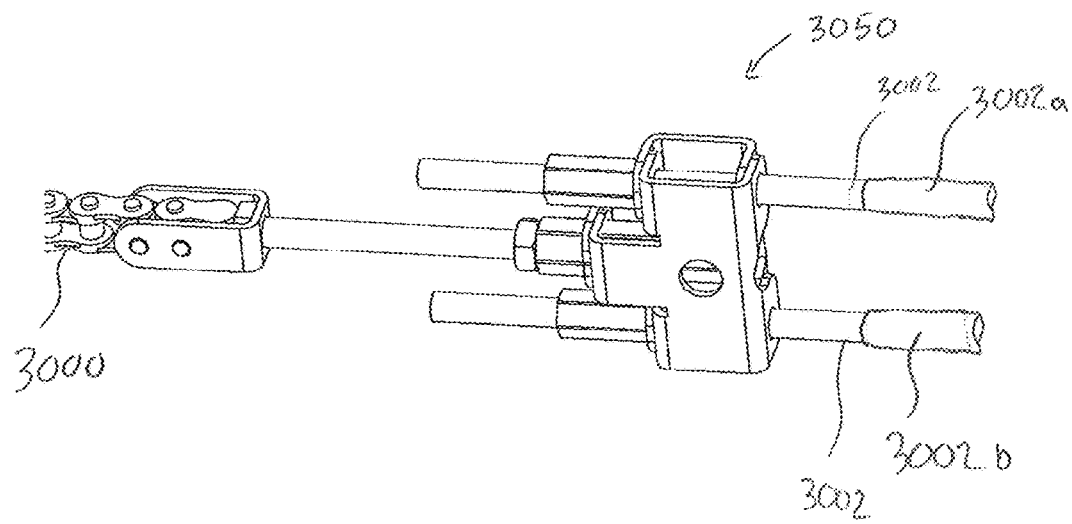
Figure 30F:
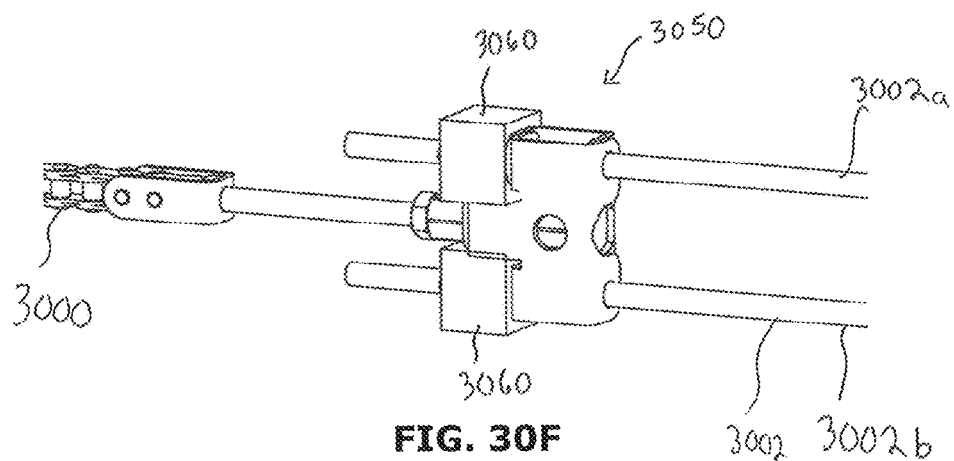

FIGS. 30E and 30F illustrate a connector 3050 configured to attach to an end of the drive chain 3000, according to various embodiments. Unlike the connectors described with reference to FIGS. 30A-30F, the connector 3050 does not splice together two separate strands of the chain 3000. Rather, the drive chain 3000 is configured as a strand in these examples, and the connector 3050 is attached at a first end of the strand (of drive chain 3000) and a second connector (not illustrated) is attached at a second end of the strand (of drive chain 3000). In addition, a second drive chain (not illustrated) with a second pair of connectors 3050 may be provided to actuate drive cables (not illustrated) attached to a second side of the slide-out room 22. Here, each of the drive cables 3002a,3002b includes a stud having a threaded portion, and the threaded portions of the studs extend through apertures in the connector 3050. The threaded portions of the studs extend into and through lock nuts, which may be rotated to cause linear translation of the stud through the apertures and relative to the connector 3050. Thus, the tension in the drive cables 3002 may be adjusted by rotating the lock nuts.

FIG. 30F illustrates an example of the connector 3050 having an anti-vibration device 3060 that inhibits the lock nut from rattling loose or backing off. Here, the anti-vibration device 3060 is foam block provided over the lock nut. The anti-vibration device may be made of various other materials, however, such as various elastomeric materials, etc. In other examples, the anti-vibration device is differently arranged relative the lock nut, for example, in between the lock nut and the connector 3050.

Figure 30G:
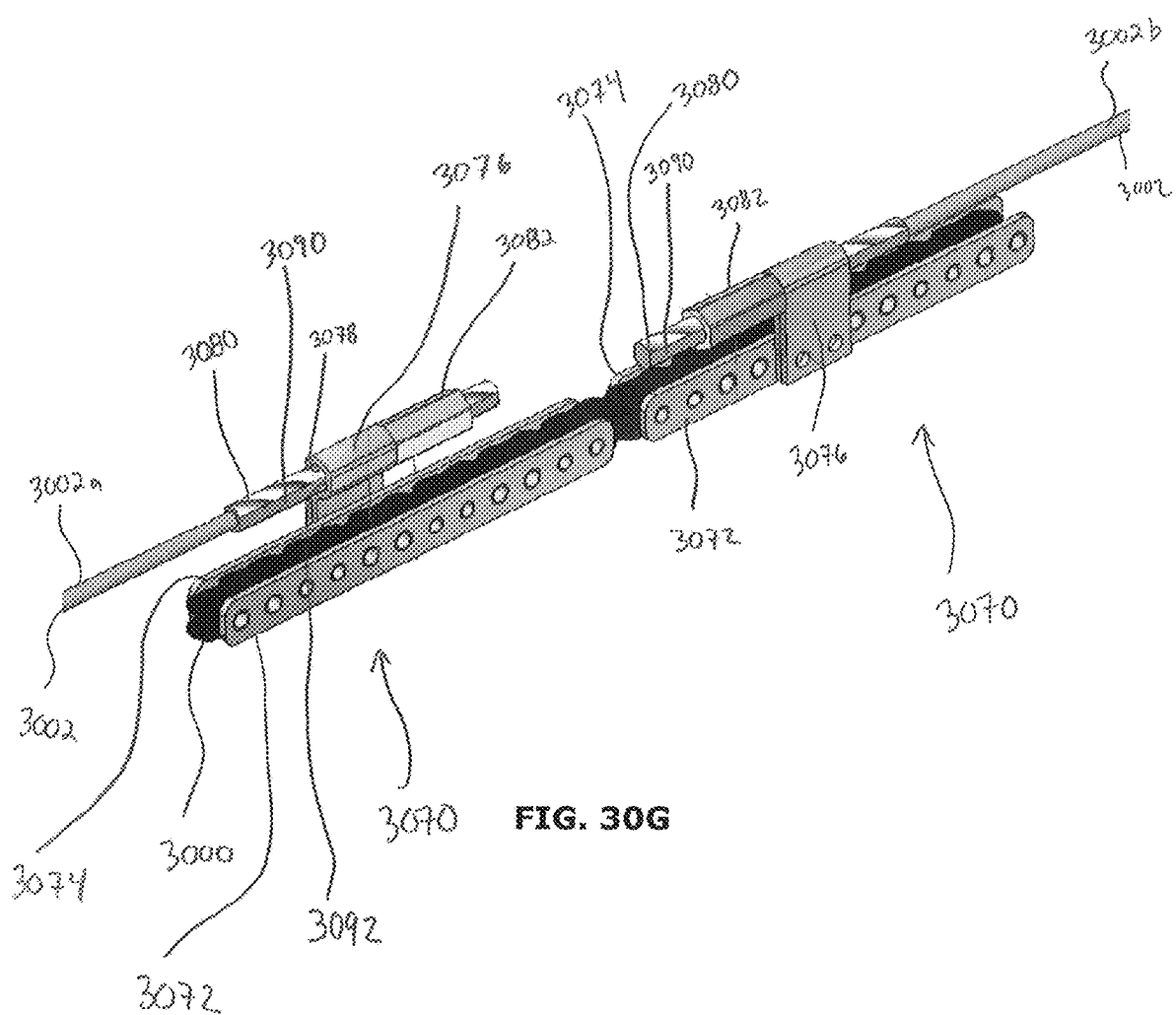
Figure 31B:
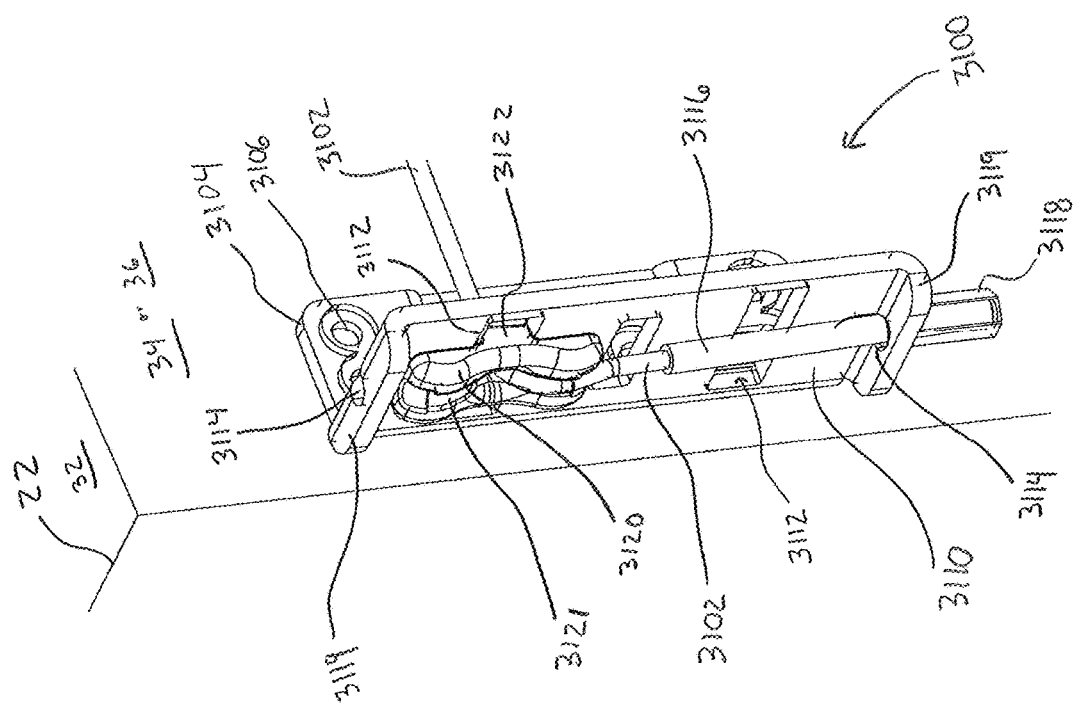
Figure 31A:
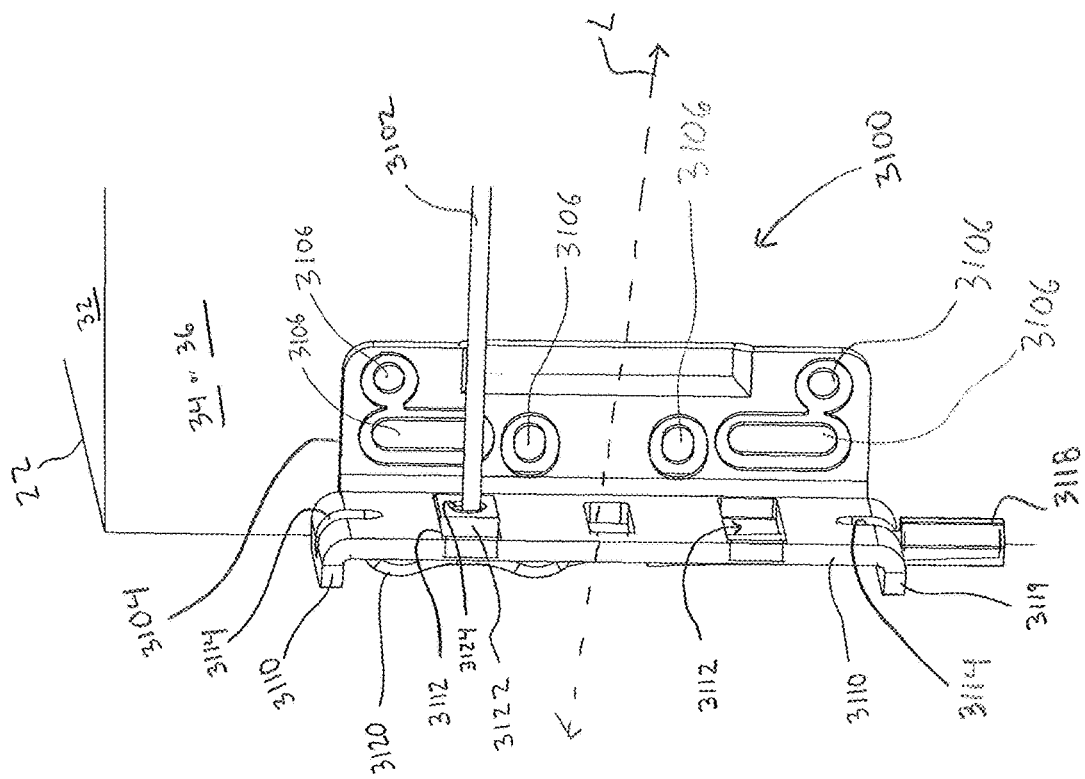
Figure 31D:
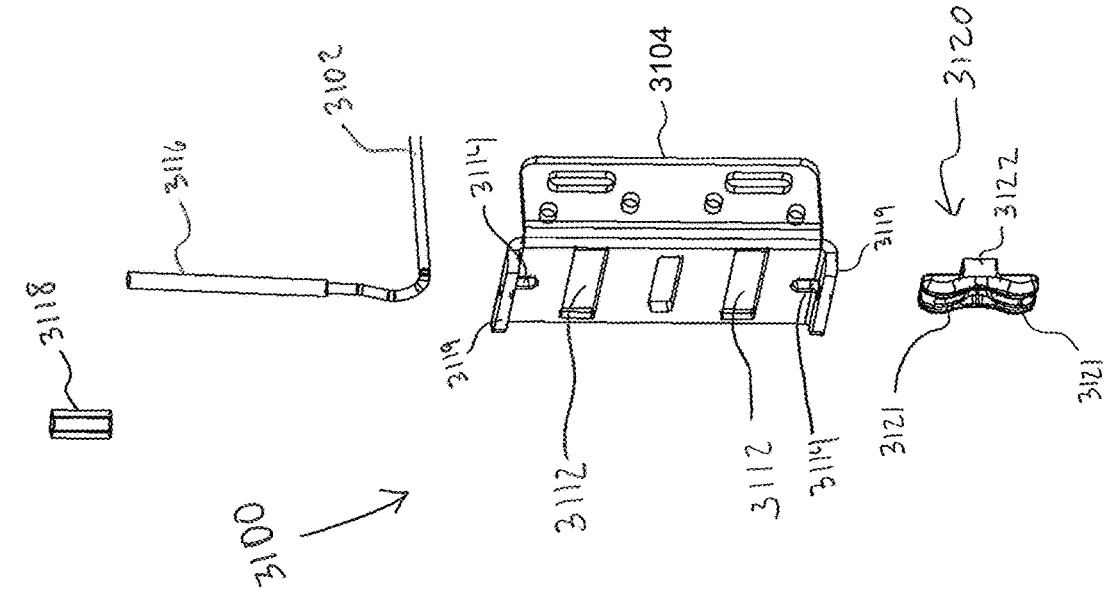
Figure 31C:
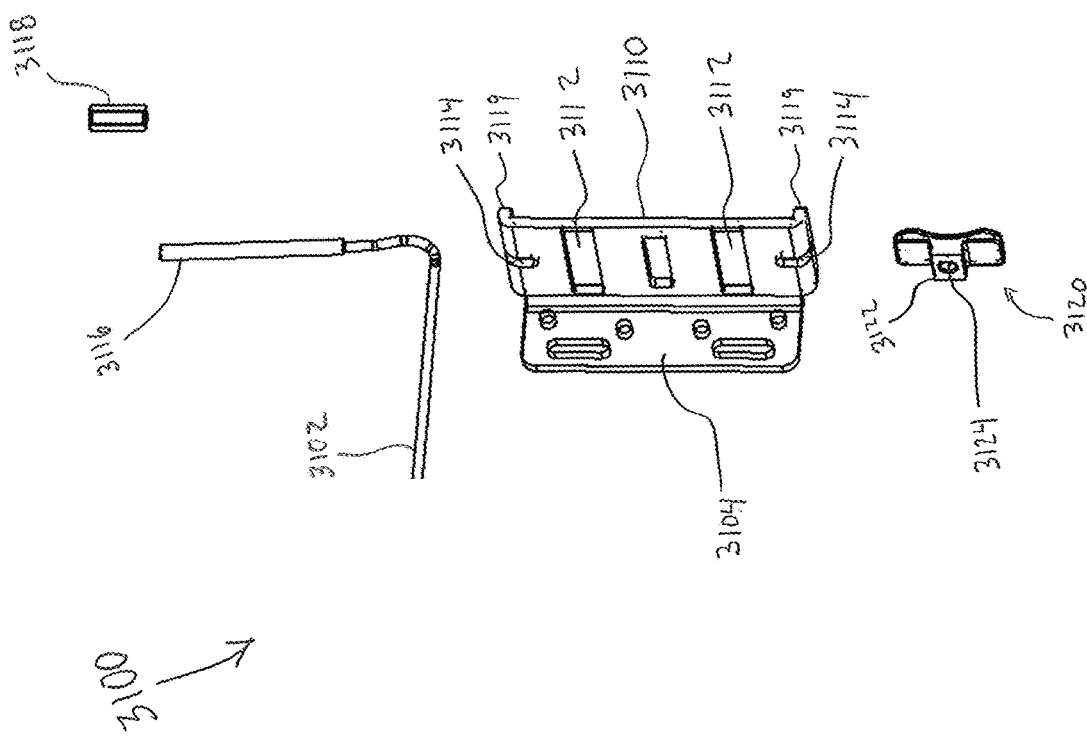

FIG. 30G illustrates another example connector 3070 for adjusting the drive cable 3002 relative to the drive chain 3000, according to one or more examples. In this example, the drive chain 3000 is continuous and thus provided as a loop. The drive chain 3000 may be provided within jamb assemblies arranged about opposite sides of the opening 18, and driven therein via one or more drive sprockets also arranged within the jamb assemblies. The connector 3070 includes a pair of opposing plates 3072,3074 that may be pinned together through one or more links of the drive chain 3000. A cable mount 3076 having an aperture 3078 extending there-through is secured to one of the opposing plates 3072,3074 (e.g., the plate 3074). Each of the drive cables 3002 includes a stud 3080 and at least a portion of the stud 3080 is threaded. The stud 3080 extends through the aperture 3078 of the cable mount 3076, from a first side of the aperture 3078 to a second side of the aperture 3078, and through a correspondingly threaded bore of a nut 3082 that is arranged proximate to the second side of the aperture 3078. The nut 3082 may be rotated to cause translation of the stud 3080 relative to the cable mount 3076 and through the threaded bore of the nut 3082.

In some examples, the stud 3080 includes at least one flat 3090 and a bore of the aperture 3078 (of the cable mount 3076) through which the stud 3080 extends includes at least one corresponding flat 3092. In the illustrated example, the stud 3080 includes a pair of oppositely disposed flats 3090 that correspond with a pair of oppositely disposed flats 3092 within the aperture 3078. The corresponding flats 3090,3092 are flat surfaces that abut each other as the stud 3080 translates axially within the bore of the cable mount 3076 and inhibit relative rotation between the studs 3080 and the cable mount 3076 due to interference between the corresponding flats 3090,3092. Thus, the flats 3090 on the studs 3080 may be provided without threads, which are otherwise provided on the stud 3080, such that rotation of the nut 3082 engages the threaded portions of the stud 3080 while permitting the nut 3082 to rotate over the flats 3090 of the stud 3080 without interference.

FIGS. 31A-31D illustrate a bracket 3100 (sometimes referred to as a stand-off bracket) configured for adjustably connecting a drive cable 3102 to the slide-out room 22, according to one or more embodiments. As hereinafter described, the bracket 3100 permits adjustment of a cable drive slide-out assembly, for example, drive assemblies 2800 and/or 2900, outside of the jamb assemblies 1410a, 1410b.

As illustrated, the bracket 3100 includes a base 3104 configured to be secured to the slide-out room 22, for example, on the left sidewall 34 and/or the right sidewall 36. Accordingly, a plurality of mounting holes 3406 may be provided in the base 3104. In the illustrated example, the mounting holes 3406 are symmetrically provided in the base 3104 relative to a central axis L; however, they may be provided in various other configurations, symmetrical or otherwise, in other examples.

The bracket 3100 also includes a stand-off portion 3110 configured to protrude outward from the slide-out room 22 and receive the drive cable 3102 at a location relative to the sidewall of the slide-out room 22 that provides ample room or space for a user to adjust the tension of the drive cable 3102. The stand-off portion 3110 may include a plurality of holes or recesses. Here, the stand-off portion 3110 includes a pair of insert recesses 3112 symmetrically disposed relative to the central axis L; however, they may be provided in various other configurations, symmetrical or otherwise, in other examples. Also, the stand-off portion 3110 includes a pair of cable end recesses 3114 for receiving the drive cable 3102 or a threaded stud 3116 thereof. Here, the cable end recesses 3114 are provided on the top and bottom of the stand-off portion 3110, symmetrical relative to the central axis L; however, they may be provided on either the top or bottom of the stand-off portion 3110 in other examples. In the illustrated example, the threaded stud 3116 is shown extending through the cable end recess 3114 provided in the bottom of the stand-off portion 3110, such that a nut 3118 may receive the threaded stud 3116 exterior the stand-off portion 3110 and be rotated to adjust tension in the drive cable 3102. Here, the nut 3118 abuts a leg or flange 3119 of the stand-off portion 3110 when engaging the threaded stud 3116 extending through the cable end recess 3114 defined in the flange 3119.

The bracket 3100 also includes an insert 3120 arranged within the stand-off portion 3110. The insert 3120 is configured to receive the drive cable 3102 and redirect it towards the cable end recesses 3114 without damaging or weakening the drive cable 3102. For example, without the insert 3120, the drive cable 3102 would abut the stand-off portion 3110 and be re-routed or directed at a sharp angle, which may damage or otherwise weaken the drive cable 3102. Here, the insert 3120 is made of a plastic material and includes a radiused channel 3121 configured to receive the drive cable 3102 and redirect it towards the cable end recesses 3114 without stressing or damaging the drive cable 3102. For example, the radiused channel 3121 is configured to ensure that the drive cable 3102 is not subject to a ninety degree bend, which may cause damage over time to the drive cable 3102. In one example, the radiused channel 3121 includes a three-quarter inch radius cable channel; however, various other dimensions may be provided, for example, depending on the material of the drive cable 3102, without departing from the present disclosure.

The insert 3120 includes a face portion 3122 arranged within the insert recesses 3112. Also, a channel or recess 3124 is provided in the face portion 3122 for receiving the drive cable 3102. The recess 3124 extends through the face portion 3122 and into the radiused channel 3121, such that the drive cable 3102 may extend there-through and be redirected towards the cable end recess 3114 via the radiused channel 3121. In some examples, the insert 3120 is configured to self-align with the drive cables 3102 extending into the recess 3124. Here, the face portion 3122 is slightly smaller than the insert recesses 3112 such that it, and the insert 3120, may move side to side within the insert recesses 3112 relative to the stand-off portion 3110 (i.e., towards or away from the slide-out room 22) and thus align with the orientation of the drive cable 3102 extending from the jamb assembly 1410.

In some examples, the insert 3120 is secured within the insert recess 3112. In some of these examples, the insert 3120 may clip into the insert recess 3112 such that all relative movement between the insert 3120 and the stand-off portion 3110 is inhibited. However, in other of these examples, the insert 3120 may be secured within the insert recess 3112 in a manner permitting side-to-side movement (or sliding) of the insert 3120 within the insert recess 3112 and thereby permit self-alignment of the insert 3120 relative to the drive cable 3102 extending from the jamb assembly 1410.

Figure 32B:
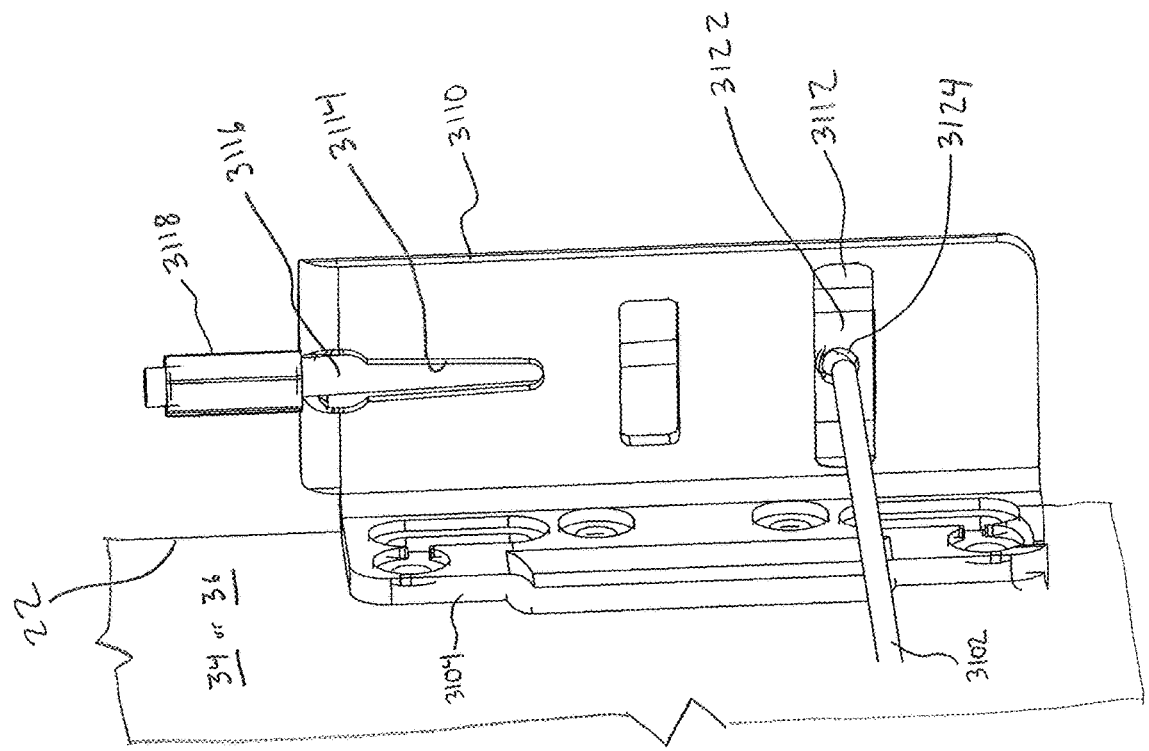
Figure 32A:
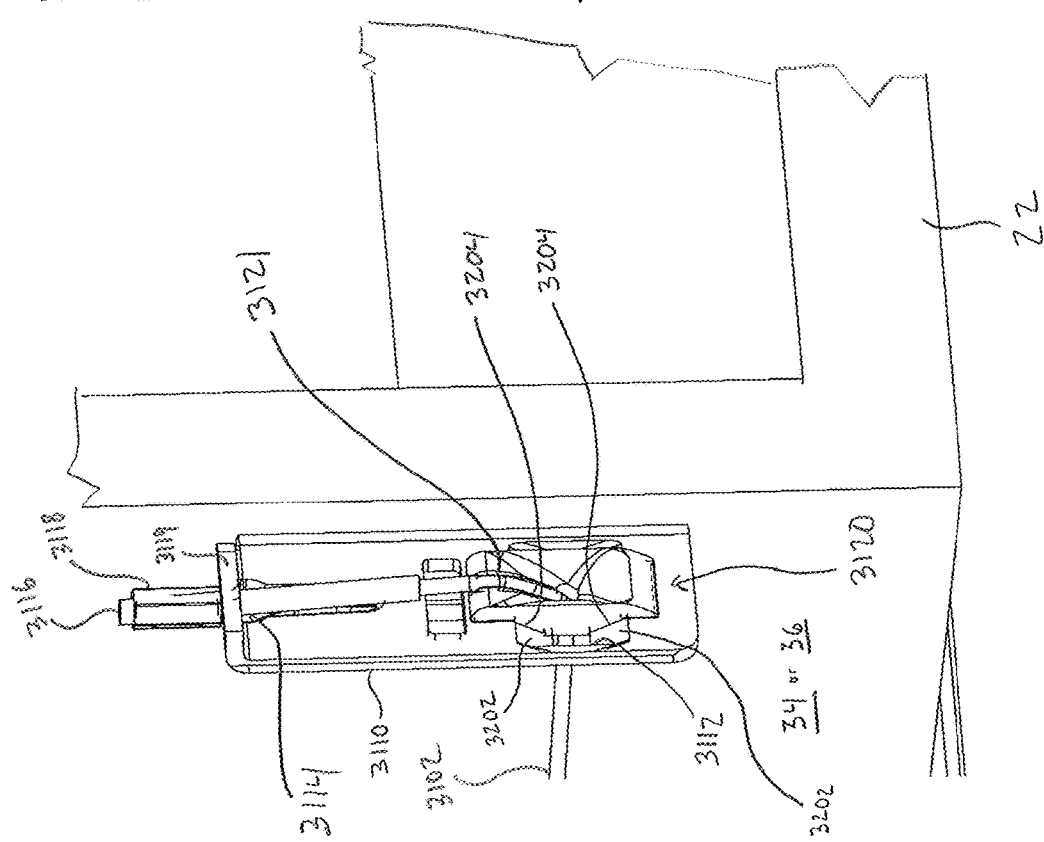

FIGS. 32A-32B illustrate alternate examples of the bracket 3100 of FIGS. 31A-31D, according to one or more alternate embodiments. Here, stand-off portion 3110 includes a single insert recess 3112 and a single cable end recess 3114, provided at opposite ends of the stand-off portion 3110. Here, for example, a single insert recess 3112 is provided proximate to the bottom side of the stand-off portion 3110 and the cable end recesses 3114 is provided at the top side of the stand-off portion 3110; however, they may be provided differently. For example, a single insert recess 3112 may be provided at the top side of the stand-off portion 3110 and the cable end recesses 3114 may be provided at the bottom side of the stand-off portion 3110. Also in the illustrated example, the insert recess 3112 may define a pair of angled surfaces 3202, and the face portion 3122 of the insert 3120 may include a pair of correspondingly angled surfaces 3204 that abut the angled surfaces 3202 when the insert 3120 is assembled within the stand-off portion 3110. Also in the illustrated example, the insert 3120 includes a single radiused channel 3121, but it may instead include a pair of radiused channels 3121 as illustrated in FIGS. 31A-31D.

FIGS. 33A-33B illustrate alternate brackets 3300 (i.e., a stand-off bracket) configured for adjustably connecting a drive cable 3302 to the slide-out room 22, according to one or more alternate embodiments. As hereinafter described, the bracket 3300 permits adjustment of a cable drive slide-out assembly, for example, drive assemblies 2800 and/or 2900, outside of the jamb assemblies 1410a,1410b.

The bracket 3300 includes a base 3304 and a stand-off portion 3306. The base 3304 is configured to mount on the slide-out unit 22 and the stand-off portion 3306 is configured to receive an end 3308 of the drive cable 3302. Here, the stand-off portion 3308 includes an aperture or recess 3309 through which the end 3308 of the drive cable 3302 extends. In the illustrated example, the recess 3309 is sized and shaped to permit movement of the end 3308 of the drive cable 3302 and alignment of the end 3308 of the drive cable 3302 with the drive cable 3302 extending from the jamb assembly 1410. In other examples, however, the recess 3309 is sized and shaped approximately the same as the end 3308 of the drive cable 3308, thereby inhibiting relative movement of the end 3308 of the drive cable 3302 within the recess 3309.

As illustrated, a cable adjustment assembly 3320 is provided on the end 3308 of the drive cable 3302. As hereinafter described, the cable adjustment assembly 3320 is configured to permit tensioning of the drive cable 3302 without having to substantially disassemble the drive assembly and/or access the drive cable 3302 from within the jamb assembly 1410. In some examples, the cable adjustment assembly 3320 includes a disk 3322 having a shank 3324 integrally extending therefrom. The shank 3324 may include a threaded bore (obscured from view) extending there-through. Here, the recess 3309 is sized and shaped to inhibit the disk 3322 from being pulled there-through.

The cable adjustment assembly 3320 may also include a stop or bead 3326 fixed on the end 3308 of the drive cable 3302 and an externally threaded collar 3328 rotatably arranged over the bead 3326. Also, the cable adjustment assembly includes a nut 3330 fixed to the externally threaded collar 3328 and configured to permit a user to rotate the externally threaded collar 3328. The externally threaded collar 3328 is coupled to the end 3308 of the drive cable 3302 to permit relative rotation there-between. Here, the externally threaded collar 3328 is configured to rotate about the bead 3326, whereas relative axial movement there-between is inhibited in at least one direction. The threads of the externally threaded collar 3328 correspond with the threads with the bore of the shank 3324 such that relative rotation between the shank 3324 and the externally threaded collar 3328 causes relative axial movement between the shank 3324 and the externally threaded collar 3328.

As mentioned, the externally threaded collar 3328 includes a bore that receives the bead 3326 and inhibits at least some relative axial movement therebetween. Here, the externally threaded collar 3328 is configured to inhibit the drive cable 3302 pulling the bead 3326 out of the externally threaded collar 3328 in a direction away from the disk 3322; and, in some examples, the externally threaded collar 3328 is also configured to inhibit the drive cable 3302 pushing the bead 3326 out of the externally threaded collar 3328 in a direction towards the disk 3322. Thus, the bore of the externally threaded collar 3328 may be stepped (i.e., include a larger diameter portion and a smaller diameter portion) to retain the bead 3326 of the drive cable 3302 within the bore of the externally threaded collar 3328 as the externally threaded collar 3328 is rotated to adjust tension in the drive cable 3302. For example, the drive cable 3302 may have a smaller diameter than the bead 3326 fixed thereon, and the bore of the externally threaded collar 3328 may have a larger diameter portion positioned away from the cable end 3308 and sized to receive the bead 3326; and the bore of the externally threaded collar 3328 may also include a smaller diameter portion that is positioned towards the end 3308 of the drive cable 3302 and sized to receive the end 3308 of the drive cable 3302, but sized too small to permit the bead 3326 from being pulled there-through when the externally threaded collar 3328 is threaded within the threaded bore of the shank 3324. Upon pulling of the drive cable 3302, the bead 3306 is pulled into contact with a step (obscured from view) within the bore of the externally threaded collar 3328, and this interference between the smaller diameter portion of the externally threaded collar 3328 and the bead 3326 inhibits the bead 3326 from being pulled out of the externally threaded collar 3328.

Figure 34C:
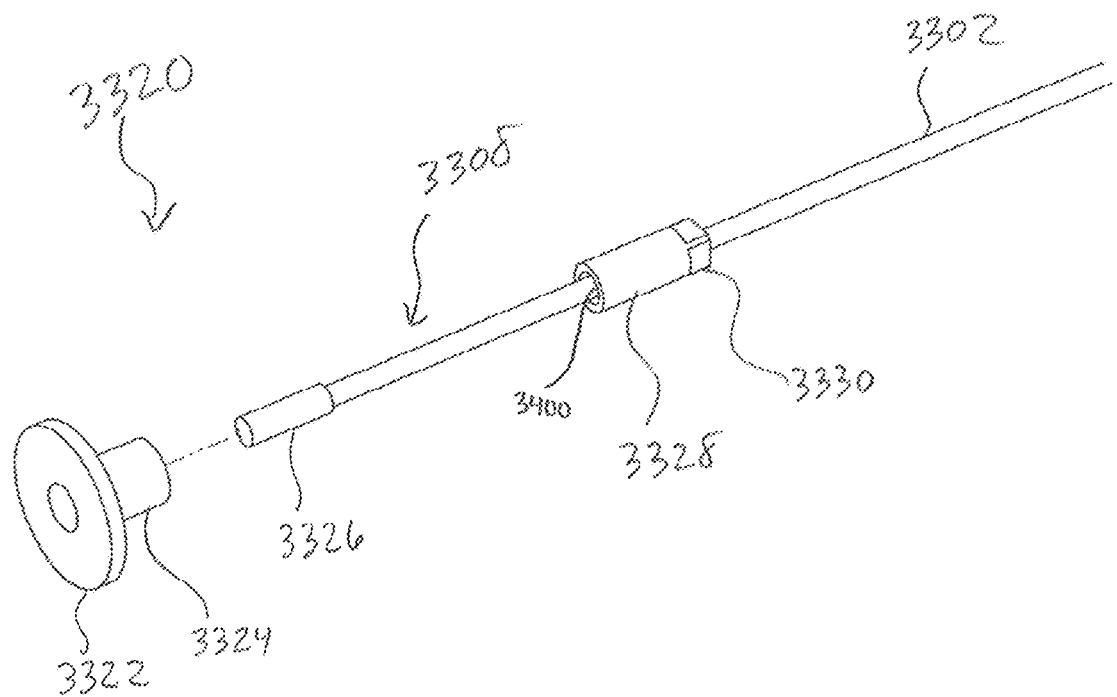
Figure 35C:
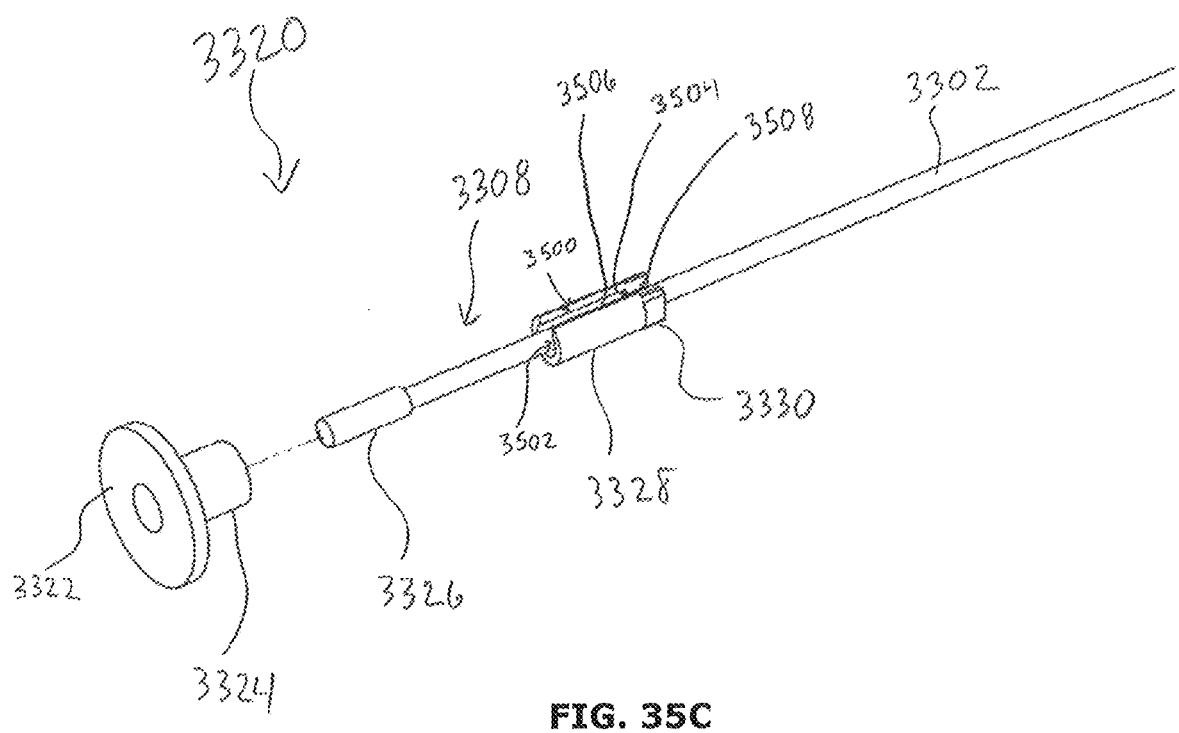

FIGS. 34A-34C and 35A-35C illustrate various examples of the cable adjustment assembly 3320, according to various examples of the present disclosure. As illustrated in FIGS. 34A-34C, the externally threaded collar 3328 and the nut 3330 integrally provided thereon may be provided as a solid unit with a bore 3400 extending there-through, but without any other recesses or gaps. As mentioned, the bore 3400 extending through the externally threaded collar 3328 may include a step (obscured from view) that interferes with the bead 3326 when the drive cable 3302 is pulled, thereby pulling the externally threaded collar 3328 with the end 3308 of the drive cable 3302. FIGS. 34A-34C illustrate an example where the externally threaded collar 3328 and the nut 3330 integrally provided thereon include a gap 3500. Here, the gap 3500 is oriented along and extends into a bore 3502 of the externally threaded collar 3328, and may permit the externally threaded collar 3328 and the nut 3330 to be press fit onto the drive cable 3302 without any disassembly of the jam assembly 1410, rather than having to thread them onto the drive cable 3302 which may require disassembly of the jamb assembly 1410 to access the other end of the drive cable 3302. Also, FIGS. 35A-35C illustrate the externally threaded collar 3328 including a step feature 3504 that separates a larger diameter portion 3506 of the bore 3502 and a smaller diameter portion 3508 of the bore 3502, with the larger portion 3506 configured to receive the bead 3326, the smaller portion 3508 configured to receive the end 3308 of the drive cable 3302, and the step feature 3504 inhibiting axial movement of the bead 3326 when the drive cable 3302 is pulled. Accordingly, a user may adjust tension in the drive cable 3302 via rotating the externally threaded collar 3328. In the illustrated examples, the user may utilize a tool to rotate the nut 3330 fixed to the externally threaded collar 3328.

The present subject matter affords a simple and reliable slide-out drive assembly and/or mechanism for a slide-out unit such as a slide-out room 22 or slide-out compartment 26. This slide-out drive assembly and/or mechanism is simpler and more reliable than other slide-out drive systems that are presently known. The drive mechanism of the present subject matter assures that the slide-out unit will advance and retract smoothly and evenly, whether power is applied manually or with a motor. Because of the simplicity of the present drive mechanism, there is less that can go wrong than is the case with presently known slide-out operating systems.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

Use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A slidable room drive assembly for a vehicle having a plurality of exterior walls, at least one of which has an opening, and a slide-out room having a pair of opposing sidewalls disposed in the opening and reciprocable between an extended position and a retracted position, the slidable room drive assembly comprising:
   a pair of jamb members arranged about the opening in the vehicle proximate to the opposing sidewalls of the slide-out room, each of the jamb members having a sprocket and a drive chain at least partially provided around the sprocket and actuatable in a first or second rotational direction by the sprocket, each of the drive chains being an open strand of chain with a first and second loose end extending from the sprocket such that the strand of chain has a U-shaped orientation when engaging the sprocket; and
   a plurality of drive cables within each jamb member, including:
      a first cable connected to the first loose end of the drive chain and extending from the jamb member to the front end of the slide-out room,
      a second cable connected to the first loose end of the drive chain and extending from the jamb member to the rear end of the slide-out room,
      a third cable connected to the second loose end of the drive chain and extending from the jamb member to the front end of the slide-out room, and
      a fourth cable connected to the second loose end of the drive chain and extending from the jamb member to the rear end of the slide-out room;

wherein within each jamb member, the first cable extends from the first loose end in a direction opposite of the second cable, the first cable and the second cable extending along a first common line;

wherein within each jamb member, the third cable extends from the second loose end in a direction opposite of the forth cable, the third cable and forth cable extending along a second common line;

wherein actuation of the drive chain in the first rotational direction tensions the first cable to pull the slide-out room from the front end and thereby move the slide-out room in a first direction, and movement of the slide-out room in the first direction thereby tensions the fourth cable and the third cable to further pull the slide-out room from the front end.

2. The slidable room assembly of claim 1, further comprising a motor arranged in each of the jamb members to actuate the respective drive chain, wherein the motors in the jamb members are mechanically timed.

3. The slidable room assembly of claim 1, further comprising a motor arranged in each of the jamb members to actuate the respective drive chain, wherein the motors in the jamb members are electronically timed with a controller.

4. The slidable room assembly of claim 3, wherein the controller monitors back EMF generated in the motors in each of the jamb members and compares the back EMF in the motors to thereby control either or both of the motors.

5. The slideable room assembly of claim 1, wherein the first and second drive cables are a unitary cable strand and/or the third and the fourth drive cables are a separate unitary strand of cable.

6. The slideable room assembly of claim 1, wherein:
the first cable is connected to the slide-out room proximate to a lower corner at the front end of the slide-out room;
the second cable is connected to the slide-out room proximate to an upper corner at the rear end of the slide-out room;
the third cable is connected to the slide-out room proximate to an upper corner at the front end of the slide-out room; and
the fourth cable is connected to the slide-out room proximate to a lower corner at the rear end of the slide-out room.

7. The slideable room assembly of claim 1, wherein movement of the slide-out room via tensioning of one of the four drive cables tensions at least one of the remaining four drive cables.

8. The slideable room assembly of claim 7, wherein the first, third, an fourth drive cables are activated in unison.

9. The slidable room assembly of claim 1, wherein the first drive cable and second drive cable are interconnected via a first segment of the drive chain at the first loose end.

10. The slidable room assembly of claim 1, wherein the first drive cable is coupled to the first loose end with a first cable connector and the second drive cable is coupled to the first loose end with a second cable connector.

11. The slidable room assembly of claim 10, wherein the first cable connector is spaced apart from the second cable connector along a first segment of the drive chain at the first loose end.

12. A drive assembly for reciprocating a slide-out room, the slide-out room having a pair of opposing sidewalls and being insertable within an opening in a vehicle body, the drive assembly comprising:

a strand of drive chain configured to move in a first or second rotational direction in a first plane, the strand of drive chain having a pair of loose ends that are unconnected to each other; and at least four drive members, the at least four drive members including:
a first drive member connected to a first of the pair of loose ends of the drive chain and extending therefrom to a first end of the slide-out room,
a second drive member connected to the first loose end of the drive chain and extending therefrom in a direction opposite to the first drive member to a second end of the slide-out room, the second end of the slide-out room being opposite the first end of the slide-out room,
a third drive member connected to a second of the pair of loose ends of the drive chain and extending therefrom to the first end of the slide-out room, and
a fourth drive member connected to the second loose end of the drive chain and extending therefrom in a direction opposite to the third drive member to the second end of the slide-out room, and wherein actuation of the drive chain in the first rotational direction engages one of the four drive members to move the slide-out room in a forward direction, and such forward movement of the slide-out room engages at least one of the remaining four drive members to thereby pull the slide-out room in the forward direction, wherein the drive members operate in a second plane that is parallel to the first plane.

13. The drive assembly of claim 12, wherein the four drive members maintain the slide-out room in a uniform orientation relative to the vehicle as the slide-out room moved towards a retracted position or an extended position.

14. The drive assembly of claim 12, wherein the slide-out is balanced on at least one balancing member coupled to the vehicle proximate the opening.

15. The drive assembly of claim 14, wherein the balancing member is at least one roller and/or at least one wear strip.

16. The drive assembly of claim 12, further comprising a jamb assembly arranged about the opening in the vehicle and housing the drive chain and a motor, wherein the motor is configured to actuate the drive chain.

17. The drive assembly of claim 16, further comprising a system for controlling velocity of the motor, wherein the system includes a controller that adjusts voltage supplied to the motor based on back EMF readings monitored by the controller.

18. The drive assembly of claim 17, wherein the motor comprises a pair of motors, each of the pair of motors being arranged in opposite portions of the jamb assembly, wherein the controller adjusts voltage supplied to a first of the pair of motors based on back EMF readings of a second of the pair of motors.

19. The drive assembly of claim 12, wherein at least one of the at least four drive members is adjustably connected to the slide-out room.

20. The drive assembly of claim 19, wherein at least one of the at least four drive members is adjustably connected to a bracket that is secured to the sidewall of the slide-out room.

21. The drive assembly of claim 12, wherein at least one of the at least four drive members is adjustably connected to the drive chain.

22. The drive assembly of claim 21, wherein at least one of the at least four drive members is adjustably connected to a coupling that is secured to the drive chain.

23. The drive assembly of claim 22, wherein the coupling adjustably connects the first drive member and the second drive member and/or adjustably connects the third drive member and the fourth drive member.

24. A drive assembly for reciprocating a slide-out room, the slide-out room having a pair of opposing sidewalls and being insertable within an opening in a vehicle body, the drive assembly comprising: at least four drive cables and a driver member, each of the at least four drive cables having chain ends at which they are coupled to the driver member and room ends at which they are coupled to the slide-out room, wherein
the driver member is a U-shaped strand of chain with a pair of ends that are unconnected to each other, the driver member being configured to tension or slacken the at least four drive cables upon actuation of the driver member, and
actuation of the driver member in a first direction tensions at least one of the at least four drive cables to move the slide-out room relative to the opening in the vehicle body, and movement of the slide-out room tensions at least one of the remaining at least four drive members wherein a first cable of the at least four drive cables extends from a first end of the drive member in a direction opposite of a second cable of the at least four drive cables, the first cable and second cable extending along a first common line.

25. The drive assembly of claim 24, wherein the driver member is a driver sprocket configured to rotate the U-shaped chain arranged around at least a portion of the driver sprocket, the at least four drive cables being coupled to the U-shaped chain.

26. The drive assembly of claim 25, wherein the U-shaped chain is a strand of chain having an opposing pair of free chain ends.

27. The drive assembly of claim 24, wherein each of the at least four drive cables is a discrete cable strand, each cable strand having opposite free cable ends, a first opposite free cable end of the discrete cable strands being connected to the drive member and a second opposite free cable end being connected to the slide-out room.

* * * * *